(12) United States Patent
Zhang et al.

(10) Patent No.: US 12,136,871 B2
(45) Date of Patent: Nov. 5, 2024

(54) POWER SUPPLY SYSTEM

(71) Applicant: Huawei Digital Power Technologies Co., Ltd., Shenzhen (CN)

(72) Inventors: Yanzhong Zhang, Shanghai (CN); Xun Wang, Shanghai (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 77 days.

(21) Appl. No.: 18/150,999

(22) Filed: Jan. 6, 2023

(65) Prior Publication Data
US 2023/0163675 A1 May 25, 2023

Related U.S. Application Data

(63) Continuation of application No. PCT/CN2020/100630, filed on Jul. 7, 2020.

(51) Int. Cl.
*H02M 1/00* (2007.01)
*H02J 3/38* (2006.01)
*H02M 1/32* (2007.01)
*H02M 3/06* (2006.01)
*H02M 5/12* (2006.01)
*H02M 7/493* (2007.01)

(52) U.S. Cl.
CPC ............ *H02M 1/007* (2021.05); *H02J 3/381* (2013.01); *H02M 1/32* (2013.01); *H02M 3/06* (2013.01); *H02M 5/12* (2013.01); *H02M 7/493* (2013.01); *H02J 2300/24* (2020.01)

(58) Field of Classification Search
CPC .......... H02M 1/007; H02M 1/32; H02M 3/06; H02M 5/12; H02M 7/493; H02J 3/381; H02J 2300/24
See application file for complete search history.

(56) References Cited

U.S. PATENT DOCUMENTS

| 8,212,408 B2 | 7/2012 | Fishman |
| 2010/0302819 A1 | 12/2010 | O'Brien et al. |
| 2013/0200715 A1 | 8/2013 | Pettersson et al. |
| 2018/0091037 A1 | 3/2018 | Zhao et al. |

(Continued)

FOREIGN PATENT DOCUMENTS

| CN | 104124703 A | 10/2014 |
| CN | 107104461 A | 8/2017 |
| CN | 107843806 A | 3/2018 |

(Continued)

*Primary Examiner* — Daniel Cavallari
(74) *Attorney, Agent, or Firm* — Maier & Maier, PLLC

(57) ABSTRACT

An energy combiner apparatus is used to convert output of a power supply, and has three output terminals, so that output ports are increased. In the three output terminals of the energy combiner apparatus, a voltage of 1500 V is output between a first output terminal and a second output terminal, a voltage of 1500 V is also output between the second output terminal and a third output terminal, and a total of 3 kV is output. Therefore, an overall output voltage is increased in a case of equal output power. Because the overall output voltage is increased, a current transmitted on a cable may be reduced. Therefore, a thinner cable may be used, so that costs of the cable are reduced. In addition, four cables conventionally required for connecting to the output terminals of the energy combiner apparatus are reduced to three, so that quantity and costs are reduced.

27 Claims, 33 Drawing Sheets

(56) References Cited

U.S. PATENT DOCUMENTS

2019/0305552 A1 10/2019 Cao et al.
2019/0305560 A1 10/2019 Wang et al.

FOREIGN PATENT DOCUMENTS

| CN | 108111035 A | 6/2018 |
| --- | --- | --- |
| CN | 108306320 A | 7/2018 |
| CN | 108539782 A | 9/2018 |
| CN | 108540004 A | 9/2018 |
| CN | 108631357 A | 10/2018 |
| CN | 109167390 A | 1/2019 |
| CN | 109687514 A | 4/2019 |
| CN | 110138011 A | 8/2019 |
| CN | 110535171 A | 12/2019 |
| CN | 110535172 A | 12/2019 |
| CN | 110535173 A | 12/2019 |
| EP | 3373433 A1 | 9/2018 |
| WO | 2020108460 A1 | 6/2020 |

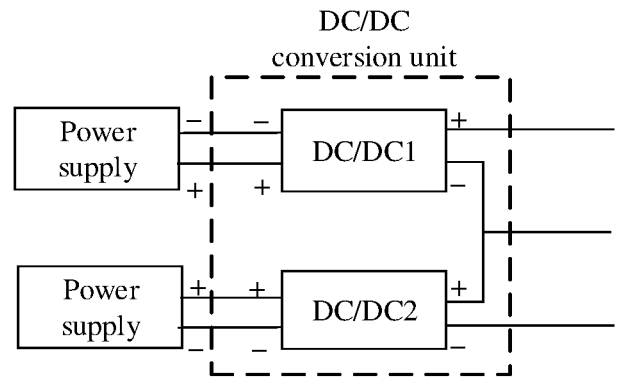
FIG. 4d-2
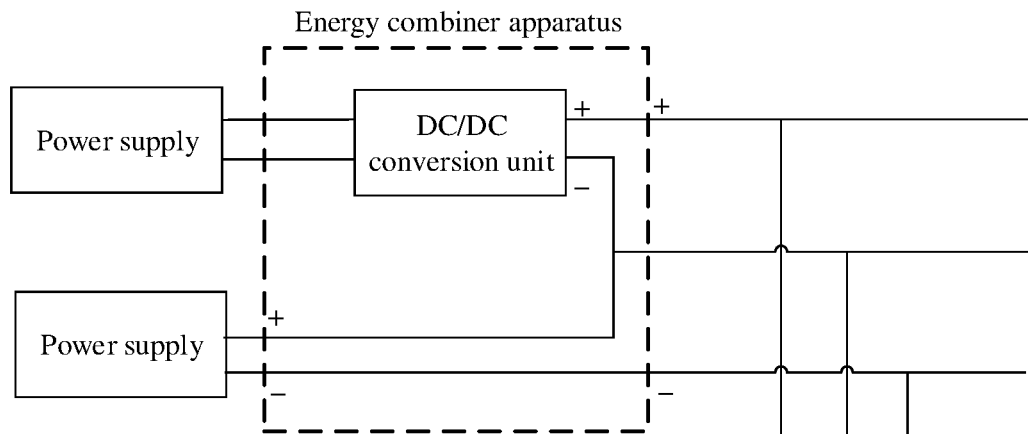
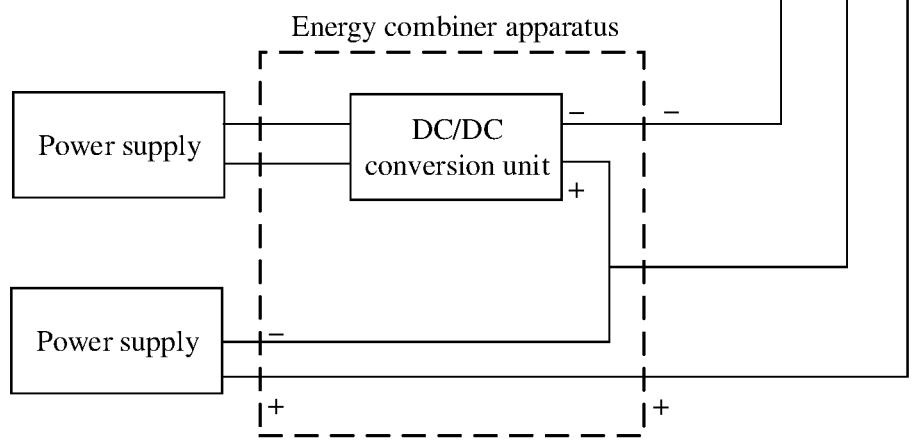
FIG. 4e

POWER SUPPLY SYSTEM

CROSS-REFERENCE TO RELATED APPLICATIONS

This application is a continuation of International Application No. PCT/CN2020/100630, filed on Jul. 7, 2020, the disclosure of which is hereby incorporated by reference in its entirety.

TECHNICAL FIELD

The embodiments relate to the field of circuit technologies and a power supply system.

BACKGROUND

With development of modern science and technology, new energy power generation is more widely used. New energy sources typically include solar energy (photovoltaic power generation), biomass energy, wind energy, geothermal energy, wave energy, ocean current energy, tidal energy, and the like. Energy from these new energy sources can be used to make new power supplies. The new power supply and some circuit units such as a direct current/alternating current conversion unit and a transformer constitute a power supply system to connect to a grid.

Photovoltaic power generation causes less pollution and develops faster than conventional fossil energy. However, with adjustment of photovoltaic grid connection electricity pricing policies, photovoltaic power generation requires a higher output-input ratio, and electric energy output needs to be increased, or costs need to be reduced. To reduce system costs and increase a power plant revenue ratio, a solid-state transformer is usually used to replace a conventional transformer in an existing solution to reduce costs of a photovoltaic power system.

However, cascaded modules inside the existing solid-state transformer are simply cascaded, and the solid-state transformer usually has two input terminals. Consequently, input to the solid-state transformer can be performed on a direct current side only through two direct current buses. However, an applied maximum system voltage of an existing photovoltaic panel is 1500 V. To ensure operation safety of the photovoltaic panel, a maximum voltage of a bus of the panel is 1500 V. As a quantity of connected photovoltaic panels increases, power of a direct current bus increases, but the maximum voltage of the direct current bus is only 1500 V, resulting in a high current on the direct current bus and a large diameter and high costs of a cable. If a direct current bus cable that can withstand a higher voltage is used, costs of the cable are also increased.

SUMMARY

The embodiments may provide a power supply system, to resolve conventional problems that a current on a direct current bus is high, a diameter of a cable is large, and costs of the cable are high.

According to a first aspect, an embodiment may provide a power supply system, including three phase circuits connected to a grid through a star or delta connection, at least one first power supply, and at least one energy combiner apparatus. The phase circuit includes a plurality of direct current/alternating current conversion combinations and a filter unit, and output terminals of the plurality of direct current/alternating current conversion combinations are cascaded. One terminal of cascading is coupled to an input terminal of the filter unit, an output terminal of the filter unit is used as a first output terminal of the phase circuit, and the other terminal of cascading is used as a second output terminal of the phase circuit. The direct current/alternating current conversion combination includes a first-stage isolation DC/AC conversion unit and a second-stage isolation DC/AC conversion unit, output terminals of the first-stage isolation DC/AC conversion unit and the second-stage isolation DC/AC conversion unit are cascaded, one terminal of cascading is used as a first output terminal of the direct current/alternating current conversion combination, and the other terminal of cascading is used as a second output terminal of the direct current/alternating current conversion combination. A first input terminal of the first-stage isolation DC/AC conversion unit is used as a first input terminal of the direct current/alternating current conversion combination, a second input terminal of the first-stage isolation DC/AC conversion unit is coupled to a first input terminal of the second-stage isolation DC/AC conversion unit, a coupling node is used as a second input terminal of the direct current/alternating current conversion combination, and a second input terminal of the second-stage isolation DC/AC conversion unit is used as a third input terminal of the direct current/alternating current conversion combination. An input terminal of the energy combiner apparatus is coupled to an output terminal of at least one first power supply, and the three input terminals of the direct current/alternating current conversion combination are coupled to three output terminals of at least one energy combiner apparatus. In this embodiment, the energy combiner apparatus is used to convert output of the power supply, and has three output terminals, so that output ports are increased. In the three output terminals of the energy combiner apparatus, a voltage of 1500 V is output between a first output terminal and a second output terminal, a voltage of 1500 V is also output between the second output terminal and a third output terminal, and a total of 3 kV is output. Therefore, an overall output voltage is increased in a case of equal output power. Because the overall output voltage is increased, a current transmitted on a cable may be reduced. Therefore, a thinner cable may be used, so that costs of the cable are reduced. In addition, four cables conventionally required for connecting to the output terminals of the energy combiner apparatus are reduced to three cables, so that a quantity and costs are reduced.

With reference to the first aspect, in a possible implementation, the energy combiner apparatus includes at least one DC/DC conversion unit, and the DC/DC conversion unit has a unidirectional step-up direct current conversion function, a unidirectional step-down direct current conversion function, a bidirectional step-up/step-down direct current conversion function, or a unidirectional step-up and reverse step-down direct current conversion function. An input terminal of the DC/DC conversion unit is coupled to the input terminal of the energy combiner apparatus, three output terminals of the DC/DC conversion unit are coupled to the three output terminals of the energy combiner apparatus, and the output terminals of the DC/DC conversion unit include a positive output terminal of the DC/DC conversion unit, a negative output terminal of the DC/DC conversion unit, and an output-voltage intermediate-potential output terminal of the DC/DC conversion unit.

With reference to the first aspect, in a possible implementation, the DC/DC conversion unit includes at least one first-stage DC/DC conversion unit and second-stage DC/DC conversion unit. An input terminal of the first-stage DC/DC conversion unit is the input terminal of the DC/DC conversion unit, an output terminal of the second-stage DC/DC conversion unit is an output terminal of the DC/DC conversion unit, and an input terminal of the second-stage DC/DC conversion unit includes a third node, a fourth node, and a fifth node. The third node is coupled to a positive output terminal of the first-stage DC/DC conversion unit and a positive output terminal of the second-stage DC/DC conversion unit, the fourth node is coupled to a negative output terminal of the first-stage DC/DC conversion unit and an output-voltage intermediate-potential output terminal of the second-stage DC/DC conversion unit, the fifth node is coupled to a negative output terminal of the second-stage DC/DC conversion unit, and the second-stage DC/DC conversion unit is configured to transfer energy between the third node and the fourth node to a position between the fourth node and the fifth node, so that an average voltage from the third node to the fifth node is greater than an average voltage from the third node to the fourth node.

With reference to the first aspect, in a possible implementation, the DC/DC conversion unit includes at least one third-stage DC/DC conversion unit and fourth-stage DC/DC conversion unit. An input terminal of the third-stage DC/DC conversion unit is the input terminal of the DC/DC conversion unit, an output terminal of the fourth-stage DC/DC conversion unit is an output terminal of the DC/DC conversion unit, and an input terminal of the fourth-stage DC/DC conversion unit includes a sixth node, a seventh node, and an eighth node. The sixth node is coupled to a positive output terminal of the fourth-stage DC/DC conversion unit, the seventh node is coupled to a positive output terminal of the third-stage DC/DC conversion unit and an output-voltage intermediate-potential output terminal of the fourth-stage DC/DC conversion unit, the eighth node is coupled to a negative output terminal of the third-stage DC/DC conversion unit and a negative output terminal of the fourth-stage DC/DC conversion unit, and the fourth-stage DC/DC conversion unit is configured to transfer energy between the seventh node and the eighth node to a position between the sixth node and the seventh node, so that an average voltage from the sixth node to the eighth node is greater than an average voltage from the seventh node to the eighth node.

With reference to the first aspect, in a possible implementation, the DC/DC conversion unit includes a first-stage DC/DC conversion unit and a second-stage DC/DC conversion unit, output terminals of the first-stage DC/DC conversion unit and the second-stage DC/DC conversion unit are cascaded, one terminal of cascading is used as the positive output terminal of the DC/DC conversion unit, another terminal of cascading is used as the negative output terminal of the DC/DC conversion unit, an intermediate terminal of cascading is used as the output-voltage intermediate-potential output terminal of the DC/DC conversion unit, an input terminal of the first-stage DC/DC conversion unit is used as one input terminal of the DC/DC conversion unit, and an input terminal of the second-stage DC/DC conversion unit is used as the other input terminal of the DC/DC conversion unit.

With reference to the first aspect, in a possible implementation, the energy combiner apparatus includes at least one DC/DC conversion unit. Input terminals of the DC/DC conversion unit are coupled to some input terminals of the energy combiner apparatus, a positive output terminal of the DC/DC conversion unit is coupled to a positive output terminal of the energy combiner apparatus, a negative output terminal of the DC/DC conversion unit is coupled to an output-voltage intermediate-potential output terminal of the energy combiner apparatus and a positive terminal in at least one other input terminal of the energy combiner apparatus, and a negative output terminal of the energy combiner apparatus is coupled to a negative terminal in the at least one other input terminal of the energy combiner apparatus; or input terminals of the DC/DC conversion unit are coupled to some input terminals of the energy combiner apparatus, a negative output terminal of the DC/DC conversion unit is coupled to a negative output terminal of the energy combiner apparatus, a positive output terminal of the DC/DC conversion unit is coupled to an output-voltage intermediate-potential output terminal of the energy combiner apparatus and a negative terminal in at least one other input terminal of the energy combiner apparatus, and a positive output terminal of the energy combiner apparatus is coupled to a positive terminal in the at least one other input terminal of the energy combiner apparatus.

With reference to the first aspect, in a possible implementation, the energy combiner apparatus includes at least one combiner unit. An input terminal of the combiner unit is coupled to the input terminal of the energy combiner apparatus, and three output terminals of the combiner unit are respectively coupled to the three output terminals of the energy combiner apparatus.

According to a second aspect, an embodiment may provide a power supply system, including one three-phase phase circuit connected to a grid through a star or delta connection, at least one first power supply, and at least one energy combiner apparatus. The three-phase phase circuit includes a plurality of direct current/three-phase alternating current conversion combinations and three phase filter units, same-type output terminals of the plurality of direct current/three-phase alternating current conversion combinations are separately cascaded, three terminals of cascading are connected to input terminals of the three phase filter units, output terminals of the three phase filter units are used as a first output terminal, a second output terminal, and a third output terminal of the three-phase phase circuit, and the other three terminals of cascading are respectively used as the other three output terminals of the three-phase phase circuit. The direct current/three-phase alternating current conversion combination includes a first-stage isolation DC/AC conversion unit and a second-stage isolation DC/AC conversion unit, the first-stage isolation DC/AC conversion unit has three pairs of output terminals, the second-stage isolation DC/AC conversion unit has three pairs of output terminals, three output terminals of the first-stage isolation DC/AC conversion unit and three output terminals of the second-stage isolation DC/AC conversion unit are respectively cascaded, three terminals of cascading are used as three output terminals of the direct current/alternating current conversion combination, and the other three terminals of cascading are used as the other three output terminals of the direct current/alternating current conversion combination. A first input terminal of the first-stage isolation DC/AC conversion unit is used as a first input terminal of the direct current/three-phase alternating current conversion combination, a second input terminal of the first-stage isolation DC/AC conversion unit is coupled to a first input terminal of the second-stage isolation DC/AC conversion unit, a coupling node is used as a second input terminal of the direct current/three-phase alternating current conversion combination, and a second input terminal of the second-stage isolation DC/AC conversion unit is used as a third input terminal of the direct current/three-phase alternating current conversion combination. An input terminal of the energy combiner apparatus is coupled to an output terminal of at least one first power supply, and the three input terminals of the direct current/three-phase alternating current conversion combination are coupled to three output terminals of at least one energy combiner apparatus. In this embodiment, the energy combiner apparatus is used to convert output of the power supply, and has three output terminals, so that output ports are increased. In the three output terminals of the energy combiner apparatus, a voltage of 1500 V is output between a first output terminal and a second output terminal, a voltage of 1500 V is also output between the second output terminal and a third output terminal, and a total of 3 kV is output. Therefore, an overall output voltage is increased in a case of equal output power. Because the overall output voltage is increased, a current transmitted on a cable may be reduced. Therefore, a thinner cable may be used, so that costs of the cable are reduced. In addition, four cables conventionally required for connecting to the output terminals of the energy combiner apparatus are reduced to three cables, so that a quantity and costs are reduced.

With reference to the second aspect, in a possible implementation, the energy combiner apparatus includes at least one DC/DC conversion unit, and the DC/DC conversion unit has a unidirectional step-up direct current conversion function, a unidirectional step-down direct current conversion function, a bidirectional step-up/step-down direct current conversion function, or a unidirectional step-up and reverse step-down direct current conversion function. An input terminal of the DC/DC conversion unit is coupled to the input terminal of the energy combiner apparatus, three output terminals of the DC/DC conversion unit are coupled to the three output terminals of the energy combiner apparatus, and the output terminals of the DC/DC conversion unit include a positive output terminal of the DC/DC conversion unit, a negative output terminal of the DC/DC conversion unit, and an output-voltage intermediate-potential output terminal of the DC/DC conversion unit.

With reference to the second aspect, in a possible implementation, the DC/DC conversion unit includes at least one first-stage DC/DC conversion unit and second-stage DC/DC conversion unit. An input terminal of the first-stage DC/DC conversion unit is the input terminal of the DC/DC conversion unit, an output terminal of the second-stage DC/DC conversion unit is an output terminal of the DC/DC conversion unit, and an input terminal of the second-stage DC/DC conversion unit includes a third node, a fourth node, and a fifth node. The third node is coupled to a positive output terminal of the first-stage DC/DC conversion unit and a positive output terminal of the second-stage DC/DC conversion unit, the fourth node is coupled to a negative output terminal of the first-stage DC/DC conversion unit and an output-voltage intermediate-potential output terminal of the second-stage DC/DC conversion unit, the fifth node is coupled to a negative output terminal of the second-stage DC/DC conversion unit, and the second-stage DC/DC conversion unit is configured to transfer energy between the third node and the fourth node to a position between the fourth node and the fifth node, so that an average voltage from the third node to the fifth node is greater than an average voltage from the third node to the fourth node.

With reference to the second aspect, in a possible implementation, the DC/DC conversion unit includes at least one third-stage DC/DC conversion unit and fourth-stage DC/DC conversion unit. An input terminal of the third-stage DC/DC conversion unit is the input terminal of the DC/DC conversion unit, an output terminal of the fourth-stage DC/DC conversion unit is an output terminal of the DC/DC conversion unit, and an input terminal of the fourth-stage DC/DC conversion unit includes a sixth node, a seventh node, and an eighth node. The sixth node is coupled to a positive output terminal of the fourth-stage DC/DC conversion unit, the seventh node is coupled to a positive output terminal of the third-stage DC/DC conversion unit and an output-voltage intermediate-potential output terminal of the fourth-stage DC/DC conversion unit, the eighth node is coupled to a negative output terminal of the third-stage DC/DC conversion unit and a negative output terminal of the fourth-stage DC/DC conversion unit, and the fourth-stage DC/DC conversion unit is configured to transfer energy between the seventh node and the eighth node to a position between the sixth node and the seventh node, so that an average voltage from the sixth node to the eighth node is greater than an average voltage from the seventh node to the eighth node.

With reference to the second aspect, in a possible implementation, the DC/DC conversion unit includes a first-stage DC/DC conversion unit and a second-stage DC/DC conversion unit, output terminals of the first-stage DC/DC conversion unit and the second-stage DC/DC conversion unit are cascaded, one terminal of cascading is used as the positive output terminal of the DC/DC conversion unit, another terminal of cascading is used as the negative output terminal of the DC/DC conversion unit, an intermediate terminal of cascading is used as the output-voltage intermediate-potential output terminal of the DC/DC conversion unit, an input terminal of the first-stage DC/DC conversion unit is used as one input terminal of the DC/DC conversion unit, and an input terminal of the second-stage DC/DC conversion unit is used as the other input terminal of the DC/DC conversion unit.

With reference to the second aspect, in a possible implementation, the energy combiner apparatus includes at least one DC/DC conversion unit. Input terminals of the DC/DC conversion unit are coupled to some input terminals of the energy combiner apparatus, a positive output terminal of the DC/DC conversion unit is coupled to a positive output terminal of the energy combiner apparatus, a negative output terminal of the DC/DC conversion unit is coupled to an output-voltage intermediate-potential output terminal of the energy combiner apparatus and a positive terminal in at least one other input terminal of the energy combiner apparatus, and a negative output terminal of the energy combiner apparatus is coupled to a negative terminal in the at least one other input terminal of the energy combiner apparatus; or input terminals of the DC/DC conversion unit are coupled to some input terminals of the energy combiner apparatus, a negative output terminal of the DC/DC conversion unit is coupled to a negative output terminal of the energy combiner apparatus, a positive output terminal of the DC/DC conversion unit is coupled to an output-voltage intermediate-potential output terminal of the energy combiner apparatus and a negative terminal in at least one other input terminal of the energy combiner apparatus, and a positive output terminal of the energy combiner apparatus is coupled to a positive terminal in the at least one other input terminal of the energy combiner apparatus.

With reference to the second aspect, in a possible implementation, the energy combiner apparatus includes at least one combiner unit. An input terminal of the combiner unit is coupled to the input terminal of the energy combiner apparatus, and three output terminals of the combiner unit are respectively coupled to the three output terminals of the energy combiner apparatus.

According to a third aspect, an embodiment may provide a power supply system, including at least one high-voltage cascade circuit, at least one first power supply, at least one energy combiner apparatus, and three phase circuits. The high-voltage cascade circuit includes a plurality of direct current/direct current conversion combinations, output terminals of the plurality of direct current/direct current conversion combinations are cascaded, one terminal of cascading is used as a first output terminal of the high-voltage cascade circuit, and the other terminal of cascading is used as a second output terminal of the high-voltage cascade circuit. The direct current/direct current conversion combination includes a first-stage isolation DC/DC conversion unit and a second-stage isolation DC/DC conversion unit, output terminals of the first-stage isolation DC/DC conversion unit and the second-stage isolation DC/DC conversion unit are cascaded, one terminal of cascading is used as a first output terminal of the direct current/direct current conversion combination, and the other terminal of cascading is used as a second output terminal of the direct current/direct current conversion combination. A first input terminal of the first-stage isolation DC/DC conversion unit is used as a first input terminal of the direct current/direct current conversion combination, a second input terminal of the first-stage isolation DC/DC conversion unit is coupled to a first input terminal of the second-stage isolation DC/DC conversion unit, a coupling node is used as a second input terminal of the direct current/direct current conversion combination, and a second input terminal of the second-stage isolation DC/DC conversion unit is used as a third input terminal of the direct current/direct current conversion combination. An input terminal of the energy combiner apparatus is coupled to an output terminal of at least one first power supply, and the three input terminals of the direct current/direct current conversion combination are coupled to three output terminals of at least one energy combiner apparatus. Each of the three phase circuits includes an upper bridge arm, a lower bridge arm, an upper inductor unit, and a lower inductor unit, the upper bridge arm and the lower bridge arm each are formed by cascading a plurality of cascaded modules, one terminal of the upper bridge arm is used as a first input terminal of the phase circuit, the other terminal of the upper bridge arm is coupled to an input terminal of the upper inductor unit, one terminal of the lower bridge arm is used as a second input terminal of the phase circuit, the other terminal of the lower bridge arm is coupled to an input terminal of the lower inductor unit, an output terminal of the upper inductor unit is coupled to an output terminal of the lower inductor unit, and a coupling node is used as an output terminal of the phase circuit. Input terminals of the three phase circuits are coupled to output terminals of a same high-voltage cascade circuit, or input terminals of the three phase circuits are respectively coupled to output terminals of three high-voltage cascade circuits. Three output terminals of the three phase circuits are separately coupled to filter units and are then connected to a grid. In this embodiment, the energy combiner apparatus is used to convert output of the power supply, and has three output terminals, so that output ports are increased. In the three output terminals of the energy combiner apparatus, a voltage of 1500 V is output between a first output terminal and a second output terminal, a voltage of 1500 V is also output between the second output terminal and a third output terminal, and a total of 3 kV is output. Therefore, an overall output voltage is increased in a case of equal output power. Because the overall output voltage is increased, a current transmitted on a cable may be reduced. Therefore, a thinner cable may be used, so that costs of the cable are reduced. In addition, four cables conventionally required for connecting to the output terminals of the energy combiner apparatus are reduced to three cables, so that a quantity and costs are reduced.

With reference to the third aspect, in a possible implementation, the energy combiner apparatus includes at least one DC/DC conversion unit, and the DC/DC conversion unit has a unidirectional step-up direct current conversion function, a unidirectional step-down direct current conversion function, a bidirectional step-up/step-down direct current conversion function, or a unidirectional step-up and reverse step-down direct current conversion function. An input terminal of the DC/DC conversion unit is coupled to the input terminal of the energy combiner apparatus, three output terminals of the DC/DC conversion unit are coupled to the three output terminals of the energy combiner apparatus, and the output terminals of the DC/DC conversion unit include a positive output terminal of the DC/DC conversion unit, a negative output terminal of the DC/DC conversion unit, and an output-voltage intermediate-potential output terminal of the DC/DC conversion unit.

With reference to the third aspect, in a possible implementation, the DC/DC conversion unit includes at least one first-stage DC/DC conversion unit and second-stage DC/DC conversion unit. An input terminal of the first-stage DC/DC conversion unit is the input terminal of the DC/DC conversion unit, an output terminal of the second-stage DC/DC conversion unit is an output terminal of the DC/DC conversion unit, and an input terminal of the second-stage DC/DC conversion unit includes a third node, a fourth node, and a fifth node. The third node is coupled to a positive output terminal of the first-stage DC/DC conversion unit and a positive output terminal of the second-stage DC/DC conversion unit, the fourth node is coupled to a negative output terminal of the first-stage DC/DC conversion unit and an output-voltage intermediate-potential output terminal of the second-stage DC/DC conversion unit, the fifth node is coupled to a negative output terminal of the second-stage DC/DC conversion unit, and the second-stage DC/DC conversion unit is configured to transfer energy between the third node and the fourth node to a position between the fourth node and the fifth node, so that an average voltage from the third node to the fifth node is greater than an average voltage from the third node to the fourth node.

With reference to the third aspect, in a possible implementation, the DC/DC conversion unit includes at least one third-stage DC/DC conversion unit and fourth-stage DC/DC conversion unit. An input terminal of the third-stage DC/DC conversion unit is the input terminal of the DC/DC conversion unit, an output terminal of the fourth-stage DC/DC conversion unit is an output terminal of the DC/DC conversion unit, and an input terminal of the fourth-stage DC/DC conversion unit includes a sixth node, a seventh node, and an eighth node. The sixth node is coupled to a positive output terminal of the fourth-stage DC/DC conversion unit, the seventh node is coupled to a positive output terminal of the third-stage DC/DC conversion unit and an output-voltage intermediate-potential output terminal of the fourth-stage DC/DC conversion unit, the eighth node is coupled to a negative output terminal of the third-stage DC/DC conversion unit and a negative output terminal of the fourth-stage DC/DC conversion unit, and the fourth-stage DC/DC conversion unit is configured to transfer energy between the seventh node and the eighth node to a position between the sixth node and the seventh node, so that an average voltage from the sixth node to the eighth node is greater than an average voltage from the seventh node to the eighth node.

With reference to the third aspect, in a possible implementation, the DC/DC conversion unit includes a first-stage DC/DC conversion unit and a second-stage DC/DC conversion unit, output terminals of the first-stage DC/DC conversion unit and the second-stage DC/DC conversion unit are cascaded, one terminal of cascading is used as the positive output terminal of the DC/DC conversion unit, another terminal of cascading is used as the negative output terminal of the DC/DC conversion unit, an intermediate terminal of cascading is used as the output-voltage intermediate-potential output terminal of the DC/DC conversion unit, an input terminal of the first-stage DC/DC conversion unit is used as one input terminal of the DC/DC conversion unit, and an input terminal of the second-stage DC/DC conversion unit is used as the other input terminal of the DC/DC conversion unit.

With reference to the third aspect, in a possible implementation, the energy combiner apparatus includes at least one DC/DC conversion unit. Input terminals of the DC/DC conversion unit are coupled to some input terminals of the energy combiner apparatus, a positive output terminal of the DC/DC conversion unit is coupled to a positive output terminal of the energy combiner apparatus, a negative output terminal of the DC/DC conversion unit is coupled to an output-voltage intermediate-potential output terminal of the energy combiner apparatus and a positive terminal in at least one other input terminal of the energy combiner apparatus, and a negative output terminal of the energy combiner apparatus is coupled to a negative terminal in the at least one other input terminal of the energy combiner apparatus; or input terminals of the DC/DC conversion unit are coupled to some input terminals of the energy combiner apparatus, a negative output terminal of the DC/DC conversion unit is coupled to a negative output terminal of the energy combiner apparatus, a positive output terminal of the DC/DC conversion unit is coupled to an output-voltage intermediate-potential output terminal of the energy combiner apparatus and a negative terminal in at least one other input terminal of the energy combiner apparatus, and a positive output terminal of the energy combiner apparatus is coupled to a positive terminal in the at least one other input terminal of the energy combiner apparatus.

With reference to the third aspect, in a possible implementation, the energy combiner apparatus includes at least one combiner unit. An input terminal of the combiner unit is coupled to the input terminal of the energy combiner apparatus, and three output terminals of the combiner unit are respectively coupled to the three output terminals of the energy combiner apparatus.

According to a fourth aspect, an embodiment may provide a power supply system, including a high-voltage cascade circuit, at least one first power supply, at least one energy combiner apparatus, and a three-phase phase circuit. The high-voltage cascade circuit includes a plurality of direct current/direct current conversion combinations, output terminals of the plurality of direct current/direct current conversion combinations are cascaded, one terminal of cascading is used as a first output terminal of the high-voltage cascade circuit, and the other terminal of cascading is used as a second output terminal of the high-voltage cascade circuit. The direct current/direct current conversion combination includes a first-stage isolation DC/DC conversion unit and a second-stage isolation DC/DC conversion unit, output terminals of the first-stage isolation DC/DC conversion unit and the second-stage isolation DC/DC conversion unit are cascaded, one terminal of cascading is used as a first output terminal of the direct current/direct current conversion combination, and the other terminal of cascading is used as a second output terminal of the direct current/direct current conversion combination. A first input terminal of the first-stage isolation DC/DC conversion unit is used as a first input terminal of the direct current/direct current conversion combination, a second input terminal of the first-stage isolation DC/DC conversion unit is coupled to a first input terminal of the second-stage isolation DC/DC conversion unit, a coupling node is used as a second input terminal of the direct current/direct current conversion combination, and a second input terminal of the second-stage isolation DC/DC conversion unit is used as a third input terminal of the direct current/direct current conversion combination. An input terminal of the energy combiner apparatus is coupled to an output terminal of at least one first power supply, and the three input terminals of the direct current/direct current conversion combination are coupled to three output terminals of at least one energy combiner apparatus. The three-phase phase circuit includes a three-phase upper bridge arm, a three-phase lower bridge arm, three upper inductor units, and three lower inductor units, the three-phase upper bridge arm and the three-phase lower bridge arm each are formed by cascading a plurality of three-phase cascaded modules, one terminal of the three-phase upper bridge arm is used as a first input terminal of the three-phase phase circuit, the other three terminals of the three-phase upper bridge arm are coupled to input terminals of the three upper inductor units, one terminal of the three-phase lower bridge arm is used as a second input terminal of the three-phase phase circuit, the other terminal of the three-phase lower bridge arm is coupled to input terminals of the three lower inductor units, output terminals of the three upper inductor units are respectively coupled to output terminals of the three lower inductor units, and three coupling nodes are used as three output terminals of the three-phase phase circuit. The output terminals of the high-voltage cascade circuit are coupled to the input terminals of the three-phase phase circuit. The three output terminals of the three-phase phase circuit are separately coupled to filter units and are then connected to a grid. In this embodiment, the energy combiner apparatus is used to convert output of the power supply, and has three output terminals, so that output ports are increased. In the three output terminals of the energy combiner apparatus, a voltage of 1500 V is output between a first output terminal and a second output terminal, a voltage of 1500 V is also output between the second output terminal and a third output terminal, and a total of 3 kV is output. Therefore, an overall output voltage is increased in a case of equal output power. Because the overall output voltage is increased, a current transmitted on a cable may be reduced. Therefore, a thinner cable may be used, so that costs of the cable are reduced. In addition, four cables conventionally required for connecting to the output terminals of the energy combiner apparatus are reduced to three cables, so that a quantity and costs are reduced.

With reference to the fourth aspect, in a possible implementation, the energy combiner apparatus includes at least one DC/DC conversion unit, and the DC/DC conversion unit has a unidirectional step-up direct current conversion function, a unidirectional step-down direct current conversion function, a bidirectional step-up/step-down direct current conversion function, or a unidirectional step-up and reverse step-down direct current conversion function. An input terminal of the DC/DC conversion unit is coupled to the input terminal of the energy combiner apparatus, three output terminals of the DC/DC conversion unit are coupled to the three output terminals of the energy combiner apparatus, and the output terminals of the DC/DC conversion unit include a positive output terminal of the DC/DC conversion unit, a negative output terminal of the DC/DC conversion unit, and an output-voltage intermediate-potential output terminal of the DC/DC conversion unit.

With reference to the fourth aspect, in a possible implementation, the DC/DC conversion unit includes at least one first-stage DC/DC conversion unit and second-stage DC/DC conversion unit. An input terminal of the first-stage DC/DC conversion unit is the input terminal of the DC/DC conversion unit, an output terminal of the second-stage DC/DC conversion unit is an output terminal of the DC/DC conversion unit, and an input terminal of the second-stage DC/DC conversion unit includes a third node, a fourth node, and a fifth node. The third node is coupled to a positive output terminal of the first-stage DC/DC conversion unit and a positive output terminal of the second-stage DC/DC conversion unit, the fourth node is coupled to a negative output terminal of the first-stage DC/DC conversion unit and an output-voltage intermediate-potential output terminal of the second-stage DC/DC conversion unit, the fifth node is coupled to a negative output terminal of the second-stage DC/DC conversion unit, and the second-stage DC/DC conversion unit is configured to transfer energy between the third node and the fourth node to a position between the fourth node and the fifth node, so that an average voltage from the third node to the fifth node is greater than an average voltage from the third node to the fourth node.

With reference to the fourth aspect, in a possible implementation, the DC/DC conversion unit includes at least one third-stage DC/DC conversion unit and fourth-stage DC/DC conversion unit. An input terminal of the third-stage DC/DC conversion unit is the input terminal of the DC/DC conversion unit, an output terminal of the fourth-stage DC/DC conversion unit is an output terminal of the DC/DC conversion unit, and an input terminal of the fourth-stage DC/DC conversion unit includes a sixth node, a seventh node, and an eighth node. The sixth node is coupled to a positive output terminal of the fourth-stage DC/DC conversion unit, the seventh node is coupled to a positive output terminal of the third-stage DC/DC conversion unit and an output-voltage intermediate-potential output terminal of the fourth-stage DC/DC conversion unit, the eighth node is coupled to a negative output terminal of the third-stage DC/DC conversion unit and a negative output terminal of the fourth-stage DC/DC conversion unit, and the fourth-stage DC/DC conversion unit is configured to transfer energy between the seventh node and the eighth node to a position between the sixth node and the seventh node, so that an average voltage from the sixth node to the eighth node is greater than an average voltage from the seventh node to the eighth node.

With reference to the fourth aspect, in a possible implementation, the DC/DC conversion unit includes a first-stage DC/DC conversion unit and a second-stage DC/DC conversion unit, output terminals of the first-stage DC/DC conversion unit and the second-stage DC/DC conversion unit are cascaded, one terminal of cascading is used as the positive output terminal of the DC/DC conversion unit, another terminal of cascading is used as the negative output terminal of the DC/DC conversion unit, an intermediate terminal of cascading is used as the output-voltage intermediate-potential output terminal of the DC/DC conversion unit, an input terminal of the first-stage DC/DC conversion unit is used as one input terminal of the DC/DC conversion unit, and an input terminal of the second-stage DC/DC conversion unit is used as the other input terminal of the DC/DC conversion unit.

With reference to the fourth aspect, in a possible implementation, the energy combiner apparatus includes at least one DC/DC conversion unit. Input terminals of the DC/DC conversion unit are coupled to some input terminals of the energy combiner apparatus, a positive output terminal of the DC/DC conversion unit is coupled to a positive output terminal of the energy combiner apparatus, a negative output terminal of the DC/DC conversion unit is coupled to an output-voltage intermediate-potential output terminal of the energy combiner apparatus and a positive terminal in at least one other input terminal of the energy combiner apparatus, and a negative output terminal of the energy combiner apparatus is coupled to a negative terminal in the at least one other input terminal of the energy combiner apparatus; or input terminals of the DC/DC conversion unit are coupled to some input terminals of the energy combiner apparatus, a negative output terminal of the DC/DC conversion unit is coupled to a negative output terminal of the energy combiner apparatus, a positive output terminal of the DC/DC conversion unit is coupled to an output-voltage intermediate-potential output terminal of the energy combiner apparatus and a negative terminal in at least one other input terminal of the energy combiner apparatus, and a positive output terminal of the energy combiner apparatus is coupled to a positive terminal in the at least one other input terminal of the energy combiner apparatus.

With reference to the fourth aspect, in a possible implementation, the energy combiner apparatus includes at least one combiner unit. An input terminal of the combiner unit is coupled to the input terminal of the energy combiner apparatus, and three output terminals of the combiner unit are respectively coupled to the three output terminals of the energy combiner apparatus.

BRIEF DESCRIPTION OF THE DRAWINGS

FIG. 4d-1 is a schematic diagram in which power supplies share a common negative terminal according to an embodiment;

FIG. 4d-2 is a schematic diagram in which power supplies share a common positive terminal according to an embodiment;

FIG. 4e is a schematic diagram 5 of an energy combiner apparatus according to an embodiment;

DETAILED DESCRIPTION OF THE EMBODIMENTS

The following describes in detail the embodiments with reference to the accompanying drawings.

Figure 1:
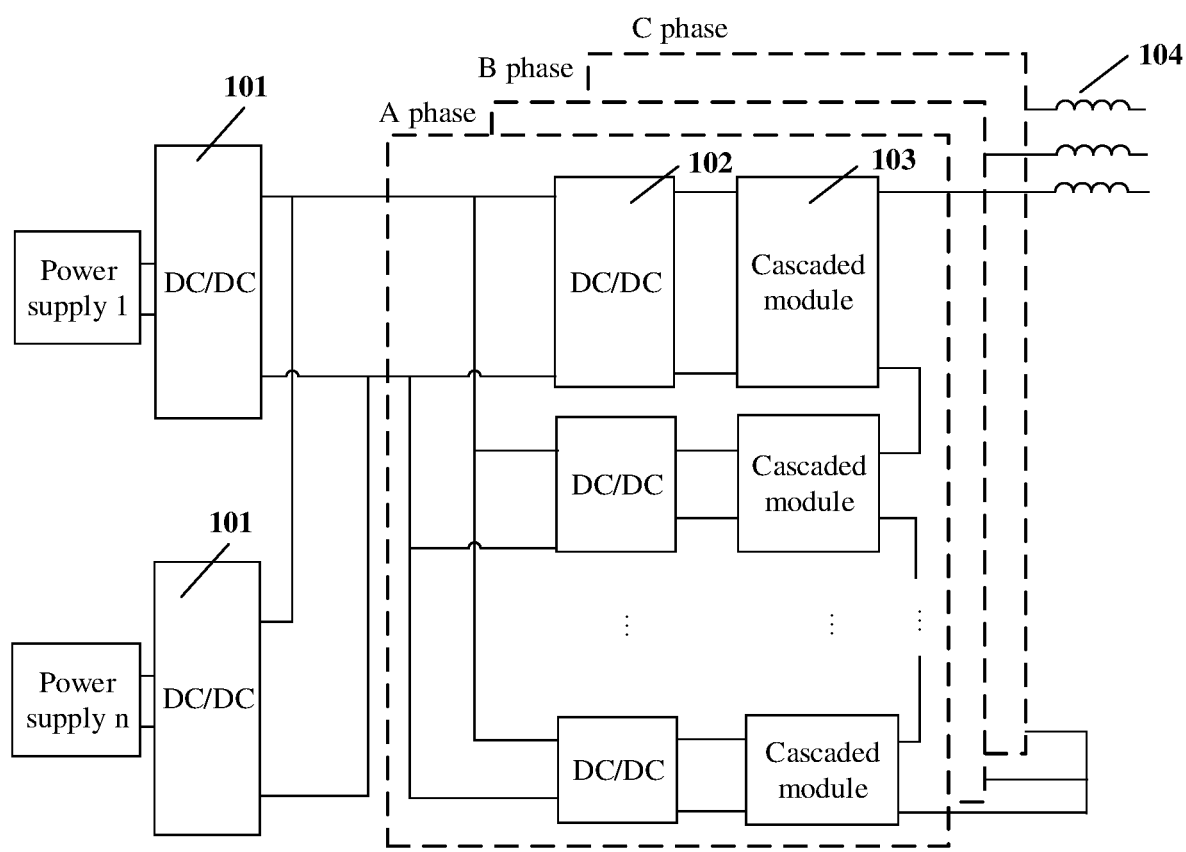
FIG. 1 is a schematic diagram of an existing energy conversion system.

FIG. 1 is a schematic diagram of an existing energy conversion system. The energy conversion system includes two parts: an energy collection direct current bus and a solid-state transformer. In the energy collection direct current bus, photovoltaic panel strings are connected in series and parallel to form a photovoltaic string, configured to convert solar energy into direct current electric energy. A plurality of photovoltaic strings may be connected to a DC/DC conversion module 101 to implement conversion of a direct current voltage output by the photovoltaic string. A direct current bus is constructed at an output terminal of the DC/DC conversion module 101, and a plurality of DC/DC conversion modules 101 are connected on the direct current bus in parallel to provide energy for the direct current bus. In the energy conversion system, the solid-state transformer includes three phase circuits connected to a grid through a star or delta connection. Input terminals of high-voltage isolation DC/DC converters 102 in the phase circuit are all connected to the direct current bus, and output terminals of the high-voltage isolation DC/DC converters 102 are connected to single-phase cascaded modules 103. The single-phase cascaded module 103 implements a DC/AC conversion function. Output terminals of the single-phase cascaded modules 103 are connected in series to implement accumulation of output voltages of the single-phase cascaded modules 103, so that a grid-connected voltage of at least 10 kV is reached. The output terminals of the single-phase cascaded modules 103 are connected to the grid by using filter modules 104, so that energy is finally fed into the grid.

In the solution shown in FIG. 1, a high-voltage grid connection is implemented by connecting the cascaded modules in series, so that a problem that an existing low-voltage inverter steps up a voltage and performs a grid connection by using an isolation transformer is well resolved. A grid-connected voltage of the existing isolation transformer is usually 400 VAC or 800 VAC. To well connect to a medium-voltage grid of at least 10 kV, a step-up transformer for converting 400 VAC to 10 kV or 800 VAC to at least 10 kV is usually used at an output terminal of the inverter, so that energy is finally fed into the medium-voltage grid. After the step-up transformer is omitted, power generation costs of the system are reduced, so that benefits are brought to customers.

However, the foregoing solution also has the following problems: Because an applied maximum system voltage of an existing panel is 1500 V, to ensure operation safety of the panel, a maximum voltage of a direct current bus of the panel is 1500 V. In a case of same direct current bus power, because the bus voltage is low, a current is high, a diameter of a cable on a direct current side becomes larger, and costs on the direct current side are high.

In addition, the solid-state transformer uses three independent phase circuits, cascaded modules in the phase circuits are single-phase DC/AC conversion units, and correspondingly, an internal direct current-side ripple current frequency is twice a grid-connected voltage frequency. Consequently, a direct current-side ripple current value is large, a large capacitance of a filter capacitor is required, and costs are high.

Figure 2:
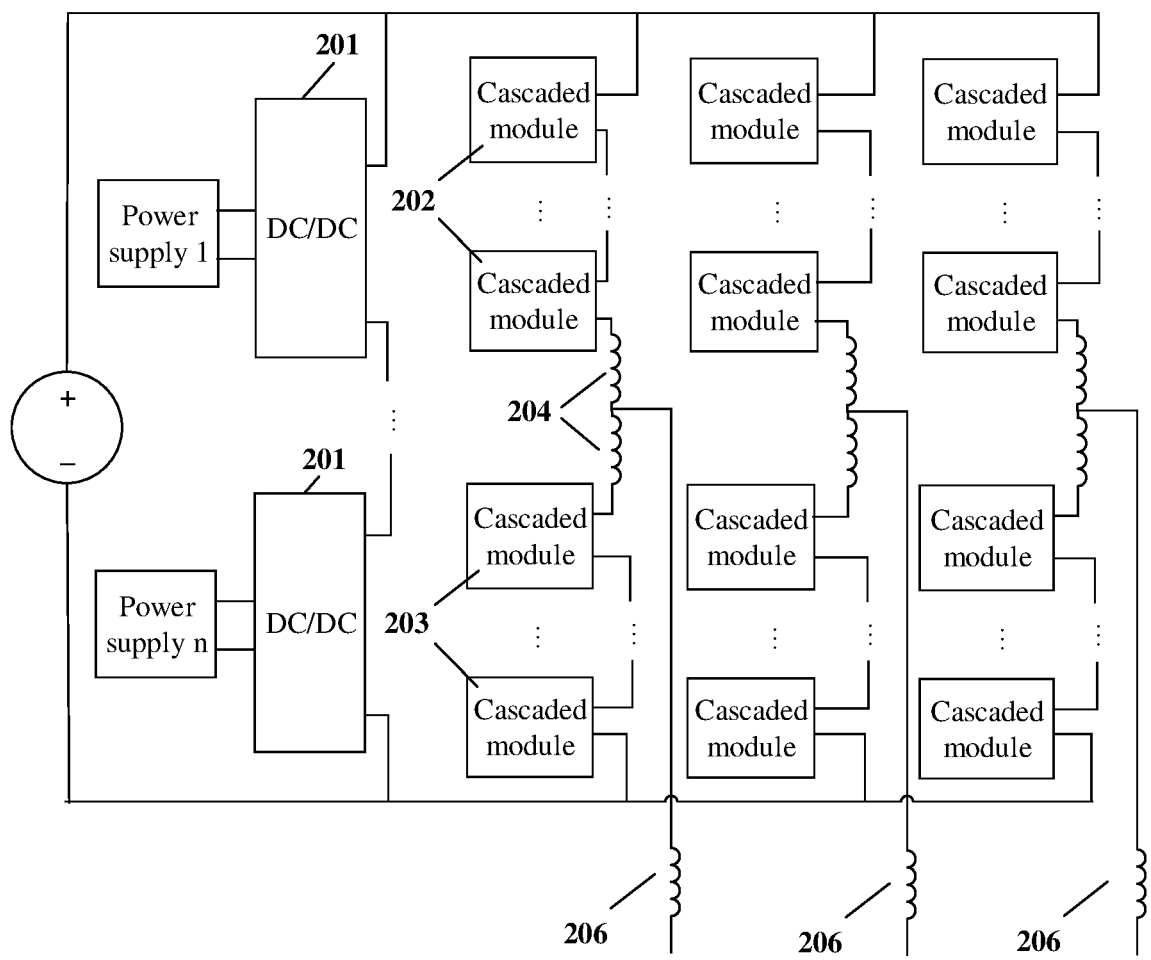
FIG. 2 is a schematic diagram of an existing alternating current-direct current hybrid photovoltaic power system.

FIG. 2 is a schematic diagram of an existing alternating current-direct current hybrid photovoltaic power system. The energy conversion system includes two parts: an energy collection direct current bus and a solid-state transformer. In the energy collection direct current bus, outputs of single photovoltaic panels are first connected to optimizers, and then output terminals of the optimizers are connected in series to form a photovoltaic string. The optimizer implements voltage conversion of direct current energy output by the photovoltaic panel, output terminals of the photovoltaic string formed by connecting outputs of the plurality of optimizers in series are connected to isolation DC/DC conversion modules 201, and output sides of the isolation DC/DC conversion modules 201 are connected in series to construct a high-voltage direct current bus. The solid-state transformer includes a three-phase bridge arm circuit for implementing a DC/AC conversion function. A bridge arm circuit of each phase includes upper and lower bridge arms (an upper bridge arm 202 and a lower bridge arm 203) and two inductors (namely, inductor apparatuses 204) connected in series, and a middle point of the inductors connected in series is an output terminal of the bridge arm of each phase. The upper bridge arm and the lower bridge arm each include a plurality of cascaded modules connected in series, and different levels are generated through control, and act on corresponding inductors, to form high-voltage alternating currents. Therefore, a grid-connected voltage of at least 10 kV is reached, and a connection to a grid is performed by using a filter unit 206, so that energy is finally fed into the grid.

In the solution shown in FIG. 2, a high-voltage inversion function is implemented by using high-voltage upper and lower bridge arms, so that a problem of stepping up a voltage and performing a grid connection by using a conventional transformer is avoided, thereby reducing costs of the transformer. In addition, outputs of the isolation DC/DC conversion modules are connected in series to construct the high-voltage bus. In this case, a voltage of the high-voltage bus is approximately 15 kV. The isolation may resolve a problem that an applied system voltage of a panel does not exceed 1500 V. However, costs of the solution are still high due to the voltage application problem of the panel.

In addition, the solid-state transformer uses three independent phase circuits, cascaded modules in the phase circuits are single-phase DC/AC conversion units, and correspondingly, an internal direct current-side ripple current frequency is twice a grid-connected voltage frequency. Consequently, a direct current-side ripple current value is large, a large capacitance of a filter capacitor is required, and costs are high.

To resolve the foregoing problems of the photovoltaic power system, the embodiments may provide a power supply system. The power supply system includes the following characteristics.

1. A solid-state transformer is applied to resolve a problem that a conventional photovoltaic power plant inverter feeds energy into a medium-voltage grid by using an isolation step-up transformer, so that costs of the isolation step-up transformer are saved.

2. While an applied maximum system voltage of an existing photovoltaic panel is not exceeded, and a specification of a conventional cable of 3 kV is not exceeded when the cable is applied, a system may reduce costs on a direct current side.

3. To resolve a problem that an effective value of a direct current-side ripple current of a DC/AC conversion module of a conventional solid-state transformer is large, cascaded modules may increase a direct current-side ripple current frequency, reduce an effective ripple current value, and reduce a filter capacitance and costs.

The power supply system is described in detail below by using a plurality of embodiments.

Embodiment 1

Figure 3:
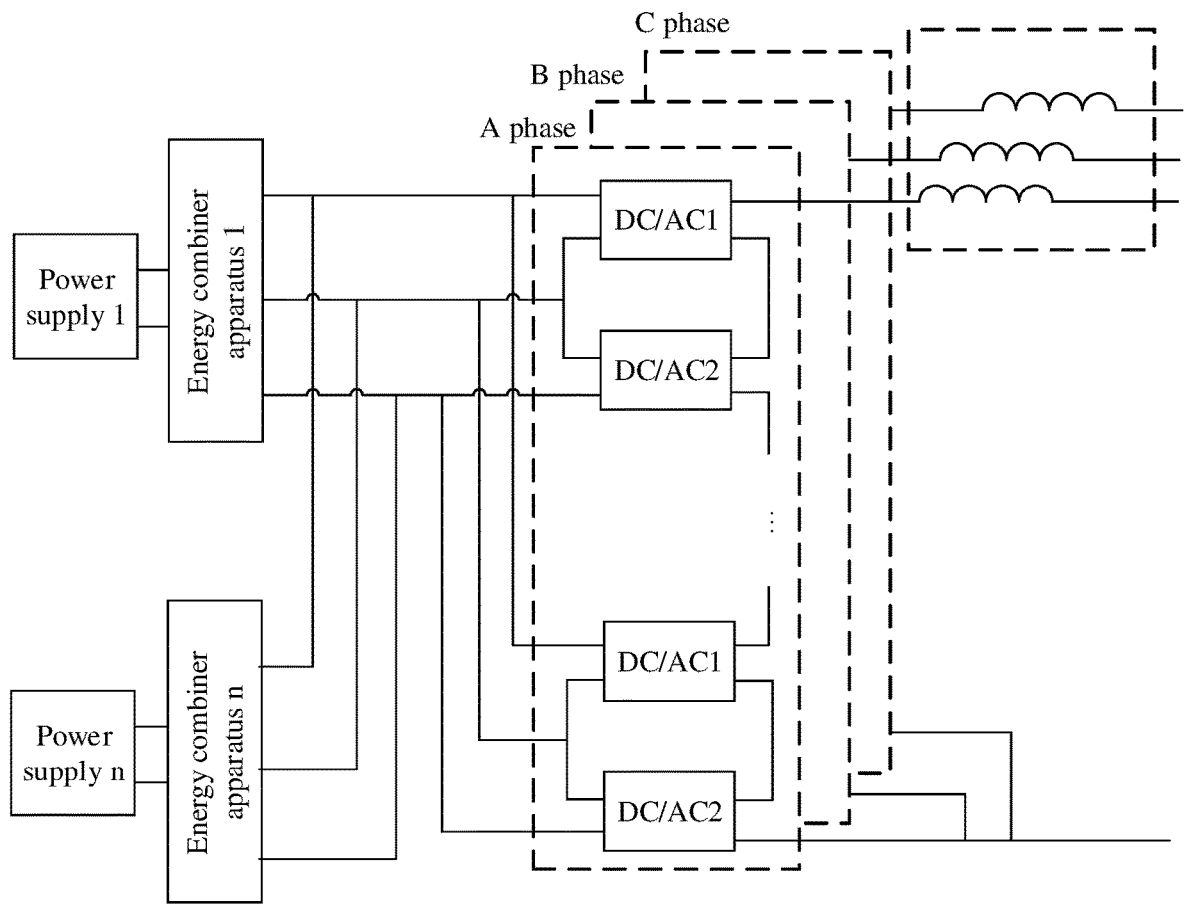
FIG. 3 is a schematic diagram of Embodiment 1 of a power supply system.

FIG. 3 is a schematic diagram of Embodiment 1 of a power supply system. The power supply system includes at least one power supply, at least one energy combiner apparatus, and three phase circuits. One phase circuit includes a plurality of direct current/alternating current conversion combinations. One direct current/alternating current conversion combination includes DC/AC1 and DC/AC2.

First output terminals of the three phase circuits are separately connected to a grid by using filter units. Second output terminals of the three phase circuits are coupled, and may be connected to a phase wire N. The filter unit may be one or a combination of a plurality of filters in an L filter, an LC filter, an LCL filter, and a higher-order filter. In actual application, the filter unit may be alternatively another component that can implement a filtering function. This is not limited in this embodiment. In some embodiments, the three filter units may be combined into one three-phase filter unit, and as an integral apparatus, the three-phase filter unit is connected to three phase wires and outputs three phase wires, to implement a filtering function for the three phase wires. An internal structure of the three-phase filter unit may include three filter units, for example, a structure corresponding to a dashed box at the upper right corner of FIG. 3. This also applies to other schematic diagrams. Details are not repeatedly described.

It may be understood that, in this embodiment, coupling may also be referred to as a coupling connection and may include, but is not limited to, a connection implemented in any combination of manners, for example, by using a switching component, a current-limiting component or a protection component, or through a direct connection using a cable.

In this embodiment, the power supply may be a photovoltaic array and/or an energy storage power supply and/or a wind power generation direct current source, and the photovoltaic array is formed by connecting photovoltaic panels in series and parallel or is formed by connecting outputs of photovoltaic panels to optimizers or shutdown devices and then performing a combination of series and parallel connections. In a photovoltaic power system, the power supply is usually a photovoltaic array. In a hybrid new energy power generation system, the power supply may be a photovoltaic array or a wind power generation direct current source. In actual application, the power supply may be in another form. This is not limited in this embodiment.

In this embodiment, the energy combiner apparatus is used to convert output of the power supply, and has three output terminals, so that output ports are increased. In the three output terminals of the energy combiner apparatus, a voltage of 1500 V is output between a first output terminal and a second output terminal, a voltage of 1500 V is also output between the second output terminal and a third output terminal, and a total of 3 kV is output. Therefore, an overall output voltage is increased in a case of equal output power. Because the overall output voltage is increased, a current transmitted on a cable may be reduced. Therefore, a thinner cable may be used, so that costs of the cable are reduced. In addition, four cables conventionally required for connecting to the output terminals of the energy combiner apparatus are reduced to three cables, so that a quantity and costs are reduced. In actual application, the energy combiner apparatus may include a plurality of forms. A form of the energy combiner apparatus is not limited. In this embodiment, six of the forms are separately described, and are separately shown in FIG. 4a, FIG. 4b, FIG. 4c, FIG. 4d, FIG. 4e, and FIG. 4f.

Figure 4A:
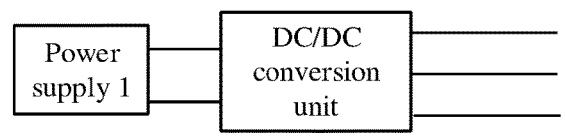
FIG. 4a is a schematic diagram 1 of an energy combiner apparatus according to an embodiment.

FIG. 4a is a schematic diagram 1 of an energy combiner apparatus. In some embodiments, the energy combiner apparatus includes at least one DC/DC conversion unit, and the DC/DC conversion unit has a unidirectional step-up direct current conversion function, a unidirectional step-down direct current conversion function, a bidirectional step-up/step-down direct current conversion function, or a unidirectional step-up and reverse step-down direct current conversion function. An input terminal of the DC/DC conversion unit is coupled to an input terminal of the energy combiner apparatus, three output terminals of the DC/DC conversion unit are coupled to the three output terminals of the energy combiner apparatus, and the output terminals of the DC/DC conversion unit include a positive output terminal of the DC/DC conversion unit, a negative output terminal of the DC/DC conversion unit, and an output-voltage intermediate-potential output terminal of the DC/DC conversion unit. In FIG. 4a, a power supply 1 is coupled to the input terminal of the DC/DC conversion unit, in other words, is coupled to the input terminal of the energy combiner apparatus.

Figure 4B:
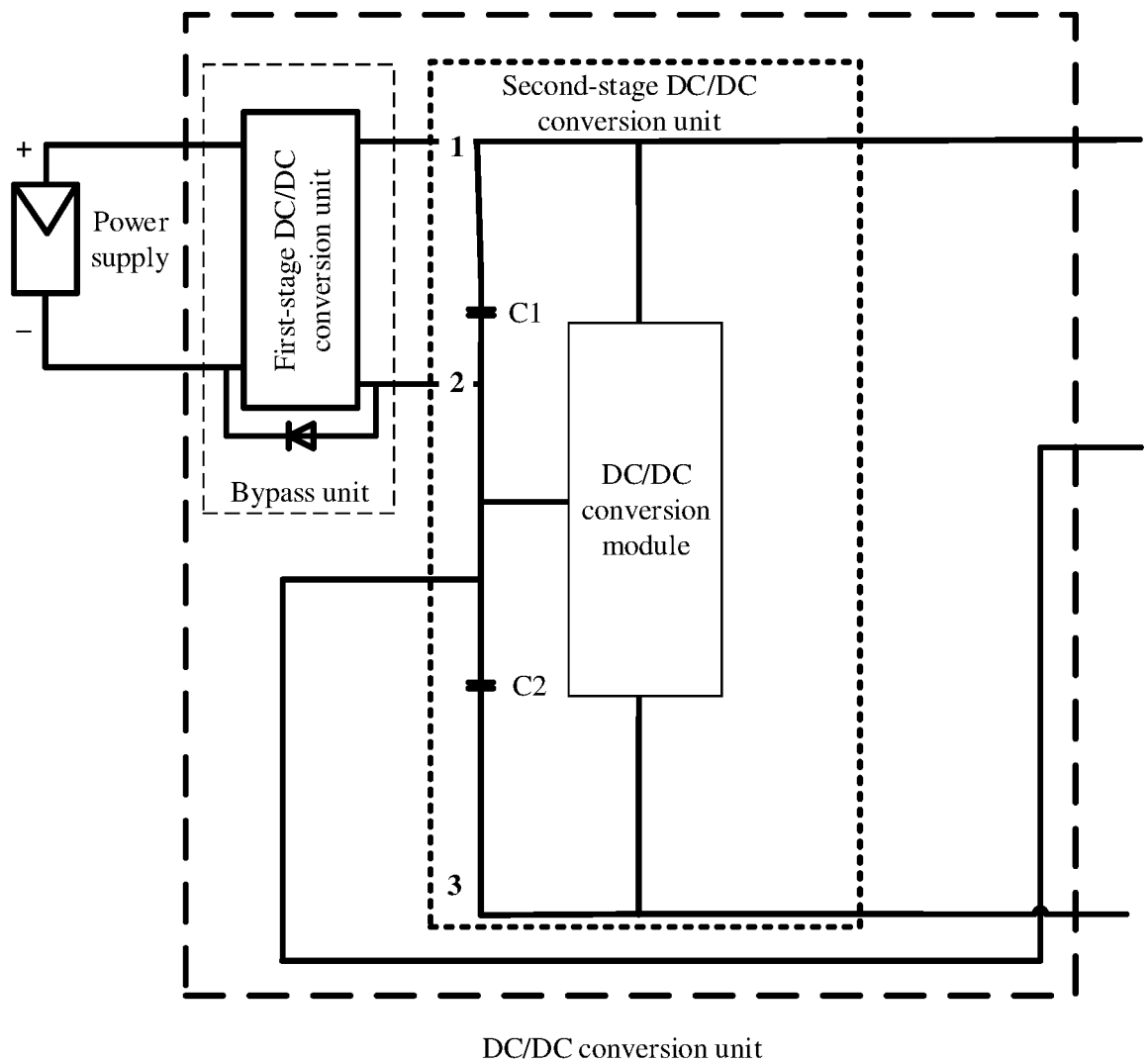
FIG. 4b is a schematic diagram 2 of an energy combiner apparatus according to an embodiment.

FIG. 4b is a schematic diagram 2 of an energy combiner apparatus. In some embodiments, the energy combiner apparatus includes at least one DC/DC conversion unit. The DC/DC conversion unit includes a first-stage DC/DC conversion unit and a second-stage DC/DC conversion unit. It can be understood that an input terminal of the first-stage DC/DC conversion unit is used as an input terminal of the DC/DC conversion unit, and an output terminal of the second-stage DC/DC conversion unit is used as an output terminal of the DC/DC conversion unit. An input terminal of the second-stage DC/DC conversion unit includes a node 1, a node 2, and a node 3. The node 1 is coupled to a positive output terminal of the first-stage DC/DC conversion unit and a positive output terminal of the second-stage DC/DC conversion unit. The node 2 is coupled to a negative output terminal of the first-stage DC/DC conversion unit and an output-voltage intermediate-potential output terminal of the second-stage DC/DC conversion unit, and the node 3 is coupled to a negative output terminal of the second-stage DC/DC conversion unit. The second-stage DC/DC conversion unit includes one DC/DC conversion module. A first terminal of the DC/DC conversion module is coupled to the node 1, a second terminal is coupled to the node 2, and a third terminal is coupled to the node 3. A capacitor C1 is connected in series between the node 1 and the node 2, and a capacitor C2 is connected in series between the node 2 and the node 3. In this embodiment, the second-stage DC/DC conversion unit is configured to transfer energy between the node 1 and the node 2 to a position between the node 2 and the node 3, so that an average voltage from the node 1 to the node 3 is greater than an average voltage from the node 1 to the node 2, thereby balancing a voltage. In this connection manner, maximum output of the first-stage DC/DC conversion unit is 1500 V, and does not exceed a maximum system voltage specification of a panel when the first-stage DC/DC conversion unit is used together with the panel, and the second-stage DC/DC conversion unit increases a voltage of the energy combiner apparatus to 3 kV, so that in a case of equal output power, a value of an output current becomes smaller, a thinner cable can be selected, and system costs can be reduced. In some cases, the negative output terminal of the first-stage DC/DC conversion unit may be coupled to the ground, to enable a voltage to earth of a negative terminal of the PV panel to be equal to 0, stabilize a potential to earth of the negative terminal of the PV panel, and eliminate a PID phenomenon of the panel.

In some embodiments, when an input voltage and/or an input current and/or input power of the first-stage DC/DC conversion unit exceed or exceeds a preset value, the first-stage DC/DC conversion unit works in a bypass mode. For example, as shown in FIG. 4b, a bypass unit is coupled between the input terminal and an output terminal of the first-stage DC/DC conversion unit. When the input voltage and/or the input current and/or the input power of the first-stage DC/DC conversion unit exceed or exceeds the preset value, the first-stage DC/DC conversion unit works in the bypass mode. The bypass mode is as follows: A bypass unit is coupled in parallel between a negative input terminal and the negative output terminal of the first-stage DC/DC conversion unit, and in this case, power is fed into an input side of the second-stage DC/DC conversion unit by using the bypass unit, and the first-stage DC/DC conversion unit stops working. The bypass unit may include a diode, a switch, a relay, a semiconductor switching transistor, or the like. When the bypass unit is a diode, an anode of the diode is coupled to the negative output terminal, and a cathode of the diode is coupled to the negative input terminal. In other embodiments, the bypass unit may be coupled between a positive input terminal and the positive output terminal of the first-stage DC/DC conversion unit. When the bypass unit is a diode, a cathode of the diode is coupled to the positive output terminal, and an anode of the diode is coupled to the positive input terminal.

In some embodiments, when an output voltage and/or an output current and/or output power of the first-stage DC/DC conversion unit exceed or exceeds a preset value, the second-stage DC/DC conversion unit stops working (so that output of the first-stage DC/DC conversion unit directly arrives at a first-stage isolation DC/AC conversion unit or a second-stage isolation DC/AC conversion unit); and/or at least one of the first-stage isolation DC/AC conversion unit and the second-stage isolation DC/AC conversion unit works. In this embodiment, when the input voltage and/or the input current and/or the input power and/or the output voltage and/or the output current and/or the output power of the first-stage DC/DC conversion unit are or is excessively high, a proper unit and/or a proper working mode are or is selected to ensure normal working of the system or avoid unnecessary waste in real time, so that conversion efficiency and utilization of the entire system are improved.

Figure 4C:
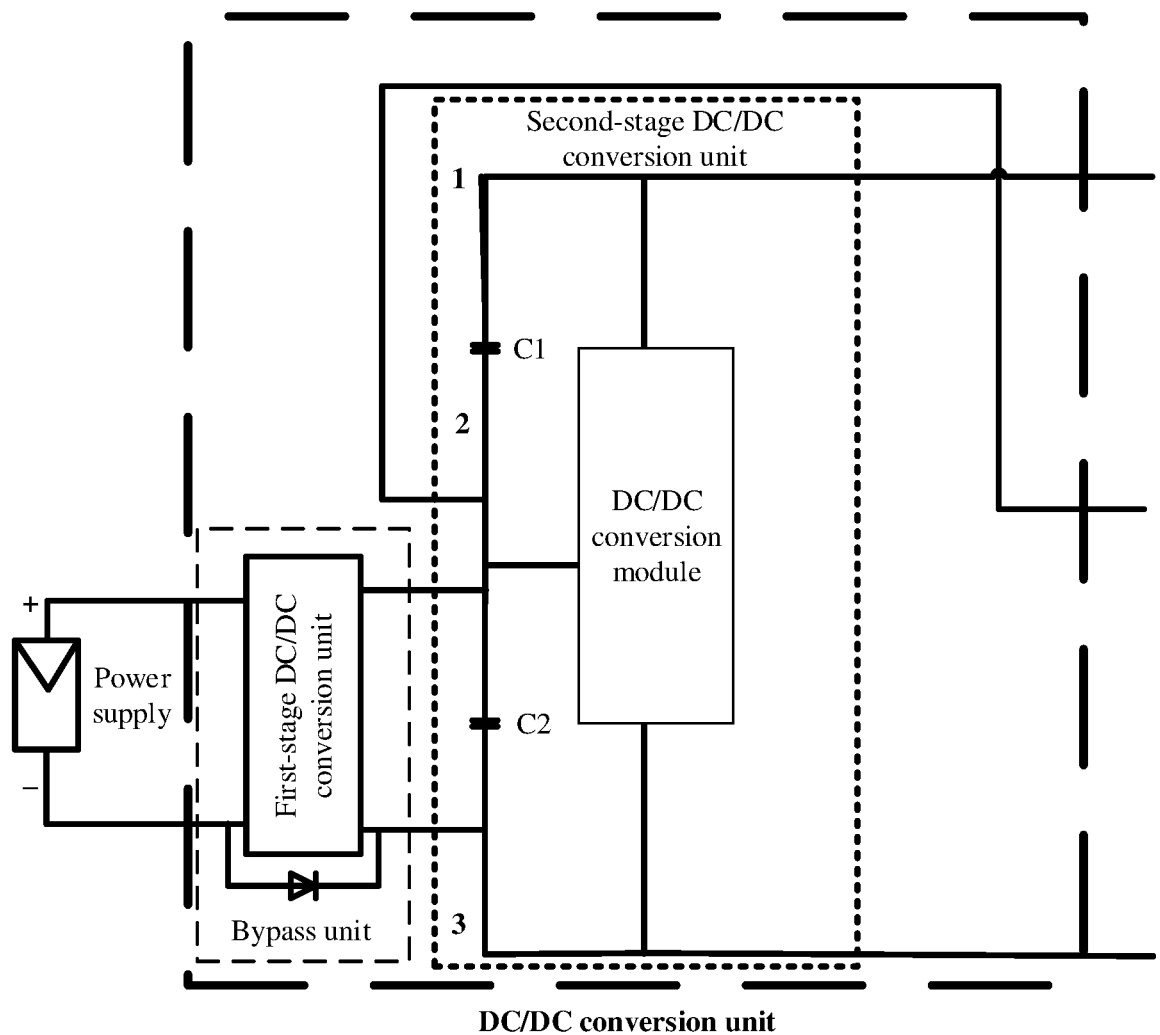
FIG. 4c is a schematic diagram 3 of an energy combiner apparatus according to an embodiment.

FIG. 4c is a schematic diagram 3 of an energy combiner apparatus. In some embodiments, the energy combiner apparatus includes at least one DC/DC conversion unit. The DC/DC conversion unit includes a first-stage DC/DC conversion unit and a second-stage DC/DC conversion unit. It can be understood that an input terminal of the first-stage DC/DC conversion unit is used as an input terminal of the DC/DC conversion unit, and an output terminal of the second-stage DC/DC conversion unit is used as an output terminal of the DC/DC conversion unit. An input terminal of the second-stage DC/DC conversion unit includes a node 1, a node 2, and a node 3. The node 1 is coupled to a positive output terminal of the first-stage DC/DC conversion unit and a positive output terminal of the second-stage DC/DC conversion unit. The node 2 is coupled to a negative output terminal of the first-stage DC/DC conversion unit and an output-voltage intermediate-potential output terminal of the second-stage DC/DC conversion unit, and the node 3 is coupled to a negative output terminal of the second-stage DC/DC conversion unit. In some cases, the second-stage DC/DC conversion unit includes one DC/DC conversion module. A first terminal of the DC/DC conversion module is coupled to the node 1, a second terminal is coupled to the node 2, and a third terminal is coupled to the node 3. A capacitor C1 is connected in series between the node 1 and the node 2, and a capacitor C2 is connected in series between the node 2 and the node 3. In this embodiment, the second-stage DC/DC conversion unit is configured to transfer energy between the node 1 and the node 2 to a position between the node 2 and the node 3, so that an average voltage from the node 1 to the node 3 is greater than an average voltage from the node 1 to the node 2, thereby balancing a voltage. The energy combiner apparatus shown in FIG. 4c can also achieve a same cost reduction effect as that in FIG. 4b. A principle thereof is similar to that in the foregoing descriptions of FIG. 4b, and details not described herein again.

In some embodiments, the first-stage DC/DC conversion unit may be coupled to a bypass unit, so that when an input voltage and/or an input current and/or input power of the first-stage DC/DC conversion unit exceed or exceeds a preset value, the bypass unit causes the first-stage DC/DC conversion unit to work in a bypass mode. A case is similar to that in the foregoing embodiment, and details are not described herein again. In some embodiments, when an output voltage and/or an output current and/or output power of the first-stage DC/DC conversion unit exceed or exceeds a preset value, the second-stage DC/DC conversion unit stops working (so that output of the first-stage DC/DC conversion unit directly arrives at a first-stage isolation DC/AC conversion unit or a second-stage isolation DC/AC conversion unit); and/or at least one of the first-stage isolation DC/AC conversion unit and the second-stage isolation DC/AC conversion unit works. Similar to the foregoing embodiment, when the input voltage and/or the input current and/or the input power and/or the output voltage and/or the output current and/or the output power of the first-stage DC/DC conversion unit are or is excessively high, a proper unit and/or a proper working mode are or is selected to ensure normal working of the system or avoid unnecessary waste in real time, so that conversion efficiency and utilization of the entire system are improved.

Figure 4D:
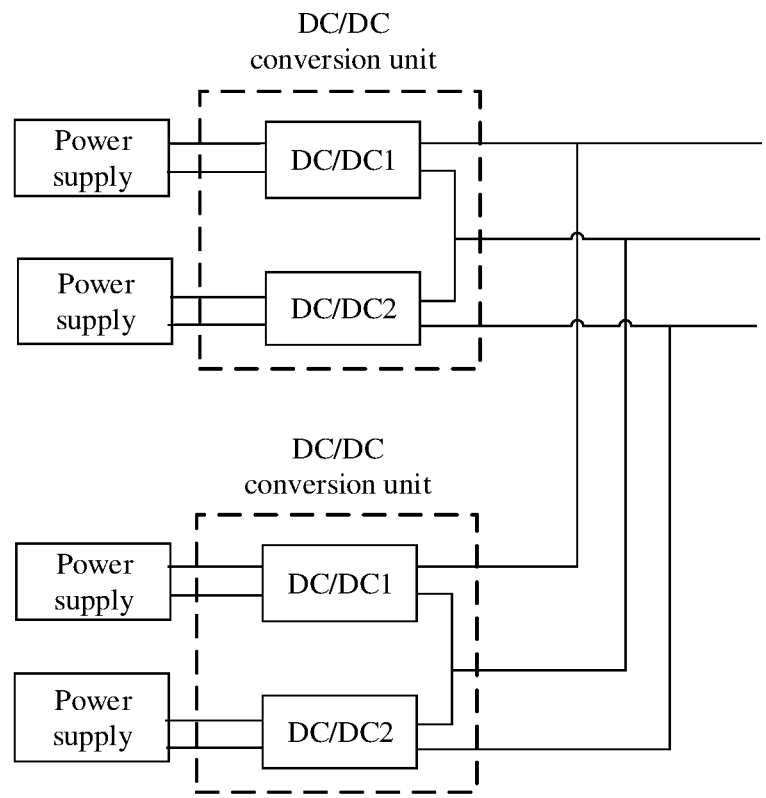
FIG. 4d is a schematic diagram 4 of an energy combiner apparatus according to an embodiment.
Figures 1, 4D:
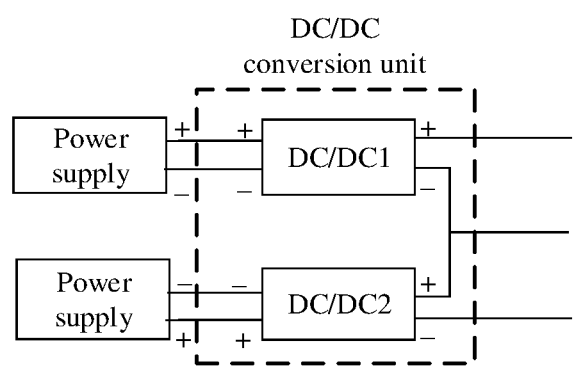

FIG. 4d is a schematic diagram 4 of an energy combiner apparatus. In some embodiments, the energy combiner apparatus includes at least one DC/DC conversion unit. The DC/DC conversion unit includes a first-stage DC/DC conversion unit (DC/DC1 in FIG. 4d) and a second-stage DC/DC conversion unit (DC/DC2 in FIG. 4d). It can be understood that output terminals of the first-stage DC/DC conversion unit and the second-stage DC/DC conversion unit are cascaded, one terminal of cascading is used as a positive output terminal of the DC/DC conversion unit, another terminal of cascading is used as a negative output terminal of the DC/DC conversion unit, an intermediate terminal of cascading is used as an output-voltage intermediate-potential output terminal of the DC/DC conversion unit, an input terminal of the first-stage DC/DC conversion unit is used as one input terminal of the DC/DC conversion unit, and is configured to couple to a power supply, and an input terminal of the second-stage DC/DC conversion unit is used as the other input terminal of the DC/DC conversion unit, and is configured to couple to a power supply. In this connection manner, maximum output of the first-stage DC/DC conversion unit is 1500 V, and does not exceed a maximum system voltage specification of a panel when the first-stage DC/DC conversion unit is used together with the panel, and the second-stage DC/DC conversion unit increases a voltage of the energy combiner apparatus to 3 kV, so that in a case of equal output power, a value of an output current becomes smaller, a thinner cable can be selected, and system costs can be reduced. In addition, four output cables of the energy combiner apparatus can be reduced to three cables, so that system costs are reduced. In some cases, an output neutral wire is coupled to the ground to ensure that the system voltage specification of the panel is not exceeded during application.

It may be understood that, in this embodiment, cascading may also be referred to as a series connection and mean a series connection of circuit units. For example, that the output terminals of the first-stage DC/DC conversion unit and the second-stage DC/DC conversion unit are connected in series means that an output terminal of the first-stage DC/DC conversion unit is coupled to an output terminal of the second-stage DC/DC conversion unit, the other output terminal of the first-stage DC/DC conversion unit is used as one terminal of the series connection, and the other output terminal of the second-stage DC/DC conversion unit is used as the other terminal of the series connection. It may be understood that output terminals of a plurality of circuit units are connected in series, and input terminals of these circuit elements may also be connected in series.

FIG. 4d-1 is a schematic diagram in which power supplies share a common negative terminal according to an embodiment. In some embodiments, a negative input terminal and a negative output terminal of the first-stage DC/DC conversion unit are directly coupled or connected only with a small voltage drop, and a negative input terminal and a positive output terminal of the second-stage DC/DC conversion unit are directly coupled or are connected only with a small voltage drop. A connection only with a small voltage drop means that a voltage drop of two terminals of the connection is relatively small, and may be a voltage drop caused by coupling a fuse, or may be a voltage drop caused by another case. This is not limited in this embodiment. In this case, negative output terminals of two power supplies coupled to the first-stage DC/DC conversion unit and the second-stage DC/DC conversion unit can be equipotential. In some cases, the two power supplies are a first photovoltaic array and a second photovoltaic array. In a normal case, distribution of impedance to earth of the entire system is symmetrical. When the system is normally connected to the grid and works, the output-voltage intermediate-potential output terminal of the DC/DC conversion unit, a second input terminal of the direct current/alternating current conversion combination, and the ground are equipotential, and in this case, voltages to earth of negative terminals of PV panels of the first photovoltaic array and the second photovoltaic array are approximately 0 V, so that negative bias voltages to earth of the negative terminals of the PV panels are eliminated, and a potential induced degradation (Potential Induced Degradation, PID) phenomenon (for a panel for which the PID phenomenon occurs when a voltage to earth of a negative terminal of the PV panel is negative) of the panel is eliminated.

FIG. 4*d*-2 is a schematic diagram in which power supplies share a common positive terminal according to an embodiment. In other embodiments, a positive input terminal and a negative output terminal of the first-stage DC/DC conversion unit are directly coupled or connected only with a small voltage drop, and a positive input terminal and a positive output terminal of the second-stage DC/DC conversion unit are directly coupled or are connected only with a small voltage drop. The small voltage drop is similar to that in the descriptions in the foregoing embodiment, and details are not described herein again. In this embodiment, positive output terminals of two power supplies coupled to the first-stage DC/DC conversion unit and the second-stage DC/DC conversion unit can be equipotential. In some cases, the two power supplies are a first photovoltaic array and a second photovoltaic array. In a normal case, distribution of impedance to earth of the entire system is symmetrical. When the system is normally connected to the grid and works, the output-voltage intermediate-potential output terminal of the DC/DC conversion unit, a second input terminal of the direct current/alternating current conversion combination, and the ground are equipotential, and in this case, voltages to earth of positive terminals of PV panels of the first photovoltaic array and the second photovoltaic array are approximately 0 V, so that positive bias voltages to earth of the positive terminals of the PV panels are eliminated, and a PID phenomenon (for a panel for which the PID phenomenon occurs when a voltage to earth of a positive terminal of the PV panel is positive) of the panel is eliminated.

FIG. 4*e* is a schematic diagram 5 of an energy combiner apparatus. In some embodiments, the energy combiner apparatus includes at least one DC/DC conversion unit. Input terminals of the DC/DC conversion unit are coupled to some input terminals of the energy combiner apparatus. For example, as shown by an upper energy combiner apparatus in FIG. 4*e*, the input terminals of the DC/DC conversion unit are coupled to two upper input terminals of the energy combiner apparatus (in other words, the input terminals of the DC/DC conversion unit are used as the two upper input terminals of the energy combiner apparatus). A positive output terminal of the DC/DC conversion unit is coupled to a positive output terminal of the energy combiner apparatus (the positive output terminal of the DC/DC conversion unit is used as the positive output terminal of the energy combiner apparatus). A negative output terminal of the DC/DC conversion unit is coupled to an output-voltage intermediate-potential output terminal of the energy combiner apparatus and a positive terminal in at least one other input terminal of the energy combiner apparatus. For example, as shown by the upper energy combiner apparatus in FIG. 4*e*, the negative output terminal of the DC/DC conversion unit is used as an output-voltage intermediate-potential output terminal of the energy combiner apparatus, and the output-voltage intermediate-potential output terminal of the energy combiner apparatus is coupled to a lower positive input terminal of the energy combiner apparatus. A negative output terminal of the energy combiner apparatus is coupled to a negative terminal in the at least other input terminal of the energy combiner apparatus. For example, as shown by the upper energy combiner apparatus in FIG. 4*e*, a negative output terminal of the energy combiner apparatus is coupled to a lower negative input terminal of the energy combiner apparatus.

In other embodiments, the energy combiner apparatus includes at least one DC/DC conversion unit. Input terminals of the DC/DC conversion unit are coupled to some input terminals of the energy combiner apparatus. For example, as shown by a lower energy combiner apparatus in FIG. 4*e*, the input terminals of the DC/DC conversion unit are coupled to two upper input terminals of the energy combiner apparatus (in other words, the input terminals of the DC/DC conversion unit are used as the two upper input terminals of the energy combiner apparatus). A negative output terminal of the DC/DC conversion unit is coupled to a negative output terminal of the energy combiner apparatus (the negative output terminal of the DC/DC conversion unit is used as the negative output terminal of the energy combiner apparatus). A positive output terminal of the DC/DC conversion unit is coupled to an output-voltage intermediate-potential output terminal of the energy combiner apparatus and a negative terminal in at least one other input terminal of the energy combiner apparatus. For example, as shown by the upper energy combiner apparatus in FIG. 4*e*, the positive output terminal of the DC/DC conversion unit is used as an output-voltage intermediate-potential output terminal of the energy combiner apparatus, and the output-voltage intermediate-potential output terminal of the energy combiner apparatus is coupled to a lower negative input terminal of the energy combiner apparatus. A positive output terminal of the energy combiner apparatus is coupled to a positive terminal in the at least other input terminal of the energy combiner apparatus. For example, as shown by the upper energy combiner apparatus in FIG. 4*e*, a positive output terminal of the energy combiner apparatus is coupled to a lower positive input terminal of the energy combiner apparatus.

In some embodiments, a positive input terminal and a negative output terminal of the DC/DC conversion unit are directly coupled or connected only with a small voltage drop, and a negative input terminal and a positive output terminal of the DC/DC conversion unit are directly coupled or are connected only with a small voltage drop. The small voltage drop is similar to that in the descriptions in the foregoing embodiment, and details are not described herein again. In this embodiment, in this internal connection manner of the DC/DC conversion unit, two power supplies can share a common positive terminal or a common negative terminal. Therefore, because the output-voltage intermediate-potential output terminal of the energy combiner apparatus and the second input terminal of the direct current/direct current conversion combination are equipotential, one of the ports is adjusted to be grounded, so that a voltage to earth of the common positive output terminal or negative output terminal of the two power supplies is 0 V. When the power supply is a photovoltaic array, a voltage to earth of a panel of the photovoltaic array can be approximately 0 V, so that a positive bias voltage or a negative bias voltage to earth of the panel is eliminated, and a PID phenomenon of the panel is eliminated.

Figure 4F:
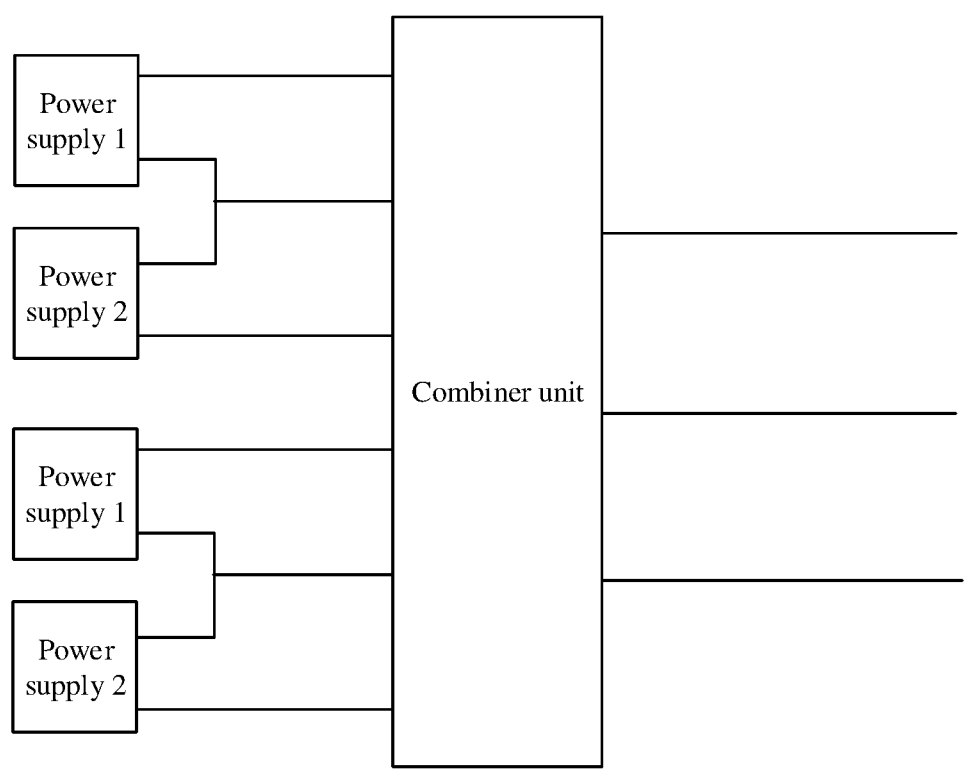
FIG. 4f is a schematic diagram 6 of an energy combiner apparatus according to an embodiment.

FIG. 4*f* is a schematic diagram 6 of an energy combiner apparatus according to an embodiment. The energy combiner apparatus may include at least one combiner unit. An input terminal of the combiner unit may be connected to a plurality of power supplies. Three output terminals of the combiner unit are coupled to three input terminals of the direct current/alternating current conversion combination. In this embodiment, the combiner unit may combine outputs of the plurality of power supplies into three output terminals, to connect to the direct current/alternating current conversion combination. The combiner unit may be a combiner box. This is not limited in this embodiment.

In the energy combiner apparatus, the DC/DC conversion unit may include but is not limited to a full-bridge DC/DC converter, a half-bridge DC/DC converter, an LC resonant DC/DC converter, an LLC resonant DC/DC converter, and a dual-active DC/DC converter. In actual application, another DC/DC conversion circuit may be alternatively used. This is not limited in this embodiment.

The foregoing are only some examples of the energy combiner apparatus. In actual application, another similar circuit structure may exist. This is not limited in this embodiment. The following describes the direct current/alternating current conversion combination in the phase circuit in detail.

In this embodiment, an output terminal of the at least one power supply is coupled to an input terminal of the at least one energy combiner apparatus. Three output terminals of the at least one energy combiner apparatus may be coupled to input terminals of direct current/alternating current conversion combinations. As shown in FIG. 3, in this embodiment, same-type output terminals of energy combiner apparatuses are connected in parallel, same-type input terminals of the direct current/alternating current conversion combinations are connected in parallel, and the parallel output terminals of the energy combiner apparatuses are coupled to the parallel input terminals of the direct current/alternating current conversion combinations. First output terminals of the energy combiner apparatuses may all be coupled to a first bus (the first cable between the energy combiner apparatus and the direct current/alternating current conversion combination from top to bottom in FIG. 3) and first input terminals of the direct current/alternating current conversion combinations may all be coupled to the first bus. Second output terminals of the energy combiner apparatuses are all coupled to a second bus (the second cable between the energy combiner apparatus and the direct current/alternating current conversion combination from top to bottom in FIG. 3), and second input terminals of the direct current/alternating current conversion combinations are all coupled to the second bus. Third output terminals of the energy combiner apparatuses are all coupled to a third bus (the third cable between the energy combiner apparatus and the direct current/alternating current conversion combination from top to bottom in FIG. 3), and the second input terminals of the direct current/alternating current conversion combinations are all coupled to the third bus.

Figure 5A:
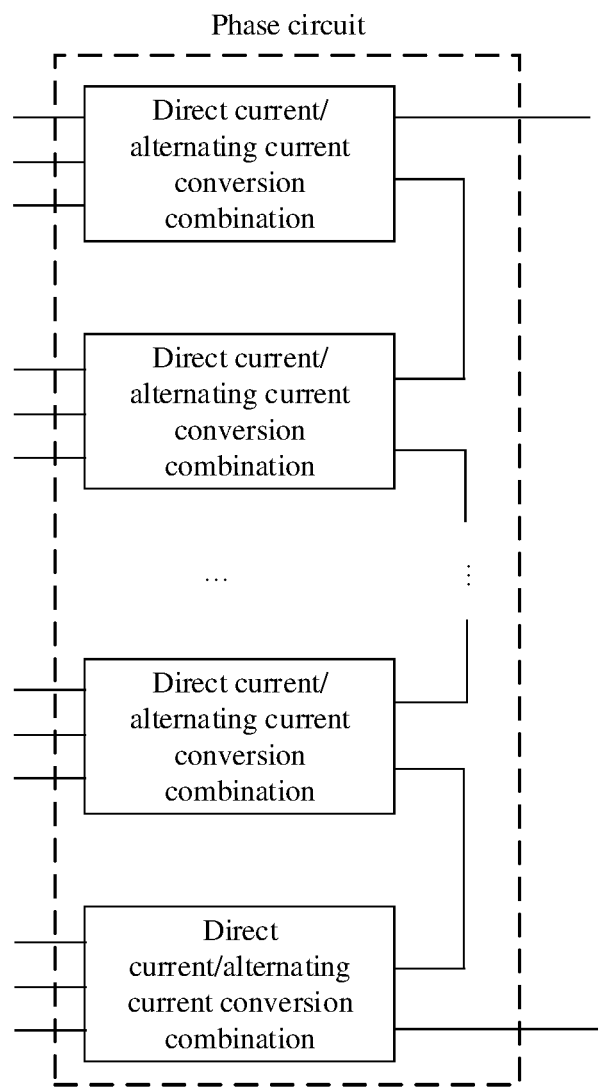
FIG. 5a is a schematic diagram of a phase circuit according to an embodiment.

FIG. 5a is a schematic diagram of a phase circuit according to an embodiment. As shown in FIG. 5a, the phase circuit includes a plurality of direct current/alternating current conversion combinations shown in FIG. 6, output terminals of the plurality of direct current/alternating current conversion combinations are cascaded, one terminal of cascading is a first output terminal of the phase circuit, and the other terminal of cascading is a second output terminal of the phase circuit. Input terminals of the plurality of direct current/alternating current conversion combinations are a plurality of input terminals of the phase circuit. In such solutions, an input voltage of each DC/AC in the direct current/alternating current conversion combination is only a half of a voltage of a direct current bus, so that a DC/AC specification is reduced, and costs are reduced. In some embodiments, the first output terminal of the phase circuit may be further coupled to a filter unit, and the filter unit is located inside the phase circuit, and is configured to filter output of the phase circuit, and then perform a grid connection.

Figure 5B:
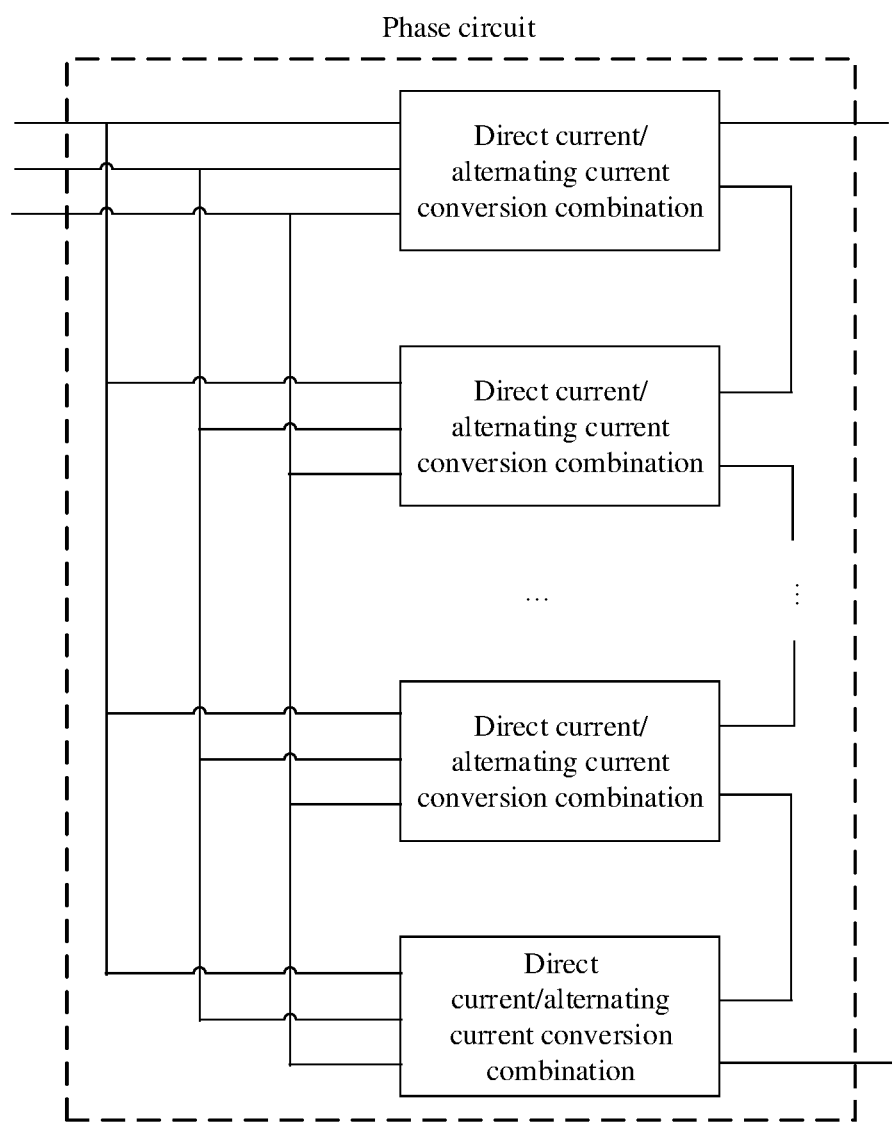
FIG. 5b is a schematic diagram of another phase circuit according to an embodiment.

FIG. 5b is a schematic diagram of another phase circuit according to an embodiment. As shown in FIG. 5b, the phase circuit includes a plurality of direct current/alternating current conversion combinations shown in FIG. 6, output terminals of the plurality of direct current/alternating current conversion combinations are cascaded, one terminal of cascading is a first output terminal of the phase circuit, and the other terminal of cascading is a second output terminal of the phase circuit. Same-type input terminals of the plurality of direct current/alternating current conversion combinations are coupled. For example, first input terminals of the plurality of direct current/alternating current conversion combinations are coupled to a first input terminal of the phase circuit, second input terminals of the plurality of direct current/alternating current conversion combinations are coupled to a second input terminal of the phase circuit, and third input terminals of the plurality of direct current/alternating current conversion combinations are coupled to a third input terminal of the phase circuit. In some embodiments, the first output terminal of the phase circuit may be further coupled to a filter unit, and the filter unit is located inside the phase circuit. The filter unit is similar to the filter unit in the foregoing embodiment, and details are not described herein again.

In this embodiment, same-type input terminals are input terminals corresponding to different units (or modules or combinations or phase circuits). For example, a first input terminal of the first direct current/alternating current conversion combination, a first input terminal of the second direct current/alternating current conversion combination, and a first input terminal of the third direct current/alternating current conversion combination are same-type input terminals. A first input terminal of a first-stage isolation DC/AC conversion unit and a first input terminal of a second-stage isolation DC/AC conversion unit are same-type input terminals. The rest may be deduced by analogy. In addition, same-type output terminals have a similar meaning, and details are not described herein again.

Figure 6:
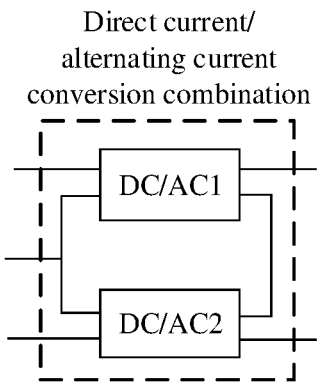
FIG. 6 is a schematic diagram of a direct current/alternating current conversion combination according to an embodiment.

FIG. 6 is a schematic diagram of a direct current/alternating current conversion combination according to an embodiment. Taking FIG. 6 as an example, one of direct current/alternating current conversion combinations includes DC/AC1 and DC/AC2, a first input terminal of DC/AC1 is used as a first input terminal of the direct current/alternating current conversion combination, a second input terminal of DC/AC1 is coupled to a first input terminal of DC/AC2, a coupling node is used as a second input terminal of the direct current/alternating current conversion combination, and a second input terminal of DC/AC2 is used as a third input terminal of the direct current/alternating current conversion combination. A first output terminal of DC/AC1 is used as a first output terminal of the direct current/alternating current conversion combination, a second output terminal of DC/AC1 and a first output terminal of DC/AC2 are coupled (cascaded), and a second output terminal of DC/AC2 is used as a second output terminal of the direct current/alternating current conversion combination.

In this embodiment, both DC/AC1 and DC/AC2 in the direct current/alternating current conversion combination may be isolation direct current/alternating current conversion units, DC/AC1 may be a first-stage isolation DC/AC conversion unit, and DC/AC2 may be a second-stage isolation DC/AC conversion unit. In this embodiment, structures of the first-stage isolation DC/AC conversion unit and the second-stage isolation DC/AC conversion unit may be the same. Isolation DC/AC conversion units (for example, the first-stage isolation DC/AC conversion unit and the second-stage isolation DC/AC conversion unit) may have a plurality of forms. This is not limited in this embodiment.

Figure 7A:
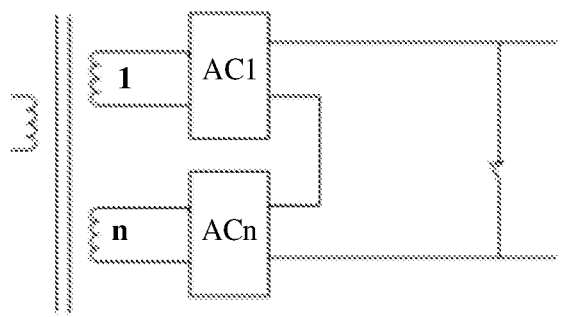
FIG. 7a is a schematic diagram 1 of an isolation DC/AC conversion unit according to an embodiment.

FIG. 7a is a schematic diagram 1 of an isolation DC/AC conversion unit according to an embodiment. The isolation DC/AC conversion unit includes a DC/AC conversion module, a multi-channel output high-frequency transformer, and an AC/AC conversion unit. A ratio of primary windings to secondary windings of the multi-channel output high-frequency transformer is m:n, where m and n are integers greater than or equal to 1. An input terminal of the DC/AC conversion module is used as an input terminal of the isolation DC/AC conversion unit. An output terminal of at least one DC/AC conversion module is coupled to the primary winding, and the secondary winding is coupled to an input terminal of a corresponding AC/AC conversion unit. In this embodiment, output terminals of n AC/AC conversion units are cascaded, one terminal of cascading is used as a first output terminal (a positive output terminal) of the isolation DC/AC conversion unit, and the other terminal of cascading is used as a second output terminal (a negative output terminal) of the isolation DC/AC conversion unit. Output of the AC/AC conversion unit is a sinusoidal alternating current voltage of 50 Hz or 60 Hz. The isolation DC/AC conversion unit shown in FIG. 7a can implement a direct current/alternating current conversion function, and input and output can be isolated, so that the power supply system can implement an isolated grid connection.

In some embodiments, a bypass unit is coupled in parallel between the first output terminal and the second output terminal of the isolation DC/AC conversion unit, to control, when the isolation DC/AC conversion unit does not need to work, the bypass unit to be opened to implement a bypass function. The bypass unit may include one or more of a switch, a contactor, a relay, a circuit breaker, and a semiconductor switching component. In actual application, the bypass unit may alternatively include another component. This is not limited in this embodiment.

Figure 7B:
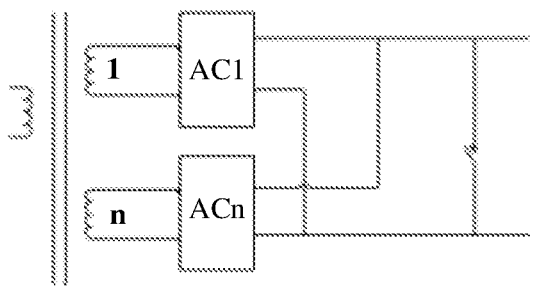
FIG. 7b is a schematic diagram 2 of an isolation DC/AC conversion unit according to an embodiment.

FIG. 7b is a schematic diagram 2 of an isolation DC/AC conversion unit according to an embodiment. The isolation DC/AC conversion unit includes a DC/AC conversion module, a multi-channel output high-frequency transformer, and an AC/AC conversion unit. A ratio of primary windings to secondary windings of the multi-channel output high-frequency transformer is m:n, where m and n are integers greater than or equal to 1. An input terminal of the DC/AC conversion module is used as an input terminal of the isolation DC/AC conversion unit. An output terminal of at least one DC/AC conversion module is coupled to the primary winding, and the secondary winding is coupled to an input terminal of a corresponding AC/AC conversion unit. In this embodiment, same-type output terminals of n AC/AC conversion units are coupled in parallel. For example, if an upper right output terminal of the AC/AC conversion unit is a first output terminal, and a lower right output terminal of the AC/AC conversion unit is a second output terminal, first output terminals of the n AC/AC conversion units are coupled in parallel, second output terminals of the n AC/AC conversion units are coupled in parallel, a first output terminal formed after the parallel coupling is used as a first output terminal of the isolation DC/AC conversion unit, and a second output terminal formed after the parallel coupling is used as a second output terminal of the isolation DC/AC conversion unit. Output of the AC/AC conversion unit is a sinusoidal alternating current voltage of 50 Hz or 60 Hz. The isolation DC/AC conversion unit shown in FIG. 7b can implement a direct current/alternating current conversion function, and input and output can be isolated, so that the power supply system can implement an isolated grid connection. In some embodiments, a bypass unit is coupled in parallel between the first output terminal and the second output terminal of the isolation DC/AC conversion unit, to control, when the isolation DC/AC conversion unit does not need to work, the bypass unit to be opened to implement a bypass function. The bypass unit is similar to that in the foregoing embodiment, and details are not described herein again.

Figure 7C:
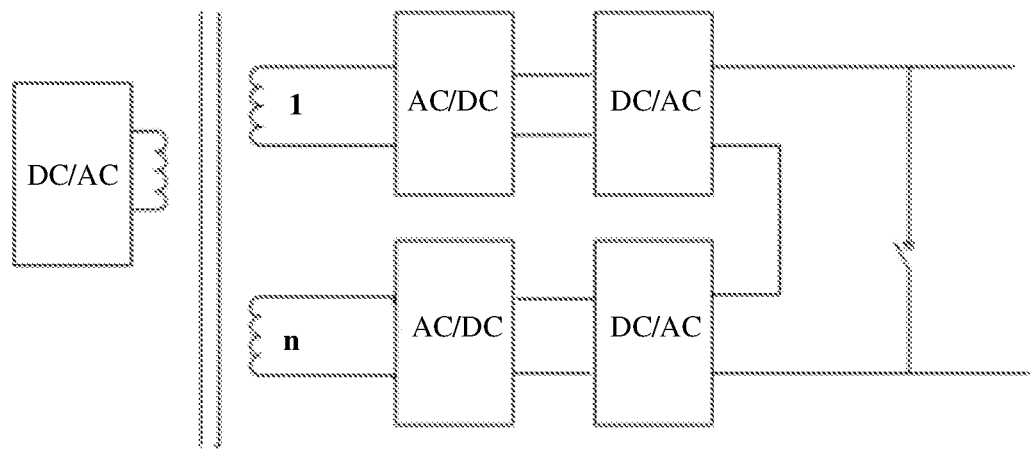
FIG. 7c is a schematic diagram 3 of an isolation DC/AC conversion unit according to an embodiment.

FIG. 7c is a schematic diagram 3 of an isolation DC/AC conversion unit according to an embodiment. The isolation DC/AC conversion unit includes a DC/AC conversion module, a multi-channel output high-frequency transformer, an AC/DC conversion unit, and a DC/AC conversion unit. A ratio of primary windings to secondary windings of the multi-channel output high-frequency transformer is m:n, where m and n are integers greater than or equal to 1. An input terminal of the DC/AC conversion module is used as an input terminal of the isolation DC/AC conversion unit. An output terminal of at least one DC/AC conversion module is coupled to the primary winding, the secondary winding is coupled to an input terminal of at least one corresponding AC/DC conversion unit, and an output terminal of the at least one AC/DC conversion unit is coupled to an input terminal of at least one corresponding DC/AC conversion unit. For ease of description, only two AC/DC conversion units and two DC/AC conversion units are shown in FIG. 7c. In actual application, AC/DC conversion units and DC/AC conversion units are not limited. A plurality of AC/DC conversion units may be coupled to a same secondary winding in parallel, or a plurality of DC/AC conversion units may be coupled to a same AC/DC conversion unit in parallel. This is not limited in this embodiment. In this embodiment, output terminals of at least one AC/DC conversion unit coupled to a same secondary winding are connected in parallel, and the parallel terminals are coupled to at least one corresponding DC/AC conversion unit. In this embodiment, output terminals of DC/AC conversion units with same-type input (for example, DC/AC conversion units coupled to a same AC/DC conversion unit) are connected in parallel, an output terminal formed after the parallel connection and an output terminal of another DC/AC conversion unit are cascaded, one terminal of cascading is a first output terminal of the isolation DC/AC conversion unit, and the other terminal of cascading is a second output terminal of the isolation DC/AC conversion unit. The isolation DC/AC conversion unit shown in FIG. 7c can implement a direct current/alternating current conversion function, and input and output can be isolated, so that the power supply system can implement an isolated grid connection. In some embodiments, a bypass unit is coupled in parallel between the first output terminal and the second output terminal of the isolation DC/AC conversion unit, to control, when the isolation DC/AC conversion unit does not need to work, the bypass unit to be opened to implement a bypass function. The bypass unit is similar to that in the foregoing embodiment, and details are not described herein again.

Figure 7D:
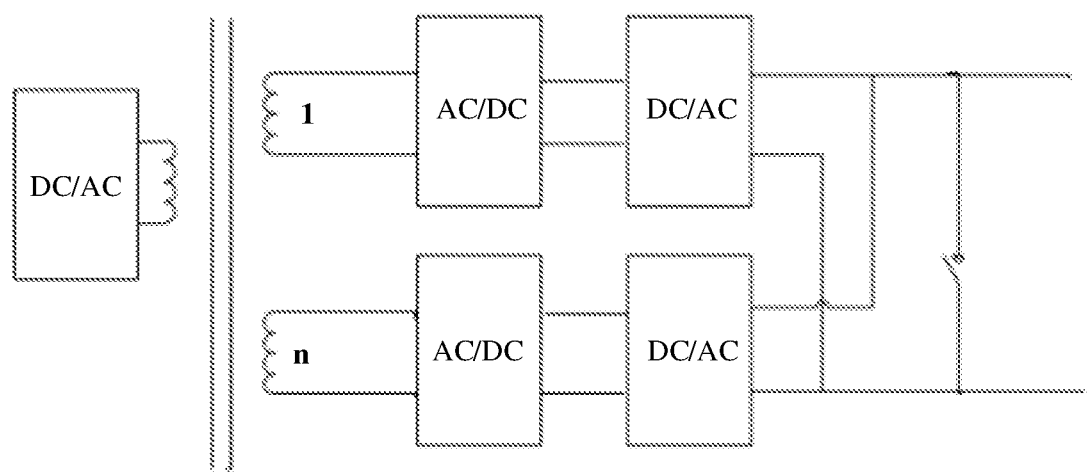
FIG. 7d is a schematic diagram 4 of an isolation DC/AC conversion unit according to an embodiment.

FIG. 7d is a schematic diagram 4 of an isolation DC/AC conversion unit according to an embodiment. The isolation DC/AC conversion unit includes a DC/AC conversion module, a multi-channel output high-frequency transformer, an AC/DC conversion unit, and a DC/AC conversion unit. A ratio of primary windings to secondary windings of the multi-channel output high-frequency transformer is m:n, where m and n are integers greater than or equal to 1. An input terminal of the DC/AC conversion module is used as an input terminal of the isolation DC/AC conversion unit. An output terminal of at least one DC/AC conversion module is coupled to the primary winding, the secondary winding is coupled to an input terminal of at least one corresponding AC/DC conversion unit, and an output terminal of the at least one AC/DC conversion unit is coupled to an input terminal of at least one corresponding DC/AC conversion unit. For ease of description, only two AC/DC conversion units and two DC/AC conversion units are shown in FIG. 7c. In actual application, AC/DC conversion units and DC/AC conversion units are not limited. A plurality of AC/DC conversion units may be coupled to a same secondary winding in parallel, or a plurality of DC/AC conversion units may be coupled to a same AC/DC conversion unit in parallel. This is not limited in this embodiment. In this embodiment, output terminals of at least one AC/DC conversion unit coupled to a same secondary winding are connected in parallel, and the parallel terminals are coupled to at least one corresponding DC/AC conversion unit. In this embodiment, output terminals of DC/AC conversion units with same-type input (for example, DC/AC conversion units coupled to a same AC/DC conversion unit) are connected in parallel, and an output terminal formed after the parallel connection and a same-type output terminal of another DC/AC conversion unit are connected in parallel to form a first output terminal and a second output terminal of the isolation DC/AC conversion unit. For example, a first output terminal of an upper DC/AC conversion unit and a first output terminal of a lower DC/AC conversion unit in FIG. 7d are coupled to form the first output terminal of the isolation DC/AC conversion unit, and a second output terminal of the upper DC/AC conversion unit and a second output terminal of the lower DC/AC conversion unit in FIG. 7d are coupled to form the second output terminal of the isolation DC/AC conversion unit. The isolation DC/AC conversion unit shown in FIG. 7d can implement a direct current/alternating current conversion function, and input and output can be isolated, so that the power supply system can implement an isolated grid connection. In some embodiments, a bypass unit is coupled in parallel between the first output terminal and the second output terminal of the isolation DC/AC conversion unit, to control, when the isolation DC/AC conversion unit does not need to work, the bypass unit to be opened to implement a bypass function. The bypass unit is similar to that in the foregoing embodiment, and details are not described herein again.

Figure 7E:
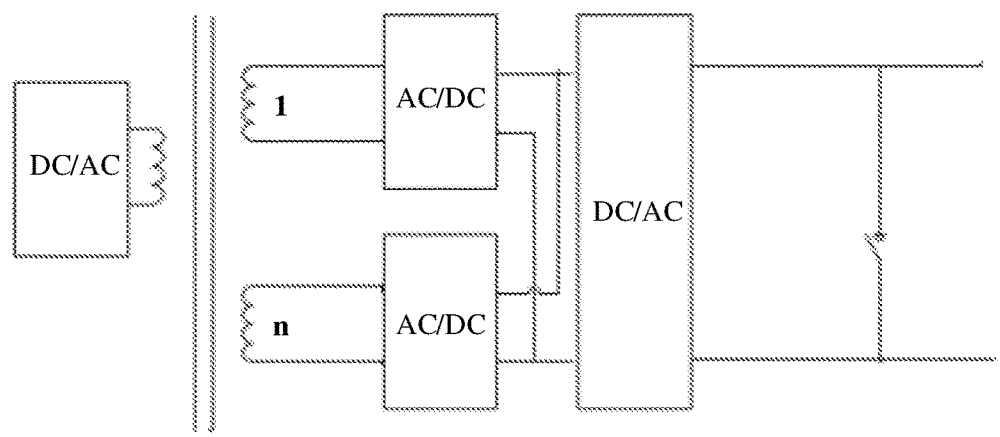
FIG. 7e is a schematic diagram 5 of an isolation DC/AC conversion unit according to an embodiment.

FIG. 7e is a schematic diagram 5 of an isolation DC/AC conversion unit according to an embodiment. The isolation DC/AC conversion unit includes a DC/AC conversion module, a multi-channel output high-frequency transformer, an AC/DC conversion unit, and a DC/AC conversion unit. A ratio of primary windings to secondary windings of the multi-channel output high-frequency transformer is m:n, where m and n are integers greater than or equal to 1. An input terminal of the DC/AC conversion module is used as an input terminal of the isolation DC/AC conversion unit. An output terminal of at least one DC/AC conversion module is coupled to the primary winding, the secondary winding is coupled to an input terminal of at least one corresponding AC/DC conversion unit, and output terminals of the at least one AC/DC conversion unit are connected to input terminals of a same DC/AC conversion unit. In this embodiment, output terminals of at least one AC/DC conversion unit coupled to a same secondary winding are connected in parallel, and the parallel terminals and other same-type parallel terminals are connected in parallel to form a first port and a second port. For example, a first output terminal of an upper AC/DC conversion unit and a first output terminal of a lower AC/DC conversion unit in FIG. 7e are connected in parallel to form the first port, and a second output terminal of the upper AC/DC conversion unit and a second output terminal of the lower AC/DC conversion unit in FIG. 7e are connected in parallel to form the second port. In this embodiment, the first port and the second port are coupled to an input terminal of the DC/AC conversion unit. Two output terminals of the DC/AC conversion unit are respectively used as a first output terminal and a second output terminal of the isolation DC/AC conversion unit. The isolation DC/AC conversion unit shown in FIG. 7e can implement a direct current/alternating current conversion function, and input and output can be isolated, so that the power supply system can implement an isolated grid connection. In some embodiments, a bypass unit is coupled in parallel between the first output terminal and the second output terminal of the isolation DC/AC conversion unit, to control, when the isolation DC/AC conversion unit does not need to work, the bypass unit to be opened to implement a bypass function. The bypass unit is similar to that in the foregoing embodiment, and details are not described herein again.

Figure 8A:
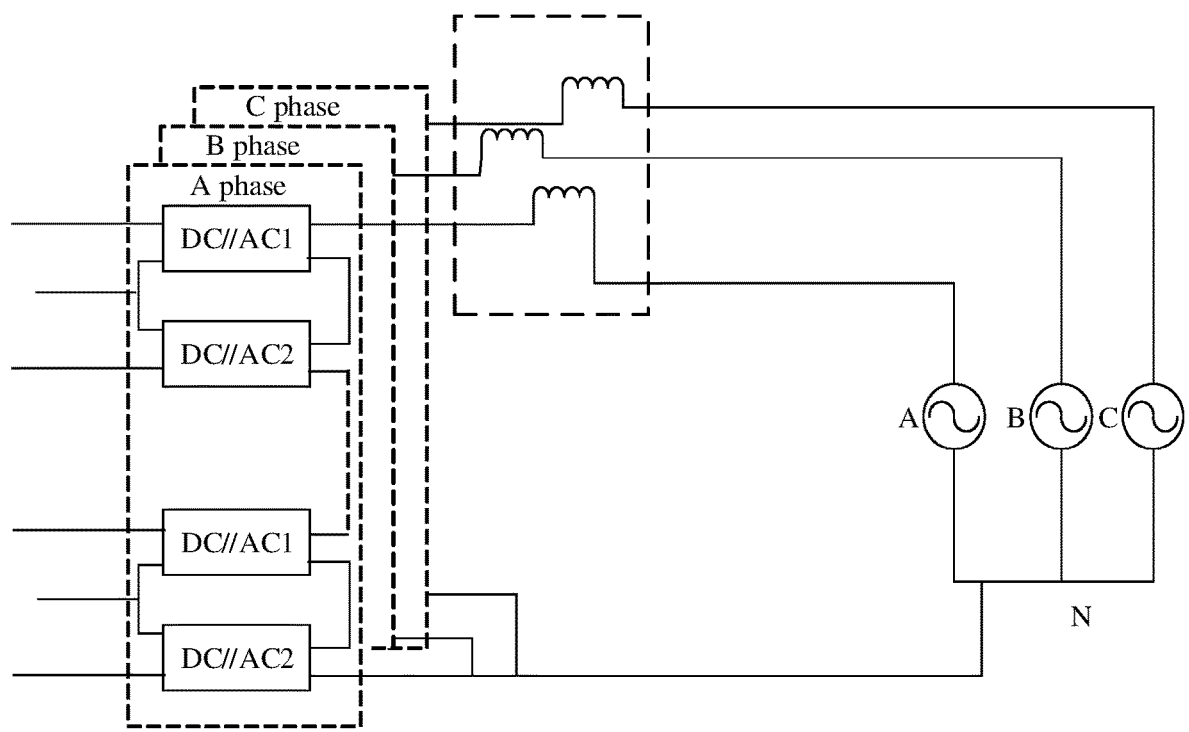
FIG. 8a is a schematic diagram in which phase circuits are connected to a grid through a star connection according to an embodiment.
Figure 8B:
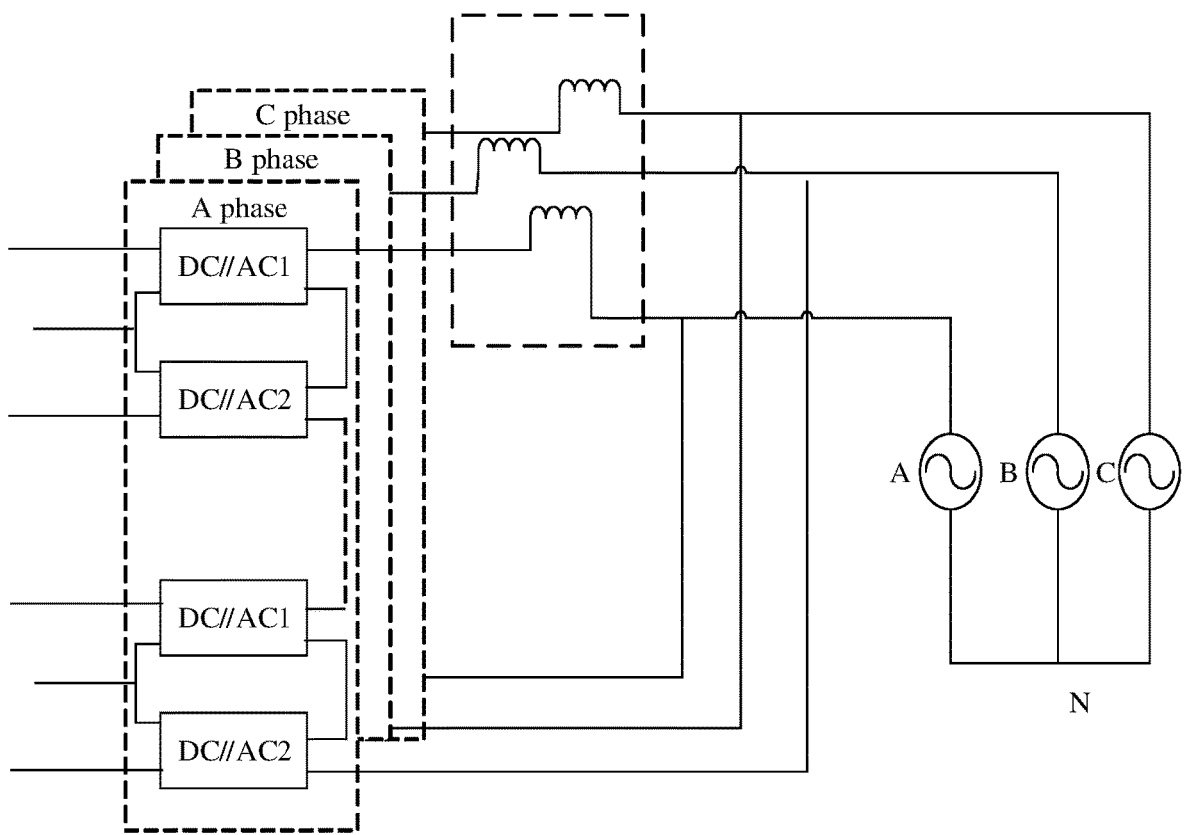
FIG. 8b is a schematic diagram in which phase circuits are connected to a grid through a delta connection according to an embodiment.

In this embodiment, the phase circuit shown in FIG. 5a or FIG. 5b has two output terminals, and therefore the three phase circuits have a total of six output terminals. These phase circuits may be connected to the grid through a star or delta connection. FIG. 8a is a schematic diagram in which phase circuits are connected to a grid through a star connection according to an embodiment. As shown in FIG. 8a, first output terminals of the three phase circuits are coupled to filter units and are then respectively coupled to a phase wire A, a phase wire B, and a phase wire C of the grid. Second output terminals of the three phase circuits are all coupled to a phase wire N of the grid. FIG. 8b is a schematic diagram in which phase circuits are connected to a grid through a delta connection according to an embodiment. As shown in FIG. 8b, first output terminals of the three phase circuits are coupled to filter units and are then respectively coupled to a phase wire A, a phase wire B, and a phase wire C of the grid. Second output terminals of the three phase circuits are coupled to the first output terminals. A second output terminal of an A-phase circuit may be coupled to a first output terminal of a B-phase circuit, a second output terminal of the B-phase circuit may be coupled to a first output terminal of a C-phase circuit, and a second output terminal of the C-phase circuit may be coupled to a first output terminal of the A-phase circuit. It may be understood that the foregoing connection manner is staggered coupling, that is, the second output terminal of the A-phase circuit is not coupled to the first output terminal of the A-phase circuit, but is coupled to a first output terminal of another phase circuit, which is staggering. In actual application, the output terminals of the phase circuits in FIG. 8B may be connected in another similar staggered manner, to implement a delta connection. Details are not described herein.

Figure 9A:
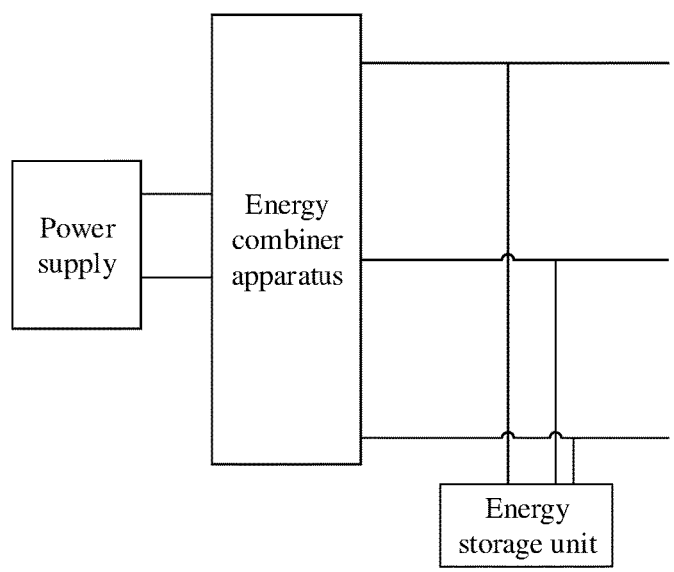
FIG. 9a is a schematic diagram 1 of connections of an energy storage unit according to an embodiment.

FIG. 9a is a schematic diagram 1 of connections of an energy storage unit according to an embodiment. In some embodiments, the power supply system further includes an energy storage unit. The energy storage unit is coupled to at least two of three output phase wires of the energy combiner apparatus. In FIG. 9a, the energy storage unit may be coupled to the three output phase wires of the energy combiner apparatus. It may be understood that a quantity of energy storage units included in one power supply system is not limited, in other words, a plurality of energy storage units may be coupled in parallel. This is not limited in this embodiment. In this embodiment, the energy storage unit may be a unit for storing energy, may include a direct current conversion unit and a unit for storing energy, or may be another apparatus that can store energy. This is not limited in this embodiment. The unit for storing energy may include, but is not limited to, a supercapacitor, a battery, or the like.

The direct current conversion unit may be a DC/DC conversion unit or the like. This is not limited in this embodiment.

Figure 9B:
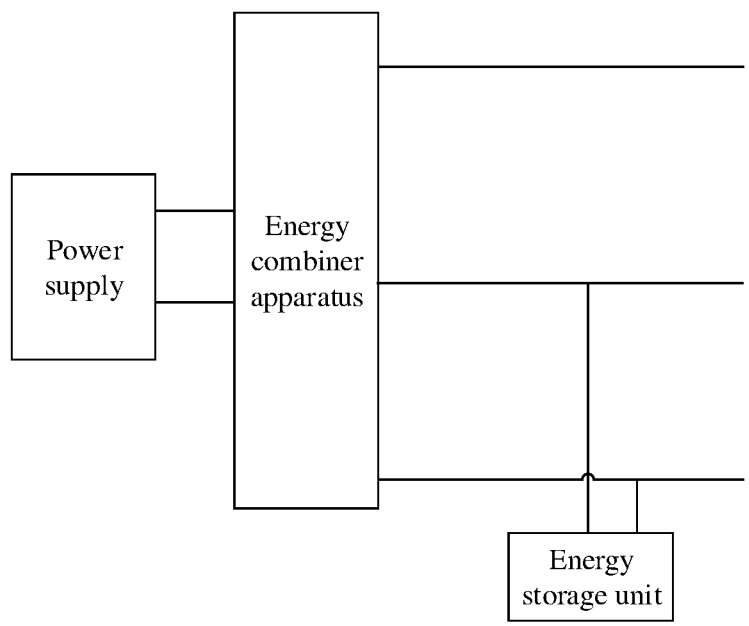
FIG. 9b is a schematic diagram 2 of connections of an energy storage unit according to an embodiment.
Figure 9C:
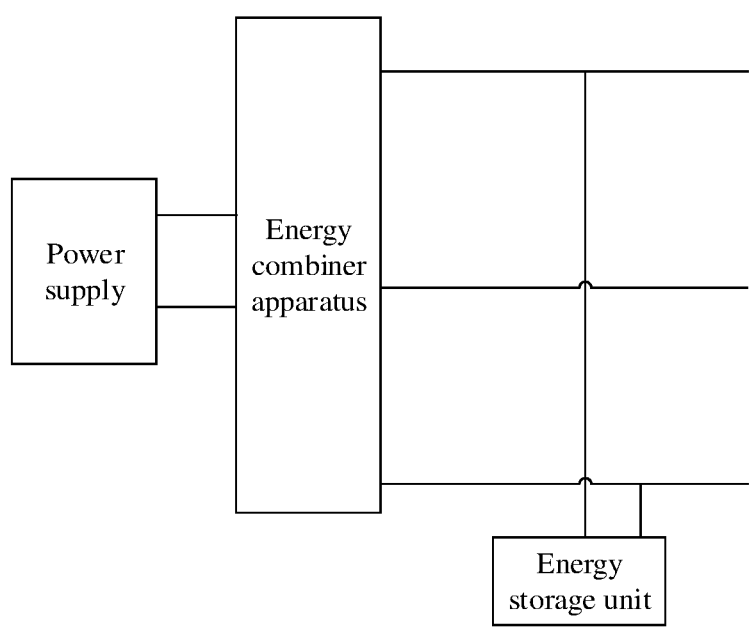
FIG. 9c is a schematic diagram 3 of connections of an energy storage unit according to an embodiment.
Figure 9D:
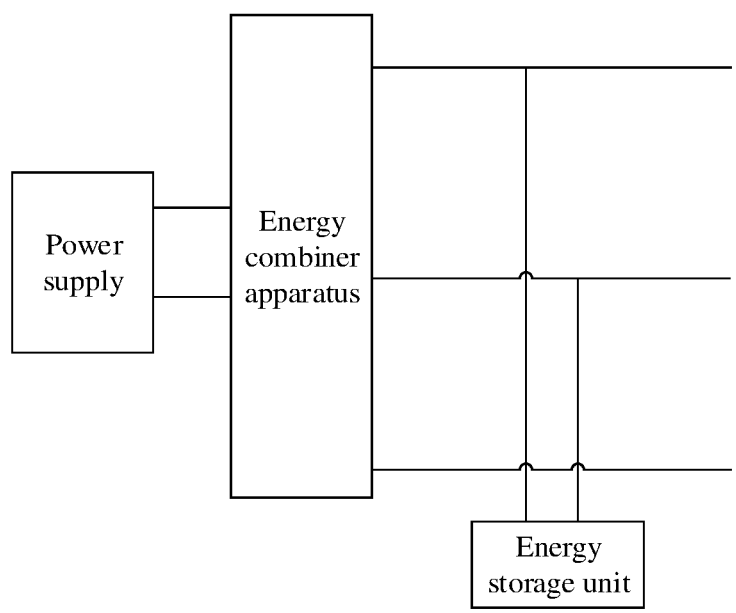
FIG. 9d is a schematic diagram 4 of connections of an energy storage unit according to an embodiment.

FIG. 9b is a schematic diagram 2 of connections of an energy storage unit according to an embodiment. FIG. 9c is a schematic diagram 3 of connections of an energy storage unit according to an embodiment. FIG. 9d is a schematic diagram 4 of connections of an energy storage unit according to an embodiment. In some embodiments, the energy storage unit is coupled to two of output phase wires of the energy combiner apparatus. The energy storage unit is similar to that in the descriptions in the foregoing embodiment, and details are not described herein again.

Figure 9E:
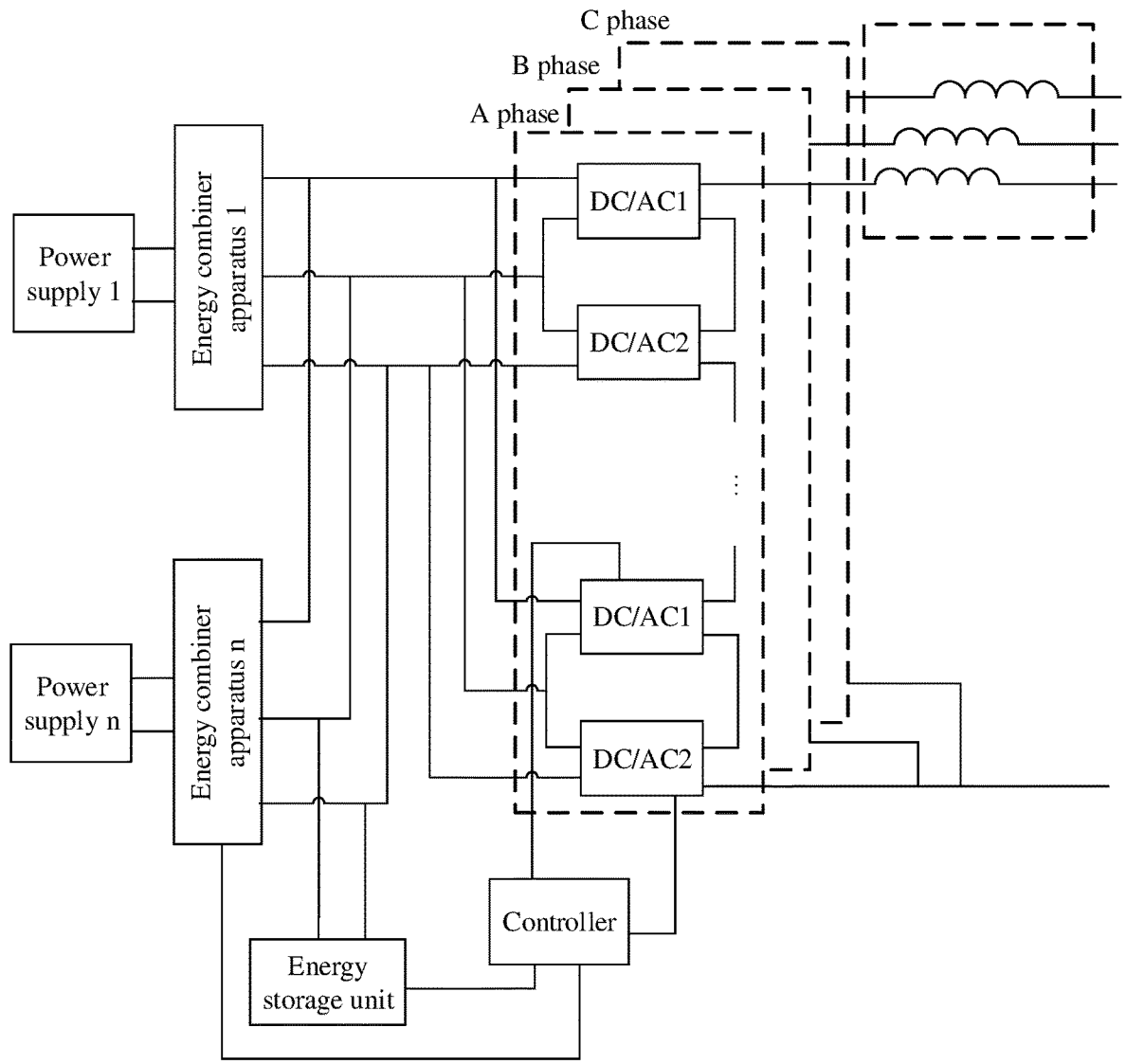
FIG. 9e is a schematic diagram of connections of a controller according to an embodiment.

FIG. 9e is a schematic diagram of connections of a controller. In some embodiments, the power supply system further includes a controller, and the controller includes a communication module. The controller is coupled to the direct current/alternating current conversion combination and/or the energy combiner apparatus and implements communication by coupling a communication signal on a coupled direct current cable, to control working modes or a working mode of the direct current/alternating current conversion combination and/or the energy combiner apparatus. The communication signal may be a power line communication (PLC) signal. Therefore, if the controller, the direct current/alternating current conversion combination, and the energy combiner apparatus are devices that can identify a communication signal (where devices that can identify a communication signal may be selected, or communication modules are installed on devices, which is not limited in this embodiment), the controller, the direct current/alternating current conversion combination, and the energy combiner apparatus may communicate with each other by using the communication signal coupled on the direct current cable. In actual application, the communication signal may be a signal, other than the PLC signal, that can implement communication. This is not limited in this embodiment. Coupling of the controller in FIG. 9e is only some examples. In actual application, the controller may be alternatively connected to more energy combiner apparatuses, energy storage units, and isolation DC/AC conversion units. This is not limited in this embodiment.

In some embodiments, the power supply system may be a photovoltaic power system, and a corresponding power supply is a photovoltaic array. The photovoltaic array is formed by connecting outputs of photovoltaic panels to optimizers or shutdown devices and then performing a combination of series and parallel connections. A communication signal may be coupled on an output direct current cable of the optimizer or the shutdown device. Any one of the first-stage isolation DC/AC conversion unit, the second-stage isolation DC/AC conversion unit, the energy combiner apparatus, and the controller controls the optimizer or the shutdown device by using the communication signal, to implement fast shutdown. The communication signal is similar to that in the descriptions in the foregoing embodiment, and details are not described herein again.

In some embodiments, communication signals are coupled on direct current cables between both the first-stage isolation DC/AC conversion unit and the second-stage isolation DC/AC conversion unit and the energy combiner apparatus. Any one of the first-stage isolation DC/AC conversion unit, the second-stage isolation DC/AC conversion unit, and the controller controls the energy combiner apparatus by using the communication signal, to control opening and closing of the energy combiner apparatus. The communication signal is similar to that in the descriptions in the foregoing embodiment, and details are not described herein again.

In some embodiments, a communication signal is coupled on a cable connected to the energy storage unit. In this case, any one of the first-stage isolation DC/AC conversion unit, the second-stage isolation DC/AC conversion unit, the energy combiner apparatus, and the controller controls opening or closing of the energy storage unit by using the communication signal. The communication signal is similar to that in the descriptions in the foregoing embodiment, and details are not described herein again.

Embodiment 2

Figure 10A:
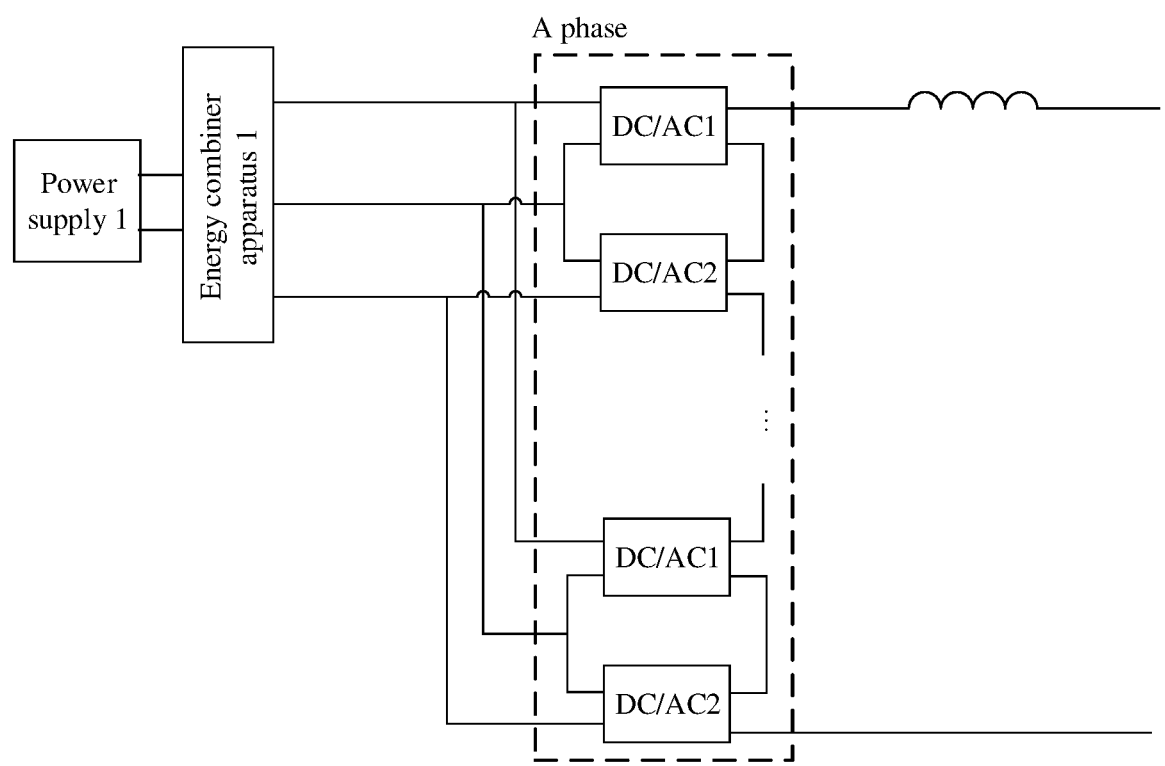
FIG. 10a is a schematic diagram of an A-phase circuit of Embodiment 2 of a power supply system.
Figure 10B:
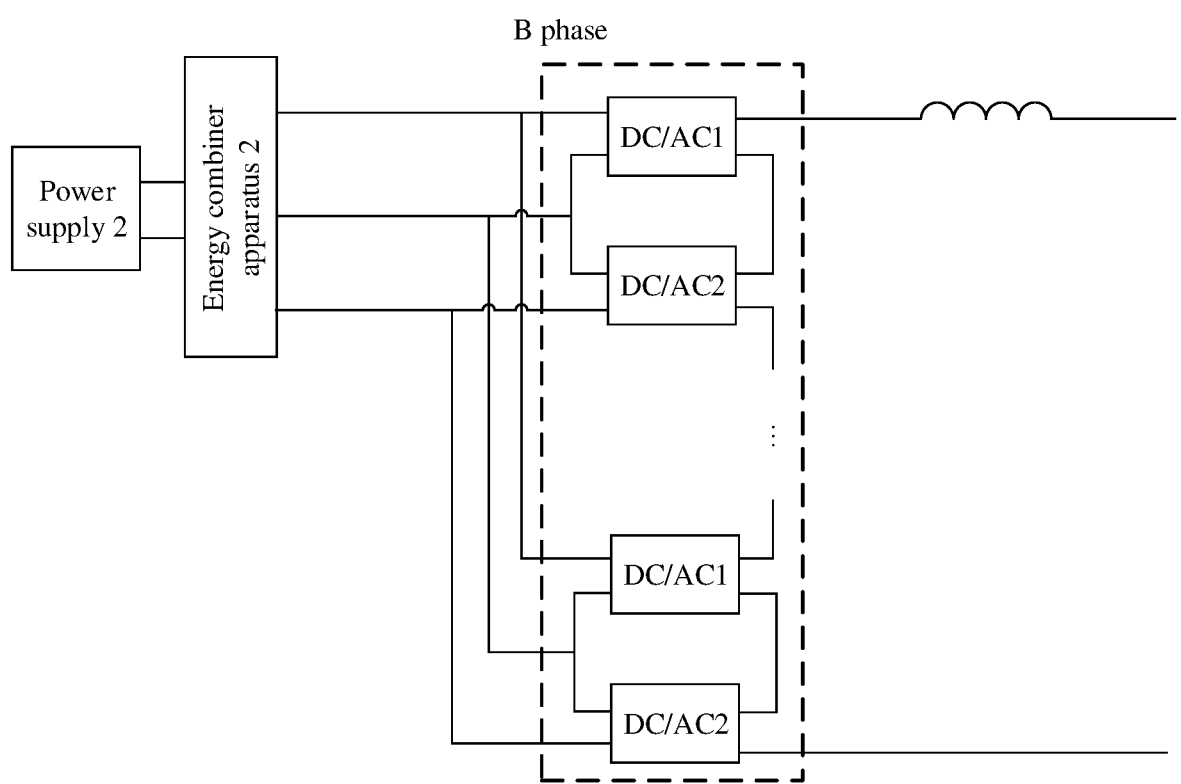
FIG. 10b is a schematic diagram of a B-phase circuit of Embodiment 2 of a power supply system.
Figure 10C:
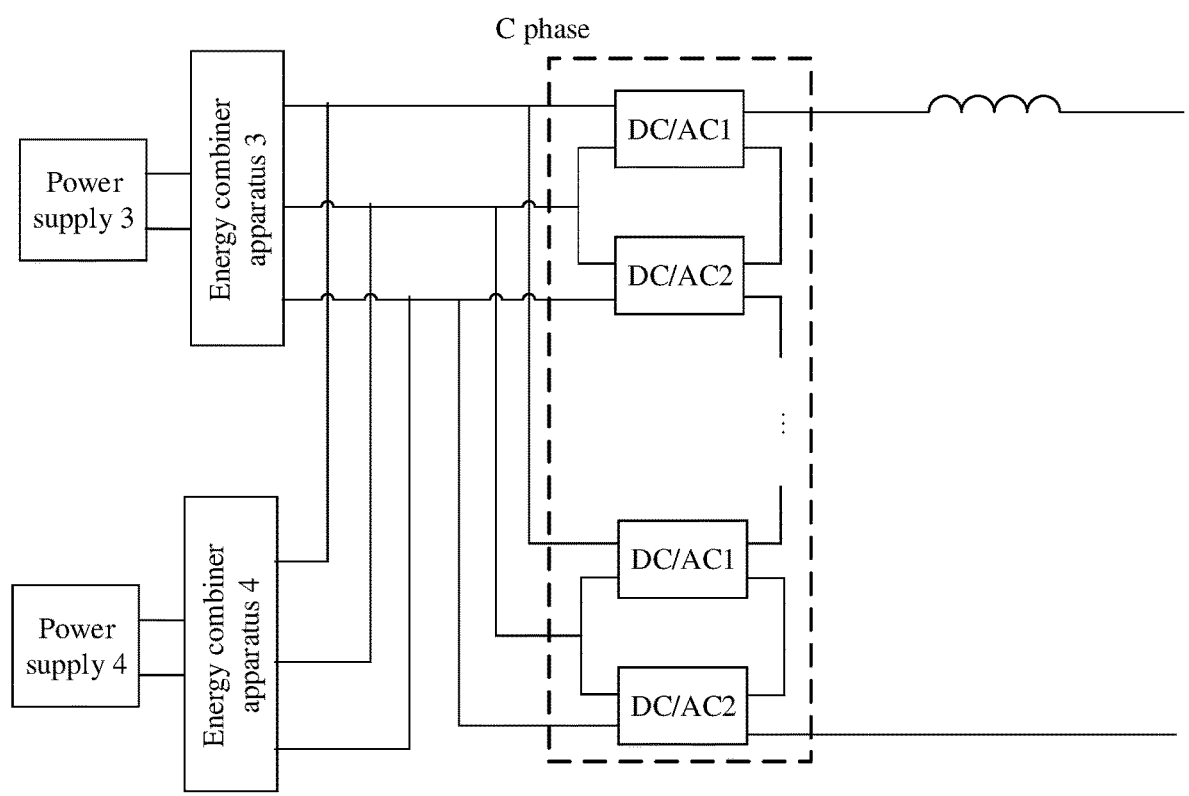
FIG. 10c is a schematic diagram of a C-phase circuit of Embodiment 2 of a power supply system.

FIG. 10a is a schematic diagram of an A-phase circuit of Embodiment 2 of a power supply system. FIG. 10b is a schematic diagram of a B-phase circuit of Embodiment 2 of a power supply system. FIG. 10c is a schematic diagram of a C-phase circuit of Embodiment 2 of a power supply system. It can be understood from FIG. 10a, FIG. 10b, and FIG. 10c that the power supply system includes three phase circuits. Same-type input terminals of direct current/alternating current conversion combinations in each phase circuit are coupled in parallel, and the same-type input terminals coupled in parallel are coupled to an output terminal of at least one energy combiner apparatus. For example, as shown in FIG. 10a and FIG. 10b, same-type input terminals of direct current/alternating current conversion combinations in the phase circuit are coupled in parallel, and the same-type input terminals coupled in parallel are coupled to an output terminal of one energy combiner apparatus. As shown in FIG. 10c, same-type input terminals of direct current/alternating current conversion combinations in the phase circuit are coupled in parallel, and the same-type input terminals coupled in parallel are coupled to output terminals of two energy combiner apparatuses. In actual application, the same-type input terminals that are connected in parallel may be alternatively connected to more energy combiner apparatuses. A quantity of energy combiner apparatuses is not limited in this embodiment. First output terminals and second output terminals of the three phase circuits included in the power supply system shown in FIG. 10a, FIG. 10b, or FIG. 10c may be connected to a grid through a star or delta connection, similar to the foregoing embodiments corresponding to FIG. 8a and FIG. 8b. Details are not described herein again.

In this embodiment, a power supply may be a photovoltaic array or another type of power supply. The power supply is similar to that in the descriptions of the power supply in the foregoing embodiment, and details are not described herein again. The direct current/alternating current conversion combination is similar to that in the foregoing descriptions in the embodiment corresponding to FIG. 6, and details are not described herein again. The phase circuit is similar to that in the foregoing descriptions in embodiments corresponding to FIG. 5a and FIG. 5b, and details are not described herein again. The energy combiner apparatus is similar to that in the foregoing embodiments corresponding to FIG. 4a, FIG. 4b, FIG. 4c, FIG. 4d (as well as FIG. 4d-1 and FIG. 4d-2), FIG. 4e, and FIG. 4f, and details are not described herein again. Isolation DC/AC conversion units (namely, DC/AC1 and DC/AC2 in FIG. 10a, FIG. 10b, and FIG. 10c) are similar to those in the descriptions in embodiments corresponding to FIG. 7a, FIG. 7b, FIG. 7c, FIG. 7d, and FIG. 7e, and details are not described herein again.

In some embodiments, the power supply system further includes an energy storage system. The energy storage system is similar to that in the foregoing descriptions in embodiments corresponding to FIG. 9a, FIG. 9b, FIG. 9c, and FIG. 9d, and details are not described herein again. In some embodiments, modules or units in the power supply system may communicate by using a communication signal coupled on a cable, and control a module or a unit. A case is similar to that in the descriptions in the foregoing embodiment, and details are not described herein again. In addition, for other parts of this embodiment, refer to the foregoing embodiment for implementation, and therefore details are not described again.

Embodiment 3

Figure 11:
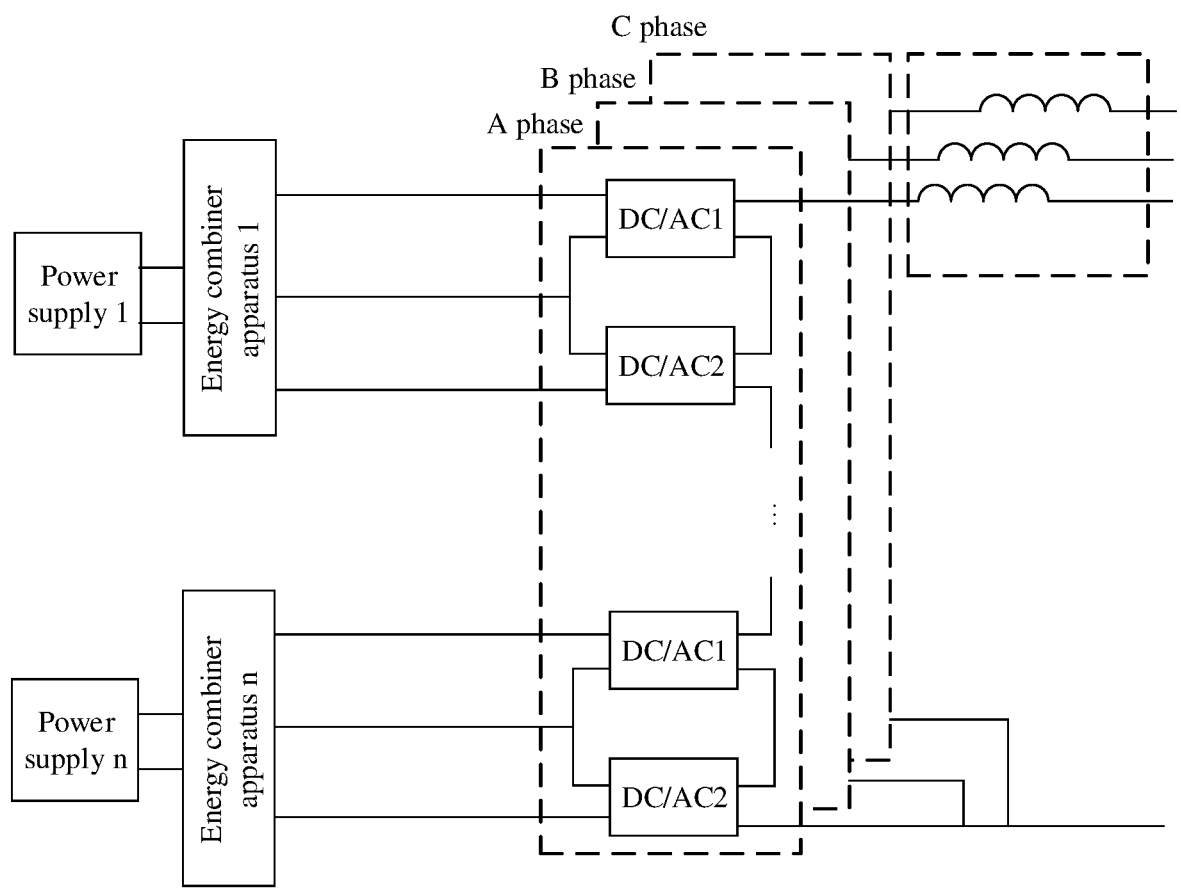
FIG. 11 is a schematic diagram of Embodiment 3 of a power supply system.

FIG. 11 is a schematic diagram of Embodiment 3 of a power supply system. In this embodiment, an input terminal of each direct current/alternating current conversion combination in a phase circuit is coupled to at least one energy combiner apparatus. As shown in FIG. 11, an input terminal of an upper direct current/alternating current conversion combination is coupled to an energy combiner apparatus 1. An input terminal of a lower direct current/alternating current conversion combination is coupled to an energy combiner apparatus n. In actual application, the input terminal of the direct current/alternating current conversion combination may be alternatively coupled to more energy combiner apparatuses. For example, the input terminal of the lower direct current/alternating current conversion combination may be coupled to both the energy combiner apparatus n and another energy combiner apparatus. A quantity of energy combiner apparatuses coupled to the input terminal of the direct current/alternating current conversion combination is not limited in this embodiment. It may be understood that, assuming that an A-phase circuit is coupled to a total of N energy combiner apparatuses, a B-phase circuit is coupled to a total of M energy combiner apparatuses, and a C-phase circuit is coupled to a total of L energy combiner apparatuses, the power supply system is coupled to a total of L+M+N energy combiner apparatuses. Assuming that one energy combiner apparatus is coupled to one power supply, the power supply system is coupled to a total of L+M+N power supplies. First output terminals and second output terminals of three phase circuits included in the power supply system shown in FIG. 11 may be connected to a grid through a star or delta connection, similar to the foregoing embodiments corresponding to FIG. 8a and FIG. 8b. Details are not described herein again.

In this embodiment, the power supply may be a photovoltaic array or another type of power supply. The power supply is similar to that in the descriptions of the power supply in the foregoing embodiment, and details are not described herein again. The direct current/alternating current conversion combination is similar to that in the foregoing descriptions in the embodiment corresponding to FIG. 6, and details are not described herein again. The phase circuit is similar to that in the foregoing descriptions in embodiments corresponding to FIG. 5a and FIG. 5b, and details are not described herein again. The energy combiner apparatus is similar to that in the foregoing embodiments corresponding to FIG. 4a, FIG. 4b, FIG. 4c, FIG. 4d (as well as FIG. 4d-1 and FIG. 4d-2), FIG. 4e, and FIG. 4f, and details are not described herein again. Isolation DC/AC conversion units (namely, DC/AC1 and DC/AC2 in FIG. 11) are similar to those in the descriptions in embodiments corresponding to FIG. 7a, FIG. 7b, FIG. 7c, FIG. 7d, and FIG. 7e, and details are not described herein again.

In some embodiments, the power supply system further includes an energy storage system. The energy storage system is similar to that in the foregoing descriptions in embodiments corresponding to FIG. 9a, FIG. 9b, FIG. 9c, and FIG. 9d, and details are not described herein again. In some embodiments, modules or units in the power supply system may communicate by using a communication signal coupled on a cable, and control a module or a unit. A case is similar to that in the descriptions in the foregoing embodiment, and details are not described herein again. In addition, for other parts of this embodiment, refer to the foregoing embodiment for implementation, and therefore details are not described again.

Embodiment 4

Figure 12:
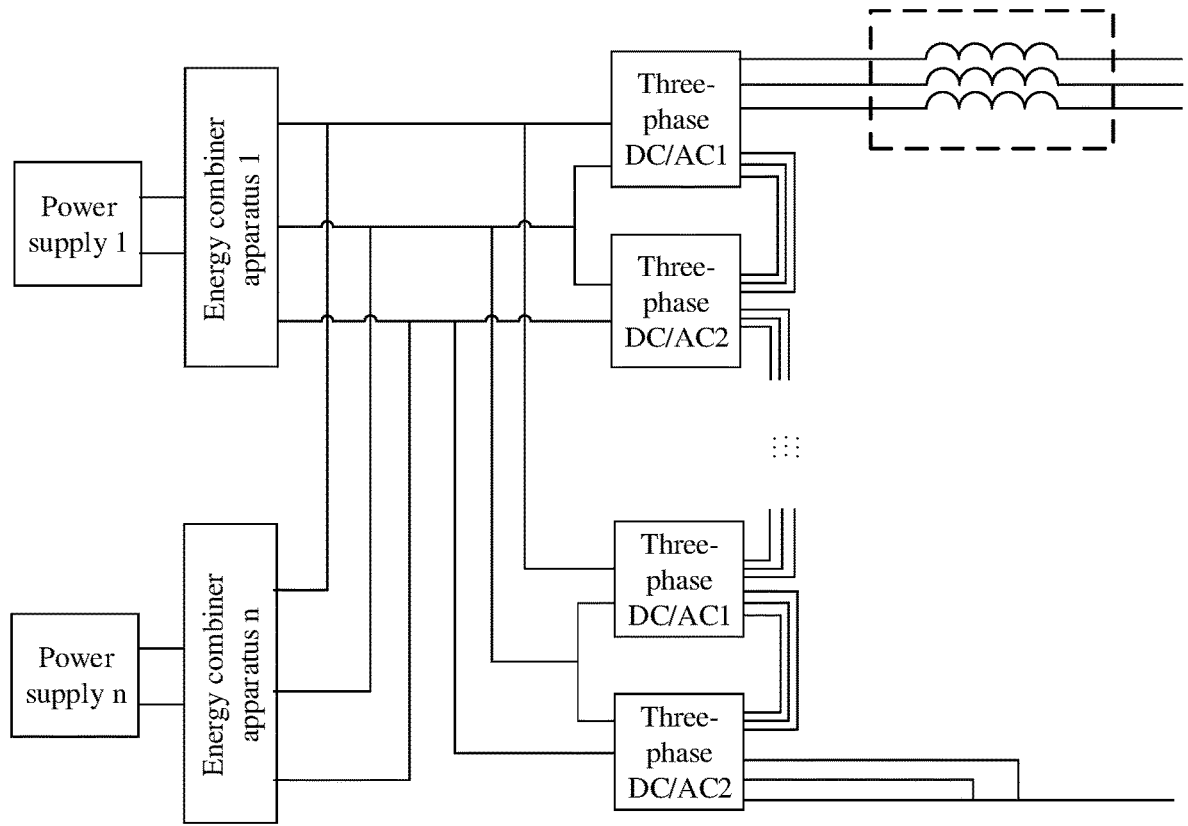
FIG. 12 is a schematic diagram of Embodiment 4 of a power supply system.

FIG. 12 is a schematic diagram of Embodiment 4 of a power supply system. In this embodiment, the power supply system includes at least one power supply, at least one energy combiner apparatus, one three-phase phase circuit, and three corresponding filter units (which may be a three-phase filter unit). The phase circuit includes a plurality of direct current/alternating current conversion combinations. The direct current/alternating current conversion combination includes a first-stage isolation DC/AC conversion unit and a second-stage isolation DC/AC conversion unit. In this embodiment, the first-stage isolation DC/AC conversion unit and the second-stage isolation DC/AC conversion unit each are a three-phase isolation DC/AC conversion unit with six output terminals (a first output terminal, a second output terminal, a third output terminal, a fourth output terminal, a fifth output terminal, and a sixth output terminal).

Figure 13:
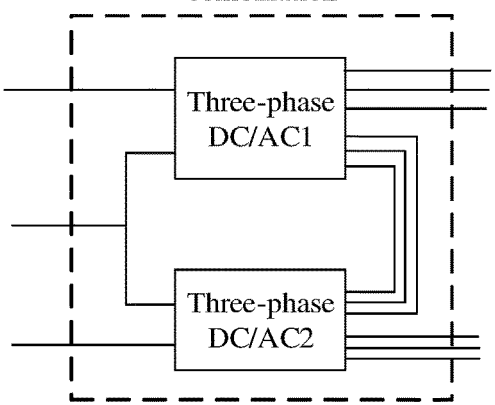
FIG. 13 is a schematic diagram of another direct current/alternating current conversion combination according to an embodiment.

FIG. 13 is a schematic diagram of another direct current/alternating current conversion combination according to an embodiment. As shown in FIG. 13, a first output terminal, a second output terminal, and a third output terminal of a first-stage isolation DC/AC conversion unit (three-phase DC/AC1) in the direct current/alternating current conversion combination are respectively used as a first output terminal, a second output terminal, and a third output terminal of the direct current/alternating current conversion combination, a fourth output terminal, a fifth output terminal, and a sixth output terminal of the first-stage isolation DC/AC conversion unit are correspondingly coupled to a first output terminal, a second output terminal, and a third output terminal of a second-stage isolation DC/AC conversion unit, and a fourth output terminal, a fifth output terminal, and a sixth output terminal of the second-stage isolation DC/AC conversion unit are respectively used as a fourth output terminal, a fifth output terminal, and a sixth output terminal of the direct current/alternating current conversion combination. A three-phase isolation DC/AC conversion module is used, so that a ripple current frequency of a bus on an AC side of the three-phase isolation DC/AC conversion module is triple a frequency of a grid instead of being previously twice the frequency of the grid, and an effective value of a ripple current becomes smaller, and therefore, a capacity of a filter capacitor of the bus can be reduced, and costs are reduced. In addition, a first input terminal of the first-stage isolation DC/AC conversion unit is used as a first input terminal of the direct current/alternating current conversion combination, a second input terminal of the first-stage isolation DC/AC conversion unit is coupled to a first input terminal of the second-stage isolation DC/AC conversion unit, a coupling node is used as a second input terminal of the direct current/alternating current conversion combination, and a second input terminal of the second-stage isolation DC/AC conversion unit is used as a third input terminal of the direct current/alternating current conversion combination.

Figure 14:
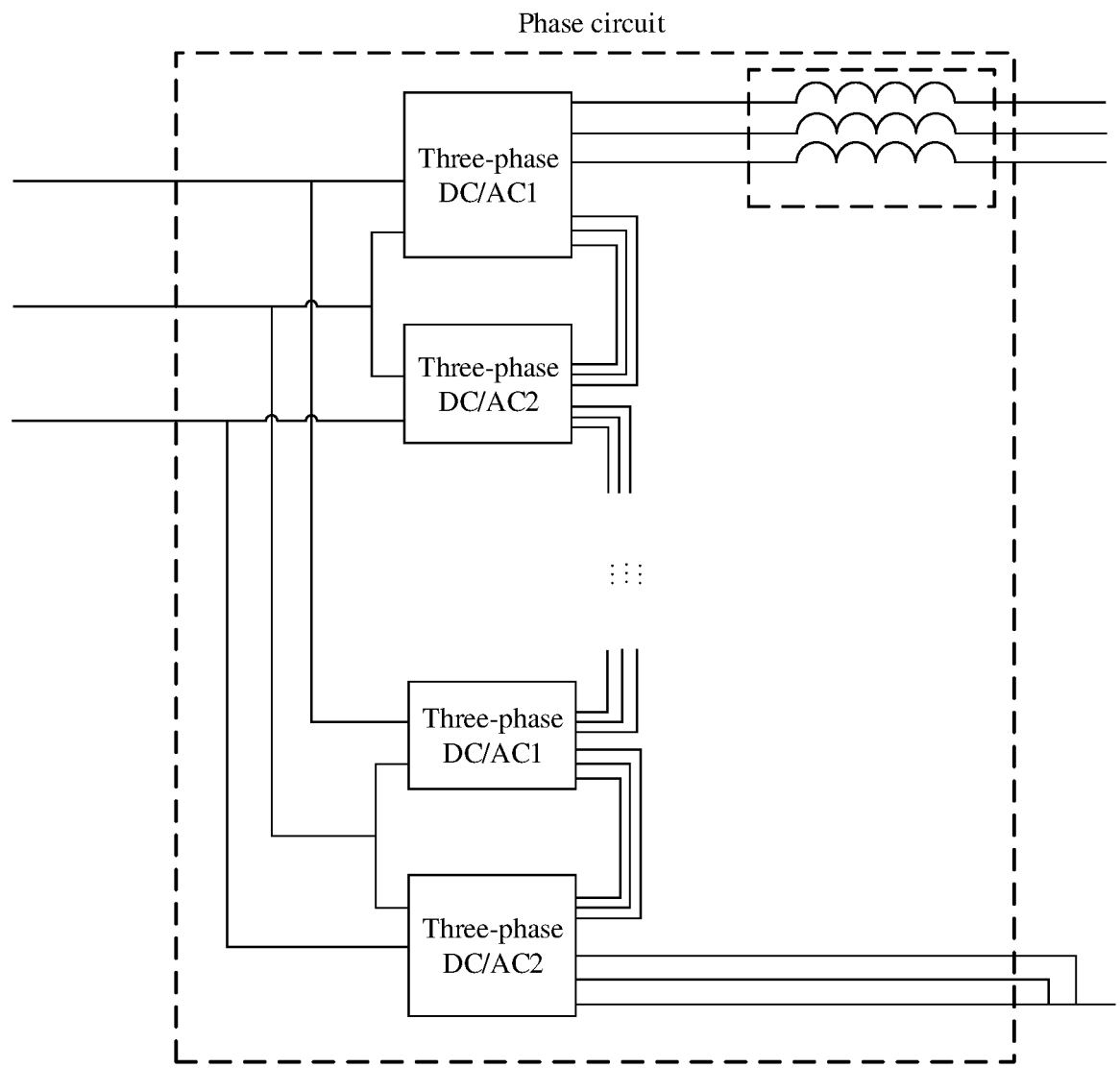
FIG. 14 is a schematic diagram of a three-phase phase circuit according to an embodiment.

FIG. 14 is a schematic diagram of a three-phase phase circuit according to an embodiment. The three-phase phase circuit includes a plurality of direct current/alternating current conversion combinations, output terminals of the direct current/alternating current conversion combinations are separately cascaded, one terminal of cascading is separately connected to input terminals of the three filter units, output terminals of the three filter units are respectively used as a first output terminal, a second output terminal, and a third output terminal of the three-phase phase circuit, and the other terminal of cascading is used as a fourth output terminal, a fifth output terminal, and a sixth output terminal of the three-phase phase circuit. In some embodiments, the fourth output terminal, the fifth output terminal, and the sixth output terminal of the phase circuit are coupled in parallel. In some embodiments, same-type input terminals of the direct current/alternating current conversion combinations in the phase circuit are connected in parallel, and input terminals formed after the parallel connection are used as three input terminals of the phase circuit. In other embodiments, same-type input terminals of the direct current/alternating current conversion combinations are not connected in parallel, and are input terminals of the phase circuit.

In this embodiment, the isolation DC/AC conversion unit may be a three-phase isolation DC/AC conversion unit, and the three-phase isolation DC/AC conversion unit includes two input terminals and six output terminals, namely, a first input terminal, a second input terminal, a first output terminal, a second output terminal, a third output terminal, a fourth output terminal, a fifth output terminal, and a sixth output terminal. In FIG. 12, both the first-stage isolation DC/AC conversion unit (three-phase DC/AC1) and the second-stage isolation DC/AC conversion unit (three-phase DC/AC2) are three-phase isolation DC/AC conversion units, and structures of the first-stage isolation DC/AC conversion unit and the second-stage isolation DC/AC conversion unit may be the same. The three-phase isolation DC/AC conversion units may have a plurality of forms. This is not limited in this embodiment.

Figure 15A:
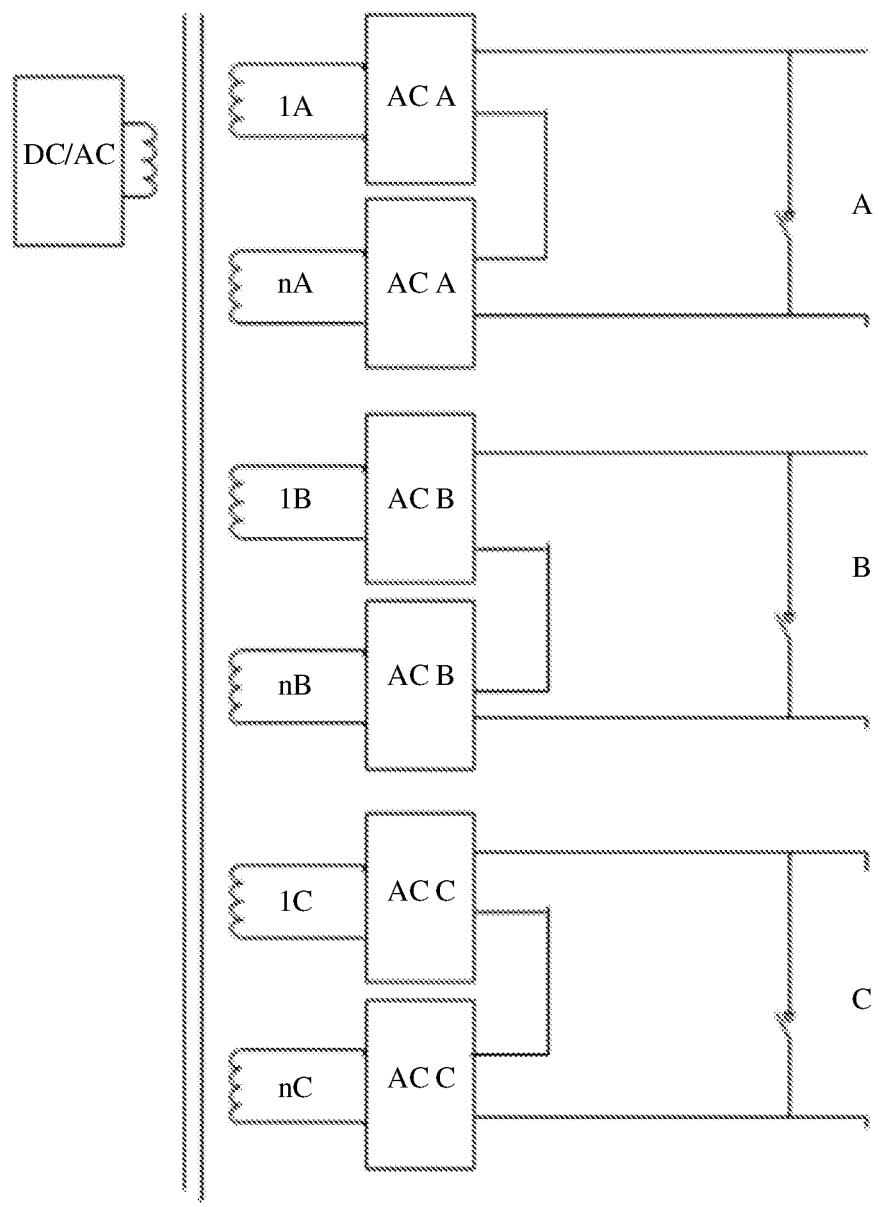
FIG. 15a is a schematic diagram 1 of a three-phase isolation DC/AC conversion unit according to an embodiment.

FIG. 15a is a schematic diagram 1 of a three-phase isolation DC/AC conversion unit according to an embodiment. The three-phase isolation DC/AC conversion unit includes a DC/AC conversion module, a multi-channel output high-frequency transformer, and an AC/AC conversion unit. A ratio of primary windings to secondary windings of the multi-channel output high-frequency transformer is m:3n, where m and n are integers greater than or equal to 1. An input terminal of the DC/AC conversion module is used as an input terminal of the three-phase isolation DC/AC conversion unit. An output terminal of at least one DC/AC conversion module is connected to the primary winding. The secondary winding is coupled to an input terminal of a corresponding AC/AC conversion unit. The 3n secondary windings may be classified into a total of three groups (namely, a group A, a group B, and a group C), each group may include n secondary windings, and the n secondary windings may be coupled to at least one AC/AC conversion unit. In this embodiment, output terminals of AC/AC conversion units corresponding to one secondary winding group are cascaded, one terminal of cascading is a first output terminal, a second output terminal, or a third output terminal of the three-phase isolation DC/AC conversion unit, and the other terminal of cascading is a fourth output terminal, a fifth output terminal, or a sixth output terminal of the three-phase isolation DC/AC conversion unit. For example, output terminals of AC/AC conversion units corresponding to the secondary winding group A are cascaded, one terminal of cascading is the first output terminal of the three-phase isolation DC/AC conversion unit, and the other terminal of cascading is the fourth output terminal of the three-phase isolation DC/AC conversion unit. For another example, output terminals of AC/AC conversion units corresponding to the secondary winding group B are cascaded, one terminal of cascading is the second output terminal of the three-phase isolation DC/AC conversion unit, and the other terminal of cascading is the fifth output terminal of the three-phase isolation DC/AC conversion unit. Output terminals of AC/AC conversion units corresponding to the secondary winding group C are cascaded, one terminal of cascading is the third output terminal of the three-phase isolation DC/AC conversion unit, and the other terminal of cascading is the sixth output terminal of the three-phase isolation DC/AC conversion unit. Output of the AC/AC conversion unit is a sinusoidal alternating current voltage of 50 Hz or 60 Hz. The three-phase isolation DC/AC conversion unit shown in FIG. 15a can implement a direct current/alternating current conversion function, and input and output can be isolated, so that the power supply system can implement an isolated grid connection. In addition, the three-phase isolation DC/AC conversion unit shown in FIG. 15a has six output terminals, and therefore, a quantity of connection ports of a three-phase transformer can be met, a formed three-phase phase circuit can be directly connected to the grid, and no other phase circuit is required.

In some embodiments, a bypass unit is coupled in parallel between the first output terminal and the fourth output terminal of the three-phase isolation DC/AC conversion unit, and/or a bypass unit is coupled in parallel between the second output terminal and the fifth output terminal of the three-phase isolation DC/AC conversion unit, and/or a bypass unit is coupled in parallel between the third output terminal and the sixth output terminal of the three-phase isolation DC/AC conversion unit, to control, when a phase circuit (an A-phase circuit, a B-phase circuit, or a C-phase circuit) in the three-phase isolation DC/AC conversion unit does not need to work, the bypass unit to be opened to implement a bypass function. The bypass unit may include one or more of a switch, a contactor, a relay, a circuit breaker, and a semiconductor switching component. In actual application, the bypass unit may alternatively include another component. This is not limited in this embodiment.

Figure 15B:
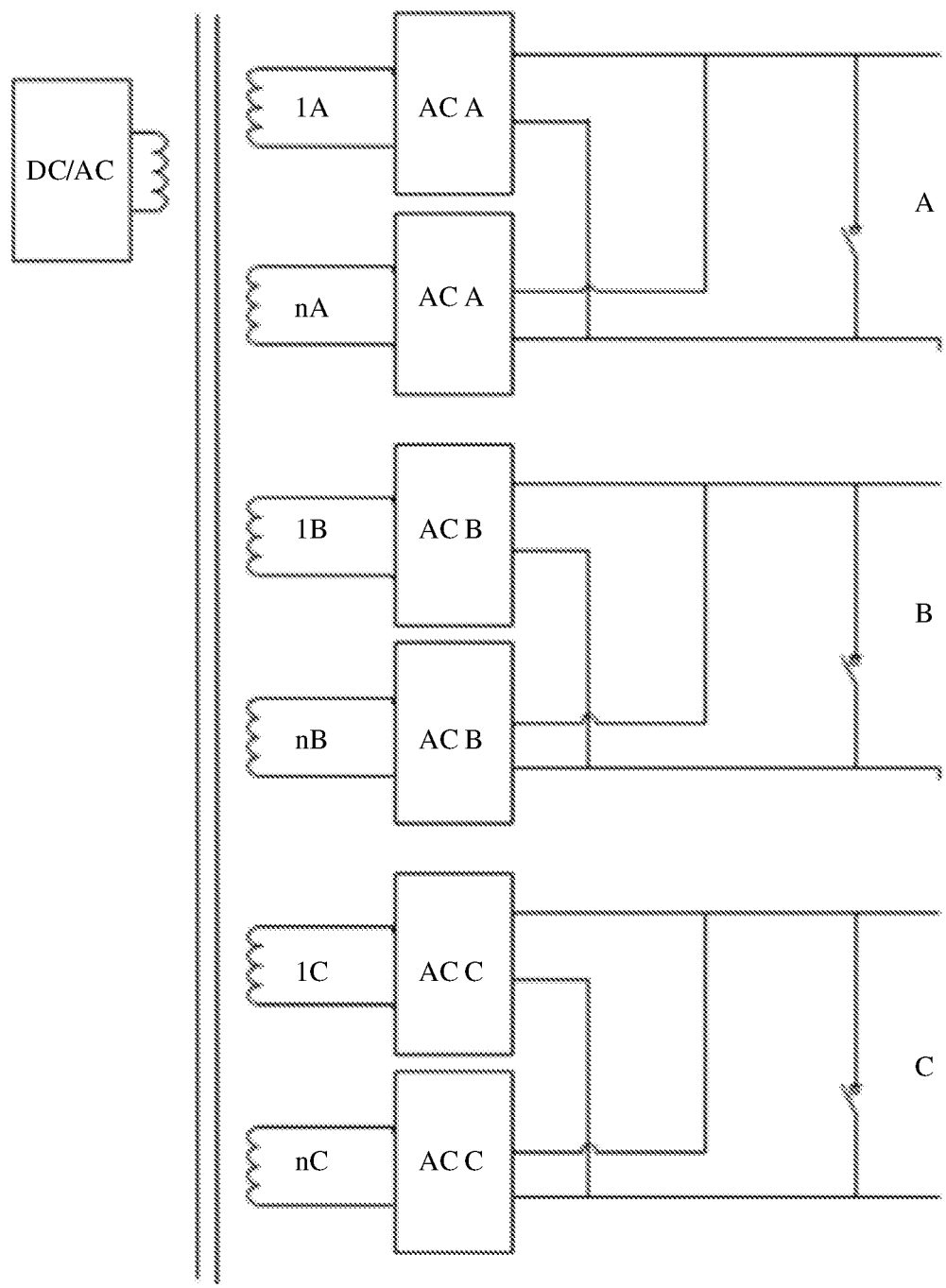
FIG. 15b is a schematic diagram 2 of a three-phase isolation DC/AC conversion unit according to an embodiment.

FIG. 15b is a schematic diagram 2 of a three-phase isolation DC/AC conversion unit according to an embodiment. The three-phase isolation DC/AC conversion unit includes a DC/AC conversion module, a multi-channel output high-frequency transformer, and an AC/AC conversion unit. A ratio of primary windings to secondary windings of the multi-channel output high-frequency transformer is m:3n, where m and n are integers greater than or equal to 1. An input terminal of the DC/AC conversion module is used as an input terminal of the three-phase isolation DC/AC conversion unit. An output terminal of at least one DC/AC conversion module is connected to the primary winding. The secondary winding is coupled to an input terminal of a corresponding AC/AC conversion unit. The 3n secondary windings may be classified into a total of three groups (namely, a group A, a group B, and a group C), each group may include n secondary windings, and the n secondary windings may be coupled to at least one AC/AC conversion unit. In this embodiment, same-type output terminals of AC/AC conversion units corresponding to one secondary winding group are connected in parallel. For example, all first output terminals of AC/AC conversion units corresponding to the secondary winding group A are coupled to a first output terminal of the three-phase isolation DC/AC conversion unit in parallel, and all second output terminals of the AC/AC conversion units corresponding to the secondary winding group A are coupled to a fourth output terminal of the three-phase isolation DC/AC conversion unit in parallel. All first output terminals of AC/AC conversion units corresponding to the secondary winding group B are coupled to a second output terminal of the three-phase isolation DC/AC conversion unit in parallel, and all second output terminals of the AC/AC conversion units corresponding to the secondary winding group B are coupled to a fifth output terminal of the three-phase isolation DC/AC conversion unit in parallel. All first output terminals of AC/AC conversion units corresponding to the secondary winding group C are coupled to a third output terminal of the three-phase isolation DC/AC conversion unit in parallel, and all second output terminals of the AC/AC conversion units corresponding to the secondary winding group C are coupled to a sixth output terminal of the three-phase isolation DC/AC conversion unit in parallel. Output of the AC/AC conversion unit is a sinusoidal alternating current voltage of 50 Hz or 60 Hz. The three-phase isolation DC/AC conversion unit shown in FIG. 15b can implement a direct current/alternating current conversion function, and input and output can be isolated, so that the power supply system can implement an isolated grid connection. In addition, the three-phase isolation DC/AC conversion unit shown in FIG. 15b has six output terminals, and therefore, a quantity of connection ports of a three-phase transformer can be met, a formed three-phase phase circuit can be directly connected to the grid, and no other phase circuit is required.

In some embodiments, at least one bypass unit may be further disposed in the three-phase isolation DC/AC conversion unit. A case may be similar to that in the embodiment corresponding to FIG. 15a, and details are not described herein again.

Figure 15C:
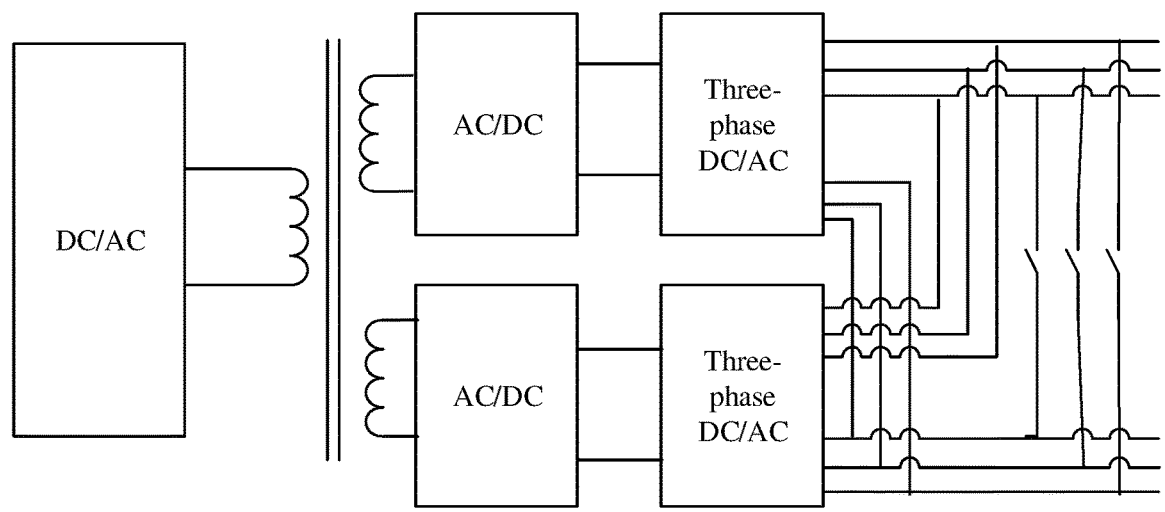
FIG. 15c is a schematic diagram 3 of a three-phase isolation DC/AC conversion unit according to an embodiment.

FIG. 15c is a schematic diagram 3 of a three-phase isolation DC/AC conversion unit according to an embodiment. The three-phase isolation DC/AC conversion unit includes a DC/AC conversion module, a multi-channel output high-frequency transformer, an AC/DC conversion unit, and a three-phase DC/AC conversion unit. A ratio of primary windings to secondary windings of the multi-channel output high-frequency transformer is m:n, where m and n are integers greater than or equal to 1. An input terminal of the DC/AC conversion module is used as an input terminal of the three-phase isolation DC/AC conversion unit. An output terminal of at least one DC/AC conversion module is connected to the primary winding. The secondary winding is coupled to an input terminal of a corresponding AC/DC conversion unit, and an output terminal of the AC/DC conversion unit is coupled to the three-phase DC/AC conversion unit. The three-phase DC/AC conversion unit has two input terminals and six output terminals. A case may be similar to that in the embodiment corresponding to FIG. 15a, or may be similar to that in the embodiment corresponding to FIG. 15b. In actual application, the three-phase DC/AC conversion unit may alternatively have another implementation, for example, a non-isolation DC/AC conversion unit. This is not limited in this embodiment. In this embodiment, the three-phase DC/AC conversion unit is used, so that a ripple current frequency of a bus on a DC side of the three-phase DC/AC conversion unit is triple a frequency of the grid instead of being previously twice the frequency of the grid, and an effective value of a ripple current becomes smaller, and therefore, a capacity of a filter capacitor of the bus can be reduced, and costs are reduced. In this embodiment, same-type output terminals of three-phase DC/AC conversion units are coupled in parallel. For example, a first output terminal of the three-phase DC/AC conversion unit is coupled to a first output terminal of another three-phase DC/AC conversion unit in parallel, and a parallel coupling node is used as a first output terminal of the three-phase isolation DC/AC conversion unit. For another example, a second output terminal of the three-phase DC/AC conversion unit is coupled to a second output terminal of another three-phase DC/AC conversion unit in parallel, and a parallel coupling node is used as a second output terminal of the three-phase isolation DC/AC conversion unit. A parallel connection case of other output terminals is similar, and is not described herein. The same-type output terminals of the three-phase DC/AC conversion units are connected in parallel to form six output terminals of the three-phase isolation DC/AC conversion unit. The three-phase isolation DC/AC conversion unit shown in FIG. 15c can implement a direct current/alternating current conversion function, and input and output can be isolated, so that the power supply system can implement an isolated grid connection. In addition, the three-phase isolation DC/AC conversion unit shown in FIG. 15c has six output terminals, and therefore, a quantity of connection ports of a three-phase transformer can be met, a formed three-phase phase circuit can be directly connected to the grid, and no other phase circuit is required.

In some embodiments, at least one bypass unit may be further disposed in the three-phase isolation DC/AC conversion unit. That is, a bypass unit is coupled in parallel between the first output terminal and a fourth output terminal of the three-phase isolation DC/AC conversion unit, and/or a bypass unit is coupled in parallel between the second output terminal and a fifth output terminal of the three-phase isolation DC/AC conversion unit, and/or a bypass unit is coupled in parallel between a third output terminal and a sixth output terminal of the three-phase isolation DC/AC conversion unit, to control, when a phase circuit (an A-phase circuit, a B-phase circuit, or a C-phase circuit) in the three-phase isolation DC/AC conversion unit does not need to work, the bypass unit to be opened to implement a bypass function. The bypass unit may include one or more of a switch, a contactor, a relay, a circuit breaker, and a semiconductor switching component. In actual application, the bypass unit may alternatively include another component. This is not limited in this embodiment.

Figure 15D:
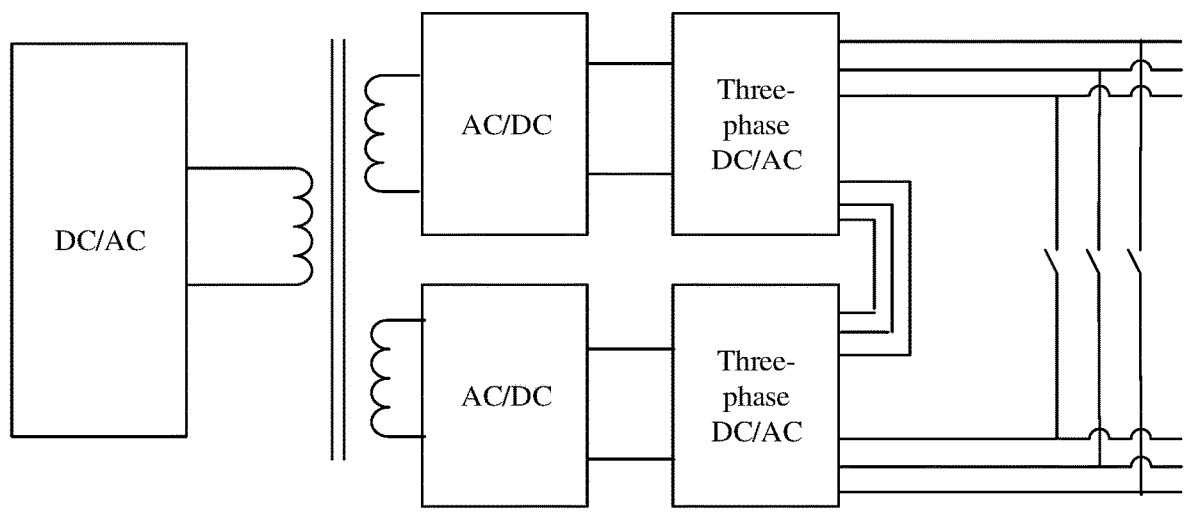
FIG. 15d is a schematic diagram 4 of a three-phase isolation DC/AC conversion unit according to an embodiment.

FIG. 15d is a schematic diagram 4 of a three-phase isolation DC/AC conversion unit according to an embodiment. The three-phase isolation DC/AC conversion unit includes a DC/AC conversion module, a multi-channel output high-frequency transformer, an AC/DC conversion unit, and a three-phase DC/AC conversion unit. A ratio of primary windings to secondary windings of the multi-channel output high-frequency transformer is m:n, where m and n are integers greater than or equal to 1. An input terminal of the DC/AC conversion module is used as an input terminal of the three-phase isolation DC/AC conversion unit. An output terminal of at least one DC/AC conversion module is connected to the primary winding. The secondary winding is coupled to an input terminal of a corresponding AC/DC conversion unit, and an output terminal of the AC/DC conversion unit is coupled to the three-phase DC/AC conversion unit. The three-phase DC/AC conversion unit has two input terminals and six output terminals. A case may be similar to that in the embodiment corresponding to FIG. 15a, or may be similar to that in the embodiment corresponding to FIG. 15b. In actual application, the three-phase DC/AC conversion unit may alternatively have another implementation. This is not limited in this embodiment. In this embodiment, a ripple current frequency of a bus on an AC side of the three-phase DC/AC conversion unit is triple a frequency of the grid instead of being previously twice the frequency of the grid, and an effective value of a ripple current becomes smaller, so that a capacity of a filter capacitor of the bus can be reduced, and costs are reduced. In this embodiment, output terminals of three-phase DC/AC conversion units are cascaded, one terminal of cascading is a first output terminal, a second output terminal, and a third output terminal of the three-phase isolation DC/AC conversion unit, and the other terminal of cascading is a fourth output terminal, a fifth output terminal, and a sixth output terminal of the three-phase isolation DC/AC conversion unit. The three-phase isolation DC/AC conversion unit shown in FIG. 15d can implement a direct current/alternating current conversion function, and input and output can be isolated, so that the power supply system can implement an isolated grid connection. In addition, the three-phase isolation DC/AC conversion unit shown in FIG. 15d has six output terminals, and therefore, a quantity of connection ports of a three-phase transformer can be met, a formed three-phase phase circuit can be directly connected to the grid, and no other phase circuit is required.

In some embodiments, the three-phase isolation DC/AC conversion unit may further include at least one bypass unit. A case may be similar to that in the embodiment corresponding to FIG. 15c, and details are not described herein again.

Figure 15E:
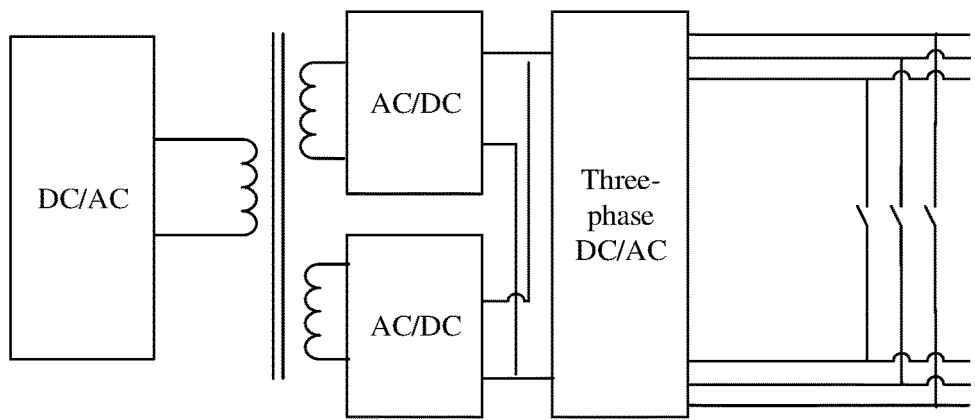
FIG. 15e is a schematic diagram 5 of a three-phase isolation DC/AC conversion unit according to an embodiment.

FIG. 15e is a schematic diagram 5 of a three-phase isolation DC/AC conversion unit according to an embodiment. The three-phase isolation DC/AC conversion unit includes a DC/AC conversion module, a multi-channel output high-frequency transformer, an AC/DC conversion unit, and one three-phase DC/AC conversion unit. A ratio of primary windings to secondary windings of the multi-channel output high-frequency transformer is m:n, where m and n are integers greater than or equal to 1. An input terminal of the DC/AC conversion module is used as an input terminal of the three-phase isolation DC/AC conversion unit. An output terminal of at least one DC/AC conversion module is connected to the primary winding. The secondary winding is coupled to an input terminal of a corresponding AC/DC conversion unit. Same-type output terminals of AC/DC conversion units are connected in parallel. For example, a first output terminal of the first AC/DC conversion unit is connected to a first output terminal of another AC/DC conversion unit in parallel. The parallel output terminals of the AC/DC conversion units are coupled to the three-phase DC/AC conversion unit. The three-phase DC/AC conversion unit has two input terminals and six output terminals. A case may be similar to that in the embodiment corresponding to FIG. 15a, or may be similar to that in the embodiment corresponding to FIG. 15b. In actual application, the three-phase DC/AC conversion unit may alternatively have another implementation. This is not limited in this embodiment. The six output terminals of the three-phase DC/AC conversion unit may be used as six output terminals of the three-phase isolation DC/AC. The three-phase isolation DC/AC conversion unit shown in FIG. 15e can implement a direct current/alternating current conversion function, and input and output can be isolated, so that the power supply system can implement an isolated grid connection. In addition, the three-phase isolation DC/AC conversion unit shown in FIG. 15e has six output terminals, and therefore, a quantity of connection ports of a three-phase transformer can be met, a formed three-phase phase circuit can be directly connected to the grid, and no other phase circuit is required.

In some embodiments, the three-phase isolation DC/AC conversion unit may further include at least one bypass unit. A case may be similar to that in the embodiment corresponding to FIG. 15c, and details are not described herein again.

As shown in FIG. 12, a first output terminal, a second output terminal, a third output terminal, a fourth output terminal, a fifth output terminal, and a sixth output terminal of the three-phase phase circuit may be connected to the grid through a star or delta connection. A case is similar to that in the foregoing embodiments corresponding to FIG. 8a and FIG. 8b, and details are not described herein again.

A coupling manner between the energy combiner apparatus and the phase circuit in FIG. 12 may be similar to that in the embodiment corresponding to FIG. 3, and details are not described herein again. In some embodiments, the coupling manner between the energy combiner apparatus and the phase circuit is similar to that in FIG. 11, and details are not described herein again.

In this embodiment, the power supply may be a photovoltaic array or another type of power supply. The power supply is similar to that in the descriptions of the power supply in the foregoing embodiment, and details are not described herein again. The energy combiner apparatus is similar to that in the foregoing embodiments corresponding to FIG. 4a, FIG. 4b, FIG. 4c, FIG. 4d (as well as FIG. 4d-1 and FIG. 4d-2), FIG. 4e, and FIG. 4f, and details are not described herein again.

In some embodiments, the power supply system further includes an energy storage system. The energy storage system is similar to that in the foregoing descriptions in embodiments corresponding to FIG. 9a, FIG. 9b, FIG. 9c, and FIG. 9d, and details are not described herein again. In some embodiments, modules or units in the power supply system may communicate by using a communication signal coupled on a cable, and control a module or a unit. A case is similar to that in the descriptions in the foregoing embodiment, and details are not described herein again. In addition, for other parts of this embodiment, refer to the foregoing embodiment for implementation, and therefore details are not described again.

Embodiment 5

Figure 16:
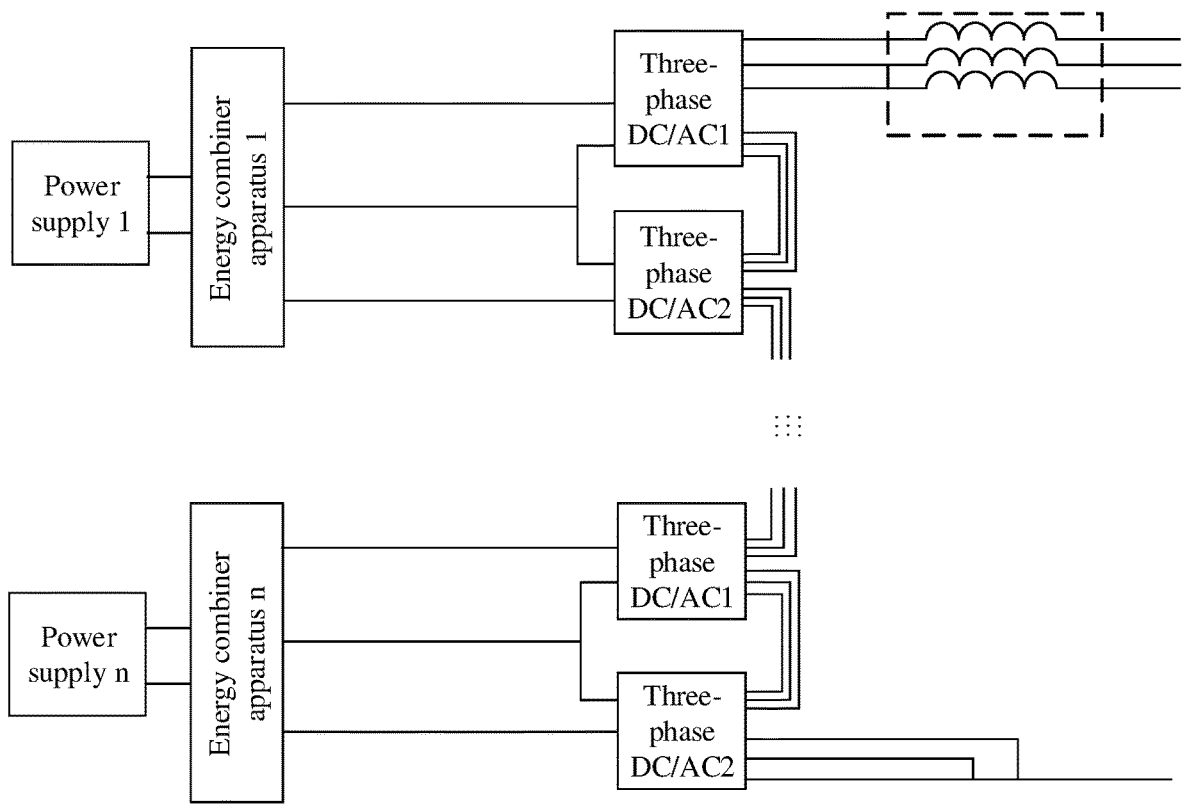
FIG. 16 is a schematic diagram of Embodiment 5 of a power supply system according to embodiments.

FIG. 16 is a schematic diagram of Embodiment 5 of a power supply system. In this embodiment, the power supply system includes at least one power supply, at least one energy combiner apparatus, one three-phase phase circuit, and three corresponding filter units. An input terminal of each direct current/alternating current conversion combination in the phase circuit is coupled to at least one energy combiner apparatus. As shown in FIG. 16, an input terminal of an upper direct current/alternating current conversion combination is coupled to an energy combiner apparatus 1. An input terminal of a lower direct current/alternating current conversion combination is coupled to an energy combiner apparatus n. In actual application, the input terminal of the direct current/alternating current conversion combination may be alternatively coupled to more energy combiner apparatuses. For example, the input terminal of the lower direct current/alternating current conversion combination may be coupled to both the energy combiner apparatus n and another energy combiner apparatus. A quantity of energy combiner apparatuses coupled to the input terminal of the direct current/alternating current conversion combination is not limited in this embodiment. In this embodiment, a coupling manner between the energy combiner apparatus and the three-phase phase circuit may be similar to that in FIG. 11.

In this embodiment, an internal structure of the three-phase phase circuit is similar to that in the foregoing descriptions in Embodiment 4, and details are not described herein again. The three-phase phase circuit may be connected to a grid through a star or delta connection. A case is similar to that in the foregoing descriptions in Embodiment 4, and details are not described herein again.

In this embodiment, the power supply may be a photovoltaic array or another type of power supply. The power supply is similar to that in the descriptions of the power supply in the foregoing embodiment, and details are not described herein again. The energy combiner apparatus is similar to that in the foregoing embodiments corresponding to FIG. 4a, FIG. 4b, FIG. 4c, FIG. 4d (as well as FIG. 4d-1 and FIG. 4d-2), FIG. 4e, and FIG. 4f, and details are not described herein again.

In some embodiments, the power supply system further includes an energy storage system. The energy storage system is similar to that in the foregoing descriptions in embodiments corresponding to FIG. 9a, FIG. 9b, FIG. 9c, and FIG. 9d, and details are not described herein again. In some embodiments, modules or units in the power supply system may communicate by using a communication signal coupled on a cable, and control a module or a unit. A case is similar to that in the descriptions in the foregoing embodiment, and details are not described herein again. In addition, for other parts of this embodiment, for example, an implementation of performing communication by using a communication signal and implementations of an optimizer and a shutdown device, refer to the foregoing embodiment for implementation, and therefore details are not described again.

Embodiment 6

Figure 17:
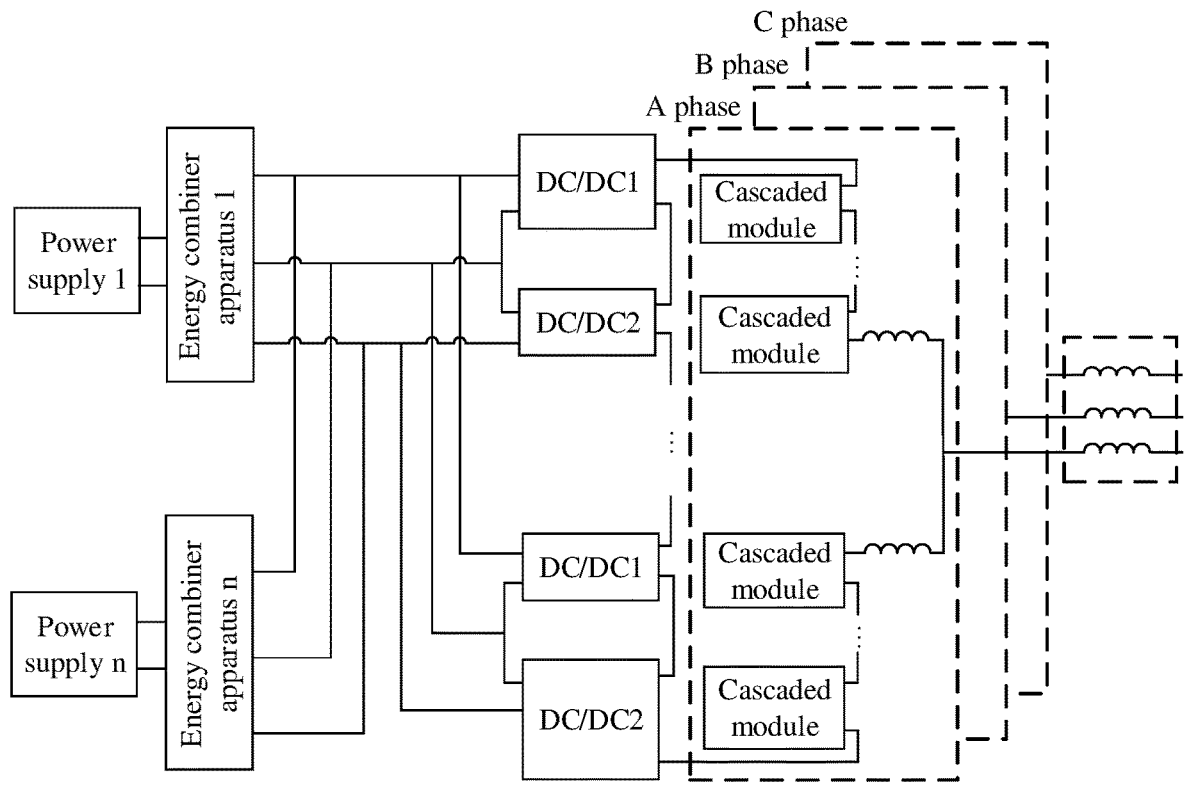
FIG. 17 is a schematic diagram of Embodiment 6 of a power supply system.

FIG. 17 is a schematic diagram of Embodiment 6 of a power supply system. In this embodiment, the power supply system includes at least one power supply, at least one energy combiner apparatus, one high-voltage cascade circuit, and three phase circuits. The power supply and the energy combiner apparatus are similar to those in the foregoing descriptions in Embodiment 1, and details are not described herein again. A coupling manner between the energy combiner apparatus and the high-voltage cascade circuit may be similar to that in the foregoing descriptions in Embodiment 1, Embodiment 2, or Embodiment 3, and details are not described herein again.

Different from Embodiment 1, in this embodiment, the high-voltage cascade circuit is formed by cascading a plurality of direct current/direct current conversion combinations. The direct current/direct current conversion combination includes a first-stage isolation DC/DC conversion unit (DC/DC1 in FIG. 17) and a second-stage isolation DC/DC conversion unit (DC/DC2 in FIG. 17). Output terminals of the first-stage isolation DC/DC conversion unit and the second-stage isolation DC/DC conversion unit are cascaded, one terminal of cascading is used as a first output terminal of the direct current/direct current conversion combination, and the other terminal of cascading is used as a second output terminal of the direct current/direct current conversion combination. In addition, a first input terminal of the first-stage isolation DC/DC conversion unit is used as a first input terminal of the direct current/direct current conversion combination, a second input terminal of the first-stage isolation DC/DC conversion unit is coupled to a first input terminal of the second-stage isolation DC/DC conversion unit, a coupling node is used as a second input terminal of the direct current/direct current conversion combination, and a second input terminal of the second-stage isolation DC/DC conversion unit is used as a third input terminal of the direct current/alternating current conversion combination.

In this embodiment, two output terminals (a first output terminal and a second output terminal) of the high-voltage cascade circuit are coupled to the phase circuit. The phase circuit includes an upper bridge arm, a lower bridge arm, and two inductor elements (including a first inductor element and a second inductor element). One terminal of the upper bridge arm is connected to one output terminal of the high-voltage cascade circuit, the other terminal of the upper bridge arm is connected to an input terminal of the first inductor element, one terminal of the lower bridge arm is connected to the other output terminal of the high-voltage cascade circuit, and the other terminal of the lower bridge arm is connected to an input terminal of the second inductor element. An output terminal of the first inductor element is coupled to an output terminal of the second inductor element, and a coupling node is used as an output terminal of the phase circuit. The inductor element is similar to that in the descriptions in the foregoing embodiment, and details are not described herein again.

In this embodiment, output terminals of the high-voltage cascade circuit may be coupled to the three phase circuits, and each phase circuit has one output terminal. Therefore, there are a total of three output terminals. The three output terminals are separately coupled to filter units and are then connected to a grid as an A-phase circuit, a B-phase circuit, and a C-phase circuit.

In this embodiment, the upper bridge arm and the lower bridge arm are structurally symmetrical and each of the upper bridge arm and the lower bridge arm includes a plurality of cascaded modules. For example, the upper bridge arm includes a plurality of cascaded modules, the plurality of cascaded modules may be cascaded, one terminal of the cascaded module may be used as one terminal of the upper bridge arm, and the other terminal of the cascaded module may be used as the other terminal of the upper bridge arm.

Figure 18A:
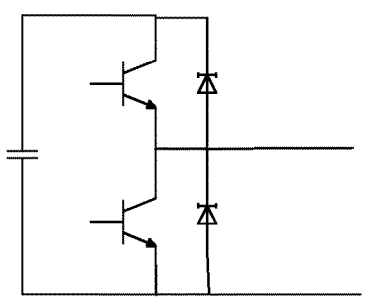
FIG. 18a is a schematic diagram 1 of a cascaded module according to an embodiment.
Figure 18B:
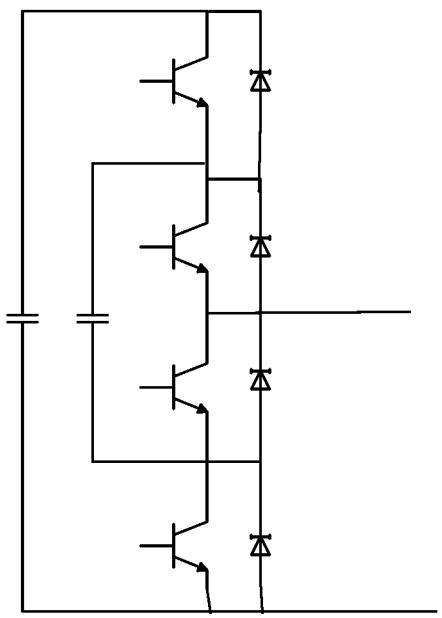
FIG. 18b is a schematic diagram 2 of a cascaded module according to an embodiment.
Figure 18C:
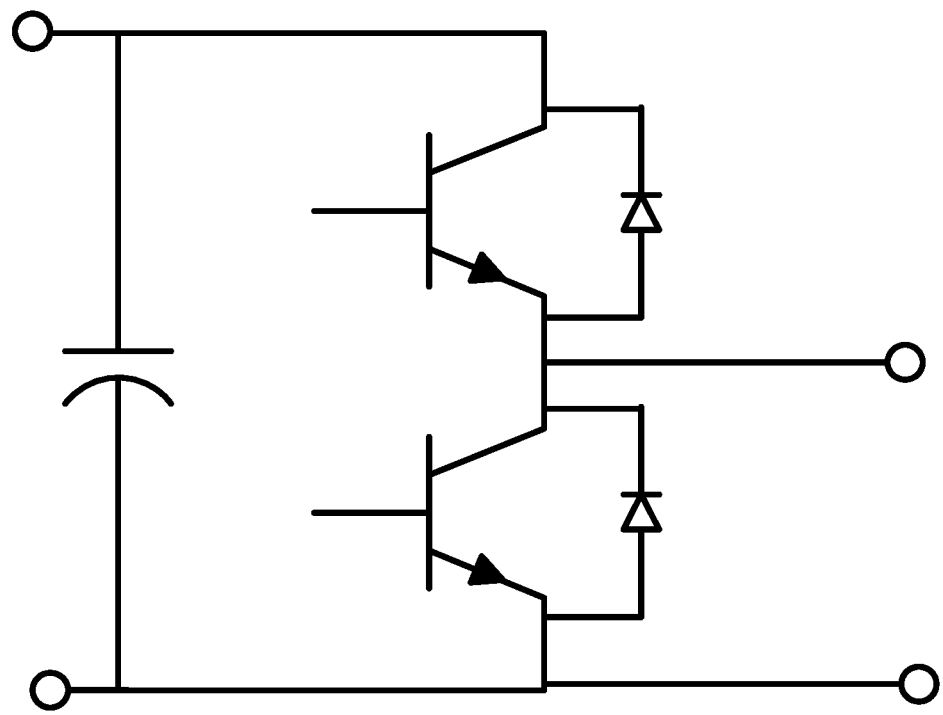
FIG. 18c is a schematic diagram 3 of a cascaded module according to an embodiment.
Figure 18D:
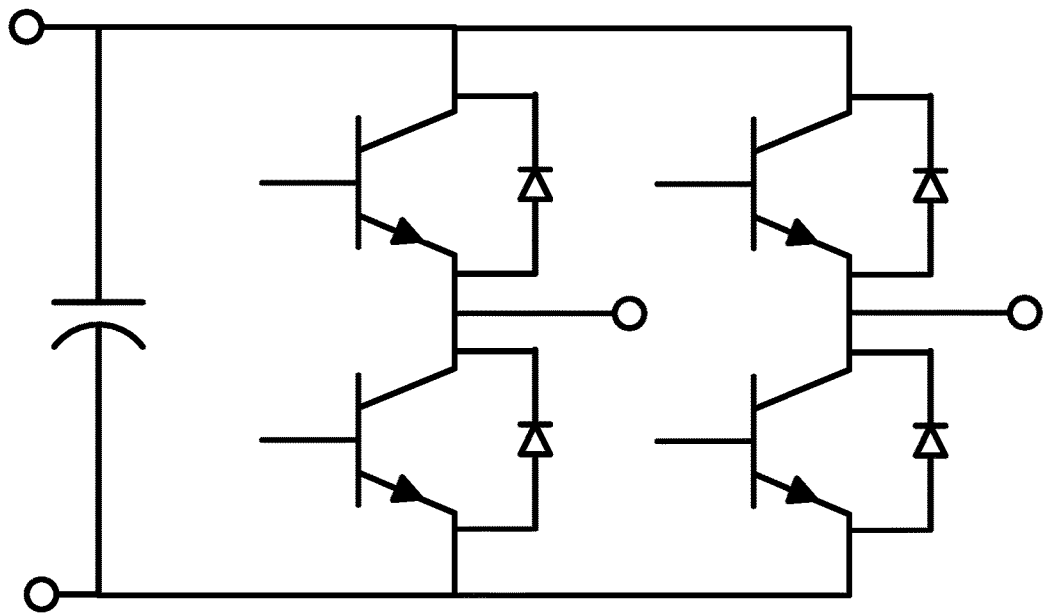
FIG. 18d is a schematic diagram 4 of a cascaded module according to an embodiment.

In this embodiment, a main circuit of the cascaded module may be a half-bridge topology, a full-bridge topology, or a multi-level topology. FIG. 18a and FIG. 18b are examples of the multi-level topology, FIG. 18c is an example of the half-bridge topology, and FIG. 18d is an example of the full-bridge topology.

FIG. 18a is a schematic diagram 1 of a cascaded module according to an embodiment. The cascaded module includes a capacitor unit, two switching transistors, and two diodes. The two switching transistors are connected in series and are then coupled to the capacitor, and each of the two switching transistors is connected to one diode in parallel. A series connection node of the two switching transistors is coupled to a first port of the cascaded module, and a coupling node of the two switching transistors and the capacitor is coupled to a second port of the cascaded module. In actual application, the switching transistor may be a transistor, a MOS transistor, or another switching element. This is not limited in this embodiment.

FIG. 18b is a schematic diagram 2 of a cascaded module according to an embodiment. The cascaded module includes a first capacitor, a second capacitor, four switching transistors, and four diodes. The four switching transistors are connected in series and are then coupled to the first capacitor, and each of the four switching transistors is connected to one diode in parallel. Two terminals that are of two middle switching transistors in the four switching transistors and that are connected in series are connected to the second capacitor in parallel. A series connection node of the two middle switching transistors in the four switching transistors is coupled to a first port of the cascaded module, and a coupling node of the four switching transistors and the first capacitor is coupled to a second port of the cascaded module. In actual application, the switching transistor may be a transistor, a MOS transistor, or another switching element. This is not limited in this embodiment.

In actual application, in addition to a three-level topology shown in FIG. 18a and a four-level topology shown in FIG. 18b, the cascaded module may be another multi-level topology, for example, a five-level or six-level topology. A topology structure and a principle thereof are similar, and details are not described in this embodiment.

FIG. 18c is a schematic diagram 3 of a cascaded module according to an embodiment. A main circuit of the cascaded module is a half-bridge topology. Two right ports of the cascaded module may be used as input/output ports. Details are not described in this embodiment.

FIG. 18d is a schematic diagram 4 of a cascaded module according to an embodiment. A main circuit of the cascaded module is a full-bridge topology. Two right ports of the cascaded module may be used as input/output ports. Details are not described in this embodiment.

In actual application, the cascaded module may alternatively have another implementation. This is not limited in this embodiment.

In addition, for other parts of this embodiment, for example, an implementation of performing communication by using a communication signal and implementations of an optimizer and a shutdown device, refer to the foregoing embodiment for implementation, and therefore details are not described again.

Embodiment 7

Figure 19:
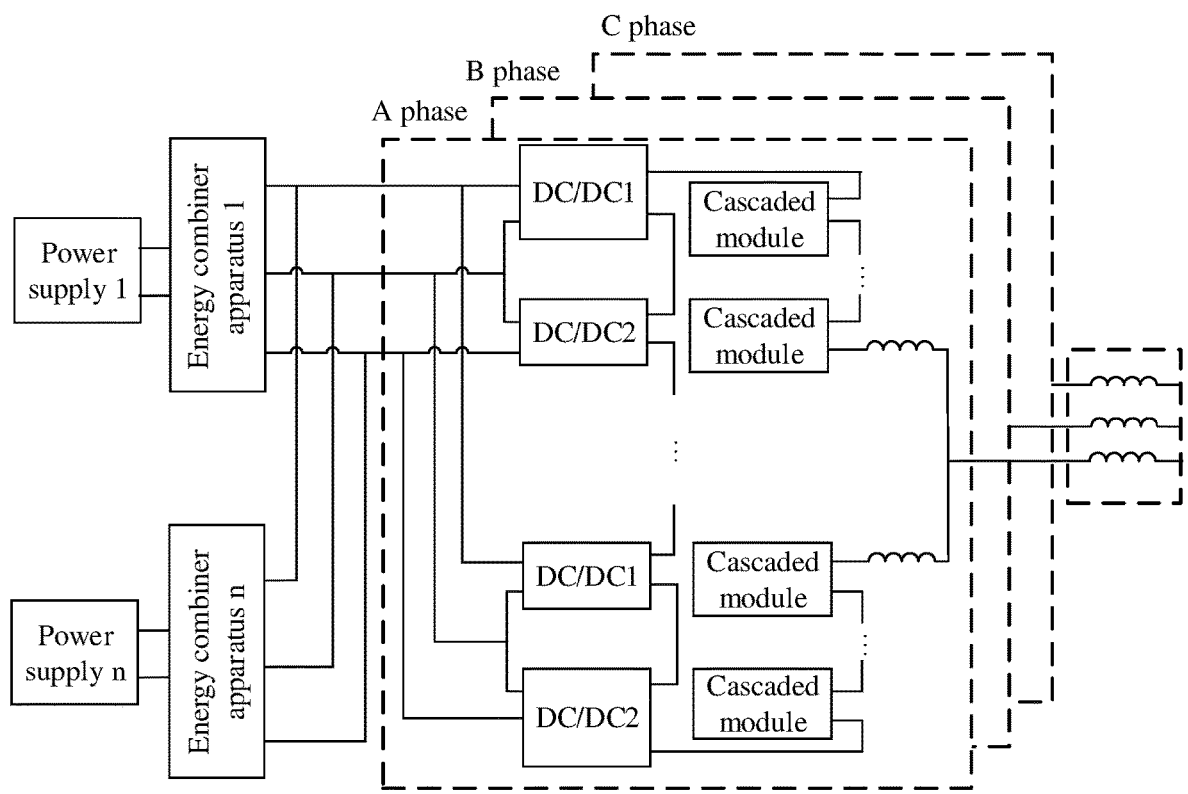
FIG. 19 is a schematic diagram of Embodiment 7 of a power supply system.

FIG. 19 is a schematic diagram of Embodiment 7 of a power supply system. In this embodiment, the power supply system includes at least one power supply, at least one energy combiner apparatus, three high-voltage cascade circuits, and three phase circuits. The power supply, the energy combiner apparatus, and the high-voltage cascade circuit are similar to those in the foregoing descriptions in Embodiment 6, and details are not described herein again. A coupling manner between the energy combiner apparatus and the high-voltage cascade circuit may be similar to that in the foregoing descriptions in Embodiment 1, and details are not described herein again. In some embodiments, the coupling manner between the energy combiner apparatus and the high-voltage cascade circuit may be similar to that in the foregoing descriptions in Embodiment 2 or Embodiment 3, and details are not described herein again.

In this embodiment, output terminals of the three high-voltage cascade circuits are coupled to the three phase circuits in a one-to-one correspondence. Structures of the high-voltage cascade circuit and the phase circuit are similar to those in the foregoing descriptions in Embodiment 6, and details are not described herein again. Descriptions of a structure of the cascaded module in this embodiment are similar to those of the cascaded module in Embodiment 6, and details are not described herein again. In this embodiment, output terminals of the three phase circuits are coupled to filter units and then may be connected to a grid as an A-phase circuit, a B-phase circuit, and a C-phase circuit.

In addition, for other parts of this embodiment, for example, an implementation of performing communication by using a communication signal and implementations of an optimizer and a shutdown device, refer to the foregoing embodiment for implementation, and therefore details are not described again.

Embodiment 8

Figure 20:
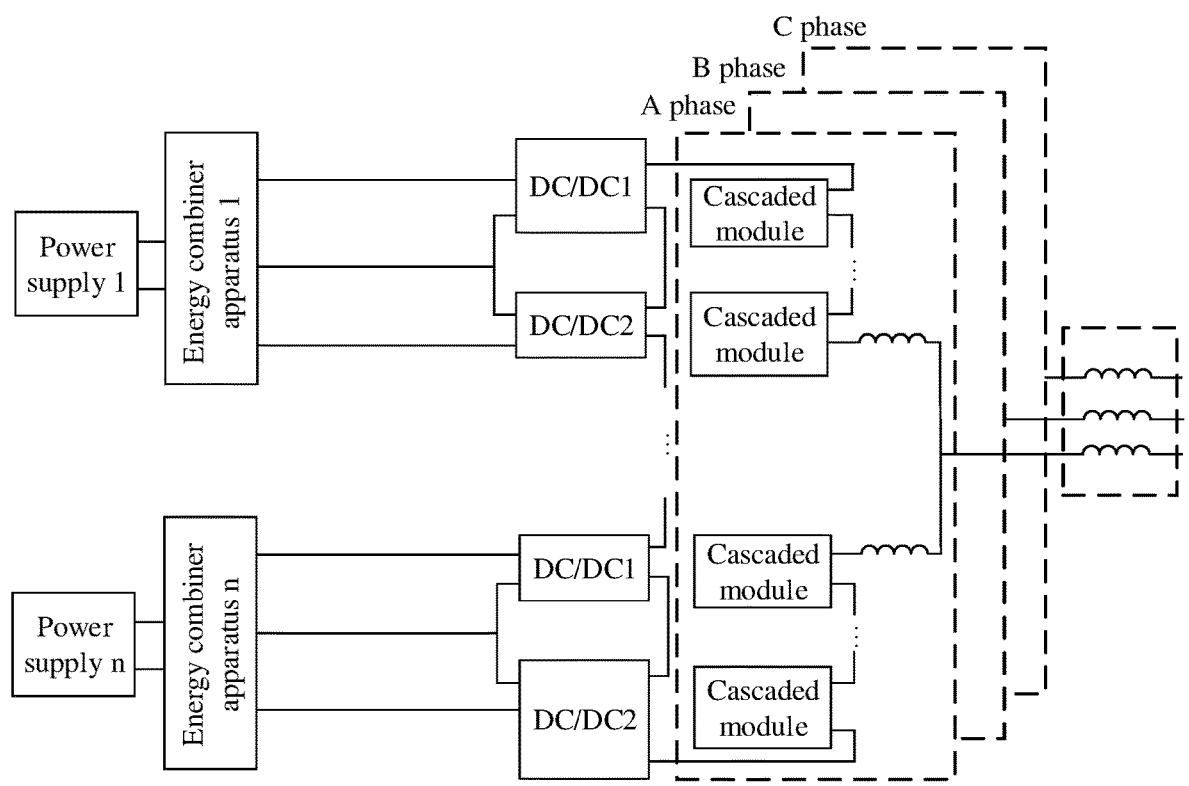
FIG. 20 is a schematic diagram of Embodiment 8 of a power supply system.

FIG. 20 is a schematic diagram of Embodiment 8 of a power supply system. In this embodiment, the power supply system includes at least one power supply, at least one energy combiner apparatus, one high-voltage cascade circuit, and three phase circuits. The power supply, the energy combiner apparatus, and the high-voltage cascade circuit are similar to those in the foregoing descriptions in Embodiment 6, and details are not described herein again. A coupling manner between the energy combiner apparatus and the high-voltage cascade circuit may be similar to that in the foregoing descriptions in Embodiment 5, and details are not described herein again.

In this embodiment, an output terminal of one high-voltage cascade circuit is coupled to the three phase circuits. Structures of the high-voltage cascade circuit and the phase circuit are similar to those in the foregoing descriptions in Embodiment 6, and details are not described herein again. Descriptions of a structure of the cascaded module in this embodiment are similar to those of the cascaded module in Embodiment 6, and details are not described herein again. In this embodiment, output terminals of the three phase circuits are separately coupled to filter units and then may be connected to a grid as an A-phase circuit, a B-phase circuit, and a C-phase circuit. In some embodiments, output terminals of three high-voltage cascade circuits may be alternatively coupled to the three phase circuits in a one-to-one correspondence. Details are not described herein.

In addition, for other parts of this embodiment, for example, an implementation of performing communication by using a communication signal and implementations of an optimizer and a shutdown device, refer to the foregoing embodiment for implementation, and therefore details are not described again.

Embodiment 9

Figure 21:
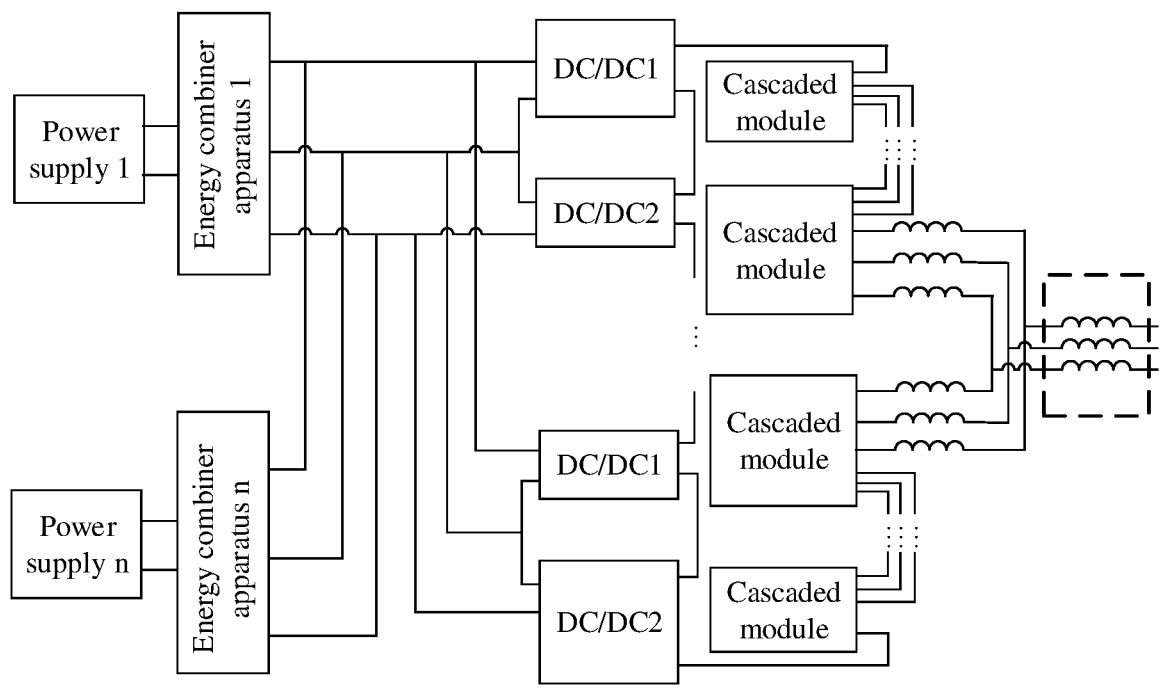
FIG. 21 is a schematic diagram of Embodiment 9 of a power supply system.

FIG. 21 is a schematic diagram of Embodiment 9 of a power supply system. In this embodiment, the power supply system includes at least one power supply, at least one energy combiner apparatus, one high-voltage cascade circuit, and one three-phase phase circuit. The power supply, the energy combiner apparatus, and the high-voltage cascade circuit are similar to those in the foregoing descriptions in Embodiment 6, and details are not described herein again. A coupling manner between the energy combiner apparatus and the high-voltage cascade circuit may be similar to that in the foregoing descriptions in Embodiment 4, and details are not described herein again.

In this embodiment, an output terminal of the high-voltage cascade circuit is coupled to an input terminal of the three-phase phase circuit. The three-phase phase circuit includes an upper bridge arm and a lower bridge arm, and the upper bridge arm and the lower bridge arm have a same structure and are symmetrically disposed. The upper bridge arm includes a plurality of three-phase cascaded modules, the three-phase cascaded modules are cascaded, one terminal of cascading is used as the input terminal of the three-phase circuit, and three ports at the other end of cascading are respectively coupled to input terminals of three inductor elements. Output terminals of the three inductor elements are respectively coupled to output terminals of three other inductor elements coupled to the lower bridge arm, and three output terminals formed after the coupling are used as three output terminals of the three-phase phase circuit. In this embodiment, a structure of the lower bridge arm is similar to that of the upper bridge arm, and details are not described herein again.

In this embodiment, for a structure of the three-phase cascaded module, refer to the structures in FIG. 18a and FIG. 18b for implementation, and this is not limited in this embodiment.

In this embodiment, the three output terminals of the three-phase phase circuit are separately coupled to filter units and then may be connected to a grid as an A-phase circuit, a B-phase circuit, and a C-phase circuit.

In addition, for other parts of this embodiment, for example, an implementation of performing communication by using a communication signal and implementations of an optimizer and a shutdown device, refer to the foregoing embodiment for implementation, and therefore details are not described again.

Embodiment 10

Figure 22:
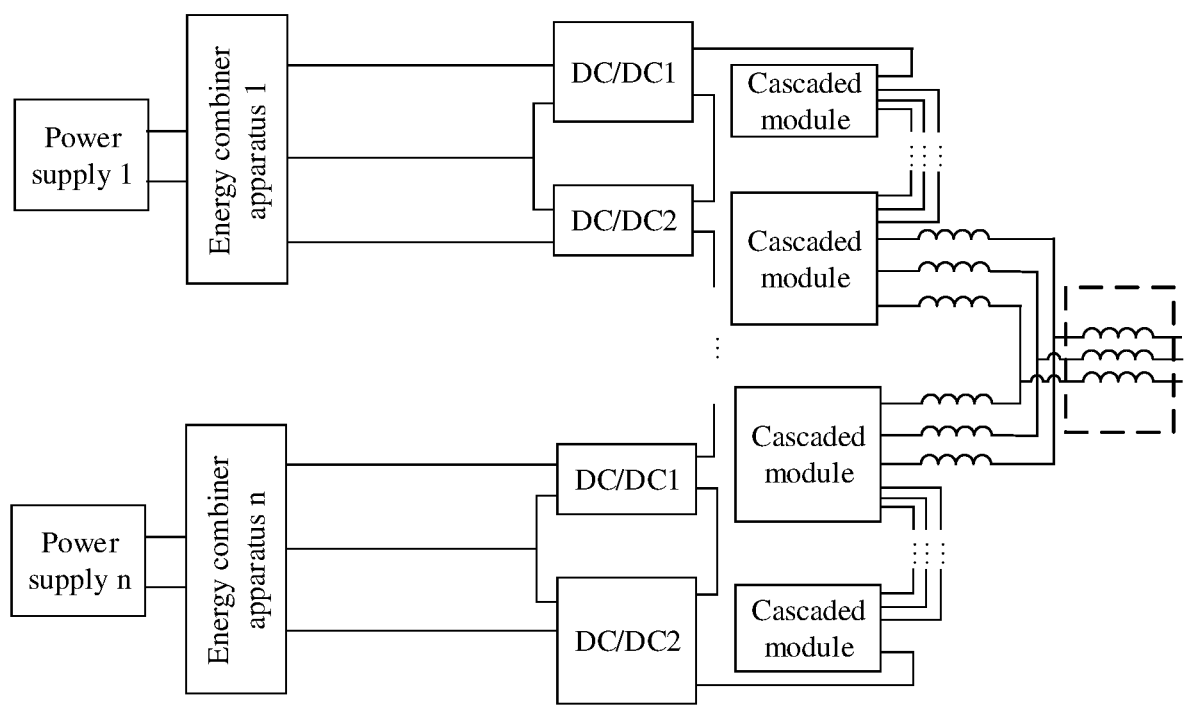
FIG. 22 is a schematic diagram of Embodiment 10 of a power supply system.

FIG. 22 is a schematic diagram of Embodiment 10 of a power supply system. In this embodiment, the power supply system includes at least one power supply, at least one energy combiner apparatus, one high-voltage cascade circuit, and one three-phase phase circuit. The power supply, the energy combiner apparatus, and the high-voltage cascade circuit are similar to those in the foregoing descriptions in Embodiment 6, and details are not described herein again. A coupling manner between the energy combiner apparatus and the high-voltage cascade circuit may be similar to that in the foregoing descriptions in Embodiment 5, and details are not described herein again.

In this embodiment, the high-voltage cascade circuit and the three-phase phase circuit are similar to those in Embodiment 9, and details are not described herein again.

In this embodiment, for a structure of the three-phase cascaded module, refer to the structures in FIG. 18a and FIG. 18b for implementation, and this is not limited in this embodiment.

In this embodiment, three output terminals of the three-phase phase circuit are separately coupled to filter units and then may be connected to a grid as an A-phase circuit, a B-phase circuit, and a C-phase circuit.

In addition, for other parts of this embodiment, for example, an implementation of performing communication by using a communication signal and implementations of an optimizer and a shutdown device, refer to the foregoing embodiment for implementation, and therefore details are not described again.

Figure 23:
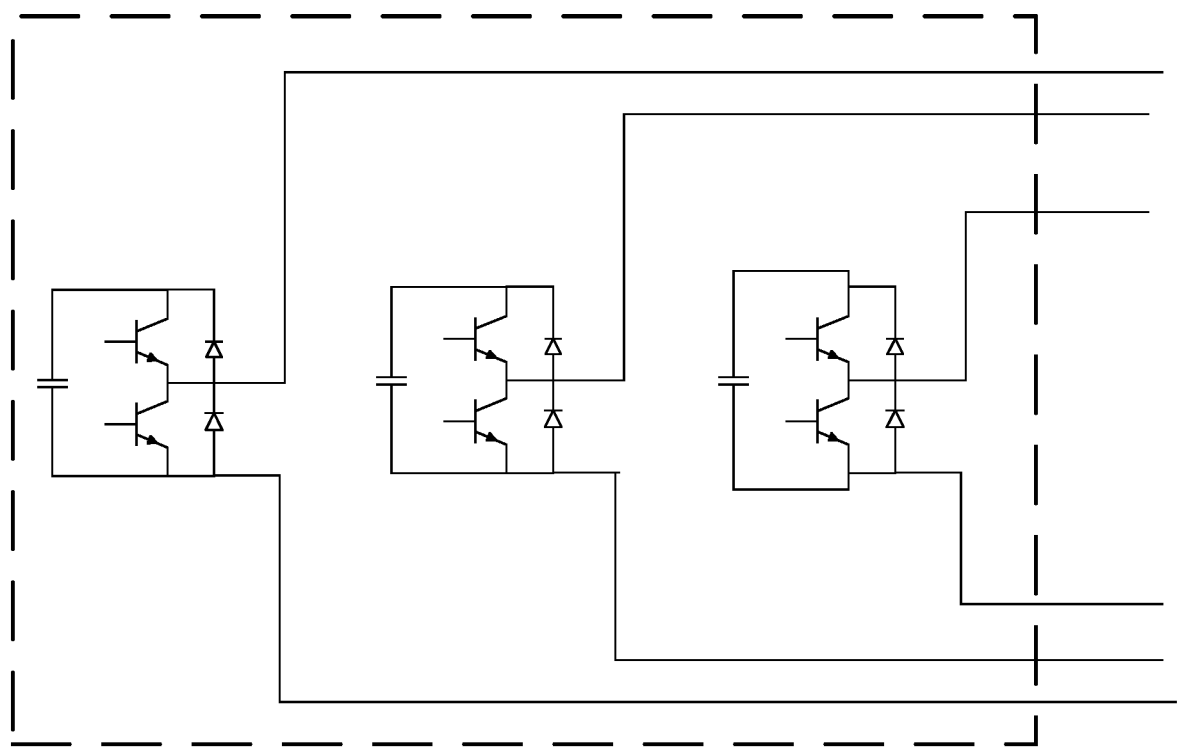
FIG. 23 is a schematic diagram of a three-phase cascaded module according to an embodiment.

FIG. 23 is a schematic diagram of a three-phase cascaded module according to an embodiment. A dashed box represents the three-phase cascaded module, and the three-phase cascaded module has three output terminals and three input terminals. The three-phase cascaded module includes three cascaded modules, output terminals of the three cascaded modules are used as three output terminals of the three-phase cascaded module, and input terminals of the three cascaded modules are used as three input terminals of the three-phase cascaded module.

It may be understood that, in three-phase cascaded modules that are cascaded, three input terminals of the first three-phase cascaded module may be coupled together as one input terminal, or three output terminals may be coupled together as one output terminal to connect to an output terminal of a high-voltage cascade circuit. This also applies to the last three-phase cascaded module in the three-phase cascaded modules that are cascaded. Details are not described herein again.

FIG. 23 is only an example of the three-phase cascaded module. In actual application, another type of three-phase cascaded module may be used. This is not limited in this embodiment.

The present allocation provides a power supply system, comprising one three-phase phase circuit connected to a grid through a star or delta connection, at least one first power supply, and at least one energy combiner apparatus, wherein
the three-phase phase circuit comprises a plurality of direct current/three-phase alternating current conversion combinations and three phase filter units, same-type output terminals of the plurality of direct current/three-phase alternating current conversion combinations are separately cascaded, three terminals of cascading are connected to input terminals of the three phase filter units, output terminals of the three phase filter units are used as a first output terminal, a second output terminal, and a third output terminal of the three-phase phase circuit, and the other three terminals of cascading are respectively used as the other three output terminals of the three-phase phase circuit;
the direct current/three-phase alternating current conversion combination comprises a first-stage isolation DC/AC conversion unit and a second-stage isolation DC/AC conversion unit, the first-stage isolation DC/AC conversion unit has three pairs of output terminals, the second-stage isolation DC/AC conversion unit has three pairs of output terminals, three output terminals of the first-stage isolation DC/AC conversion unit and three output terminals of the second-stage isolation DC/AC conversion unit are respectively cascaded, three terminals of cascading are used as three output terminals of the direct current/alternating current conversion combination, and the other three terminals of cascading are used as the other three output terminals of the direct current/alternating current conversion combination;
a first input terminal of the first-stage isolation DC/AC conversion unit is used as a first input terminal of the direct current/three-phase alternating current conversion combination, a second input terminal of the first-stage isolation DC/AC conversion unit is coupled to a first input terminal of the second-stage isolation DC/AC conversion unit, a coupling node is used as a second input terminal of the direct current/three-phase alternating current conversion combination, and a second input terminal of the second-stage isolation DC/AC conversion unit is used as a third input terminal of the direct current/three-phase alternating current conversion combination; and an input terminal of the energy combiner apparatus is coupled to an output terminal of at least one first power supply, and the three input terminals of the direct current/three-phase alternating current conversion combination are coupled to three output terminals of at least one energy combiner apparatus.

The power supply system as described above, wherein same-type output terminals of energy combiner apparatuses are connected in parallel, same-type input terminals of the direct current/three-phase alternating current conversion combinations are connected in parallel, and the parallel output terminals of the energy combiner apparatuses are coupled to the parallel input terminals of the direct current/three-phase alternating current conversion combinations; or an input terminal of each direct current/three-phase alternating current conversion combination is coupled to at least one energy combiner apparatus.

The power supply system as described above, wherein the first power supply is a photovoltaic array and/or an energy storage power supply and/or a wind power generation direct current source; and the photovoltaic array is formed by connecting photovoltaic panels in series and parallel, or is formed by connecting outputs of photovoltaic panels to optimizers or shutdown devices and then performing a combination of series and parallel connections.

The power supply system as described above, wherein the energy combiner apparatus comprises at least one DC/DC conversion unit, and the DC/DC conversion unit has a unidirectional step-up direct current conversion function, a unidirectional step-down direct current conversion function, a bidirectional step-up/step-down direct current conversion function, or a unidirectional step-up and reverse step-down direct current conversion function; and an input terminal of the DC/DC conversion unit is coupled to the input terminal of the energy combiner apparatus, three output terminals of the DC/DC conversion unit are coupled to the three output terminals of the energy combiner apparatus, and the output terminals of the DC/DC conversion unit comprise a positive output terminal of the DC/DC conversion unit, a negative output terminal of the DC/DC conversion unit, and an output-voltage intermediate-potential output terminal of the DC/DC conversion unit.

The power supply system as described above, wherein the DC/DC conversion unit comprises at least one first-stage DC/DC conversion unit and second-stage DC/DC conversion unit;
an input terminal of the first-stage DC/DC conversion unit is the input terminal of the DC/DC conversion unit, an output terminal of the second-stage DC/DC conversion unit is an output terminal of the DC/DC conversion unit, and an input terminal of the second-stage DC/DC conversion unit comprises a third node, a fourth node, and a fifth node; and
the third node is coupled to a positive output terminal of the first-stage DC/DC conversion unit and a positive output terminal of the second-stage DC/DC conversion unit, the fourth node is coupled to a negative output terminal of the first-stage DC/DC conversion unit and an output-voltage intermediate-potential output terminal of the second-stage DC/DC conversion unit, the fifth node is coupled to a negative output terminal of the second-stage DC/DC conversion unit, and the second-stage DC/DC conversion unit is configured to transfer energy between the third node and the fourth node to a position between the fourth node and the fifth node, so that an average voltage from the third node to the fifth node is greater than an average voltage from the third node to the fourth node.

The power supply system a as described above, wherein when an input voltage and/or an input current and/or input power of the first-stage DC/DC conversion unit exceed or exceeds a preset value, the first-stage DC/DC conversion unit works in a bypass mode; and/or when an output voltage and/or an output current and/or output power of the first-stage DC/DC conversion unit exceed or exceeds a preset value, the second-stage DC/DC conversion unit stops working; and/or
at least one of the first-stage isolation DC/AC conversion unit and the second-stage isolation DC/AC conversion unit works.

The power supply system as described above, wherein the DC/DC conversion unit comprises at least one third-stage DC/DC conversion unit and fourth-stage DC/DC conversion unit;
an input terminal of the third-stage DC/DC conversion unit is the input terminal of the DC/DC conversion unit, an output terminal of the fourth-stage DC/DC conversion unit is an output terminal of the DC/DC conversion unit, and an input terminal of the fourth-stage DC/DC conversion unit comprises a sixth node, a seventh node, and an eighth node; and
the sixth node is coupled to a positive output terminal of the fourth-stage DC/DC conversion unit, the seventh node is coupled to a positive output terminal of the third-stage DC/DC conversion unit and an output-voltage intermediate-potential output terminal of the fourth-stage DC/DC conversion unit, the eighth node is coupled to a negative output terminal of the third-stage DC/DC conversion unit and a negative output terminal of the fourth-stage DC/DC conversion unit, and the fourth-stage DC/DC conversion unit is configured to transfer energy between the seventh node and the eighth node to a position between the sixth node and the seventh node, so that an average voltage from the sixth node to the eighth node is greater than an average voltage from the seventh node to the eighth node.

The power supply system as described above, wherein when an input voltage and/or input power of the third-stage DC/DC conversion unit exceed or exceeds a preset value, the third-stage DC/DC conversion unit works in a bypass mode; and/or when an output voltage and/or output power of the third-stage DC/DC conversion unit exceed or exceeds a preset value, the fourth-stage DC/DC conversion unit stops working; and/or
at least one of the first-stage isolation DC/AC conversion unit and the second-stage isolation DC/AC conversion unit works.

The power supply system as described above, wherein the DC/DC conversion unit comprises a first-stage DC/DC conversion unit and a second-stage DC/DC conversion unit, output terminals of the first-stage DC/DC conversion unit and the second-stage DC/DC conversion unit are cascaded, one terminal of cascading is used as the positive output terminal of the DC/DC conversion unit, another terminal of cascading is used as the negative output terminal of the DC/DC conversion unit, an intermediate terminal of cascading is used as the output-voltage intermediate-potential output terminal of the DC/DC conversion unit, an input terminal of the first-stage DC/DC conversion unit is used as one input terminal of the DC/DC conversion unit, and an input terminal of the second-stage DC/DC conversion unit is used as the other input terminal of the DC/DC conversion unit.

The power supply system as described above, wherein a negative input terminal and a negative output terminal of the first-stage DC/DC conversion unit are directly coupled or are connected only with a small voltage drop, and a negative input terminal and a positive output terminal of the second-stage DC/DC conversion unit are directly coupled or are connected only with a small voltage drop; or
 a positive input terminal and a negative output terminal of the first-stage DC/DC conversion unit are directly coupled or connected only with a small voltage drop, and a positive input terminal and a positive output terminal of the second-stage DC/DC conversion unit are directly coupled or are connected only with a small voltage drop.

The power supply system as described above, wherein the energy combiner apparatus comprises at least one DC/DC conversion unit; and
 input terminals of the DC/DC conversion unit are coupled to some input terminals of the energy combiner apparatus, a positive output terminal of the DC/DC conversion unit is coupled to a positive output terminal of the energy combiner apparatus, a negative output terminal of the DC/DC conversion unit is coupled to an output-voltage intermediate-potential output terminal of the energy combiner apparatus and a positive terminal in at least one other input terminal of the energy combiner apparatus, and a negative output terminal of the energy combiner apparatus is coupled to a negative terminal in the at least one other input terminal of the energy combiner apparatus; or
 input terminals of the DC/DC conversion unit are coupled to some input terminals of the energy combiner apparatus, a negative output terminal of the DC/DC conversion unit is coupled to a negative output terminal of the energy combiner apparatus, a positive output terminal of the DC/DC conversion unit is coupled to an output-voltage intermediate-potential output terminal of the energy combiner apparatus and a negative terminal in at least one other input terminal of the energy combiner apparatus, and a positive output terminal of the energy combiner apparatus is coupled to a positive terminal in the at least one other input terminal of the energy combiner apparatus.

The power supply system as described above, wherein a positive input terminal and the negative output terminal of the DC/DC conversion unit are directly coupled or are connected only with a small voltage drop, or a negative input terminal and the positive output terminal of the DC/DC conversion unit are directly coupled or are connected only with a small voltage drop.

The power supply system as described above, wherein the energy combiner apparatus comprises at least one combiner unit; and
 an input terminal of the combiner unit is coupled to the input terminal of the energy combiner apparatus, and three output terminals of the combiner unit are respectively coupled to the three output terminals of the energy combiner apparatus.

The power supply system as described above, wherein structures of the first-stage isolation DC/AC conversion unit and the second-stage isolation DC/AC conversion unit are the same;
 the first-stage isolation DC/AC conversion unit comprises a DC/AC conversion module, a multi-channel output high-frequency transformer, and an AC/AC conversion unit;
 a ratio of primary windings to secondary windings of the multi-channel output high-frequency transformer is m:3n, wherein m and n are integers greater than or equal to 1;
 the 3n secondary windings comprise three secondary winding groups;
 n secondary windings in each secondary winding group are separately coupled to at least one AC/AC conversion unit, output terminals of AC/AC conversion units corresponding to each secondary winding are connected in parallel, output of the AC/AC conversion unit is a sinusoidal alternating current voltage of 50 Hz or 60 Hz, output terminals of AC/AC conversion units corresponding to different secondary windings are cascaded, and two output terminals formed after the cascading are two same-type output terminals of the first-stage isolation DC/AC conversion unit; and
 the m primary windings of the multi-channel output high-frequency transformer are coupled to an output terminal of at least one DC/AC conversion module, and input terminals of the DC/AC conversion module are the input terminals of the first-stage isolation DC/AC conversion unit.

The power supply system as described above, wherein structures of the first-stage isolation DC/AC conversion unit and the second-stage isolation DC/AC conversion unit are the same;
 the first-stage isolation DC/AC conversion unit comprises a DC/AC conversion module, a multi-channel output high-frequency transformer, and an AC/AC conversion unit; a ratio of primary windings to secondary windings of the multi-channel output high-frequency transformer is m:3n, wherein m and n are integers greater than or equal to 1;
 the 3n secondary windings comprise three secondary winding groups;
 n secondary windings in each secondary winding group are separately coupled to at least one AC/AC conversion unit, same-type output terminals of AC/AC conversion units are connected in parallel, and output terminals formed after the parallel connection are two same-type output terminals of the first-stage isolation DC/AC conversion unit; and
 the m primary windings of the multi-channel output high-frequency transformer are coupled to an output terminal of at least one DC/AC conversion module, and input terminals of the DC/AC conversion module are the input terminals of the first-stage isolation DC/AC conversion unit.

The power supply system as described above, wherein structures of the first-stage isolation DC/AC conversion unit and the second-stage isolation DC/AC conversion unit are the same;
 the first-stage isolation DC/AC conversion unit comprises a DC/AC conversion module, a multi-channel output high-frequency transformer, an AC/DC conversion unit, and a three-phase DC/AC conversion unit;
 a ratio of primary windings to secondary windings of the multi-channel output high-frequency transformer is m:n, wherein m and n are integers greater than or equal to 1;
 the n secondary windings are coupled to at least one AC/DC conversion unit, outputs of AC/DC conversion units coupled to a same secondary winding are connected in parallel, and the parallel terminals are coupled to at least one three-phase DC/AC conversion unit;
same-type output terminals of three-phase DC/AC conversion units are cascaded, and six output terminals formed after the cascading are the six output terminals of the first-stage isolation DC/AC conversion unit; and
the primary windings of the multi-channel output high-frequency transformer are coupled to an output terminal of at least one DC/AC conversion module, and input terminals of the DC/AC conversion module are the input terminals of the first-stage isolation DC/AC conversion unit.

The power supply system as described above, wherein structures of the first-stage isolation DC/AC conversion unit and the second-stage isolation DC/AC conversion unit are the same;
the first-stage isolation DC/AC conversion unit comprises a DC/AC conversion module, a multi-channel output high-frequency transformer, an AC/DC conversion unit, and a three-phase DC/AC conversion unit;
a ratio of primary windings to secondary windings of the multi-channel output high-frequency transformer is m:n, wherein m and n are integers greater than or equal to 1;
the n secondary windings are coupled to at least one AC/DC conversion unit, outputs of AC/DC conversion units coupled to a same secondary winding are connected in parallel, and the parallel terminals are coupled to at least one three-phase DC/AC conversion unit;
same-type output terminals of three-phase DC/AC conversion units are connected in parallel, and six output terminals formed after the parallel connection are the six output terminals of the first-stage isolation DC/AC conversion unit; and
the primary windings of the multi-channel output high-frequency transformer are coupled to an output terminal of at least one DC/AC conversion module, and input terminals of the DC/AC conversion module are the input terminals of the first-stage isolation DC/AC conversion unit.

The power supply system as described above, wherein structures of the first-stage isolation DC/AC conversion unit and the second-stage isolation DC/AC conversion unit are the same;
the first-stage isolation DC/AC conversion unit comprises a DC/AC conversion module, a multi-channel output high-frequency transformer, an AC/DC conversion unit, and one three-phase DC/AC conversion unit;
a ratio of primary windings to secondary windings of the multi-channel output high-frequency transformer is m:n, wherein m and n are integers greater than or equal to 1;
the n secondary windings are coupled to at least one AC/DC conversion unit, same-type output terminals of AC/DC conversion units are coupled in parallel and are then connected to an input terminal of the three-phase DC/AC conversion unit;
six output terminals of the three-phase DC/AC conversion unit are the six output terminals of the first-stage isolation DC/AC conversion unit; and
the primary windings of the multi-channel output high-frequency transformer are coupled to an output terminal of at least one DC/AC conversion module, and input terminals of the DC/AC conversion module are the input terminals of the first-stage isolation DC/AC conversion unit.

The power supply system as described above, wherein a bypass unit is coupled in parallel between two output terminals of the first-stage isolation DC/AC conversion unit, to control, when the first-stage isolation DC/AC conversion unit does not need to work, the bypass unit to be opened to implement a bypass function; and/or
a bypass unit is coupled in parallel between two output terminals of the second-stage isolation DC/AC conversion unit, to control, when the second-stage isolation DC/AC conversion unit does not need to work, the bypass unit to be opened to implement a bypass function, wherein the bypass unit is composed of one or more of a switch, a contactor, a relay, a circuit breaker, and a semiconductor switching component.

The power supply system as described above, wherein
the first output terminal, the second output terminal, and the third output terminal of the three-phase phase circuit are respectively coupled to a phase wire A, a phase wire B, and a phase wire C of the grid; and
the other three output terminals of the three-phase phase circuit are all coupled to a phase wire N of the grid.

The power supply system as described above, wherein
the first output terminal, the second output terminal, and the third output terminal of the three-phase phase circuit are respectively coupled to a phase wire A, a phase wire B, and a phase wire C of the grid; and
the other three output terminals of the three-phase phase circuit are separately coupled to the corresponding first output terminal, second output terminal, and third output terminal in a staggered manner, to form a three-phase delta connection.

The power supply system as described above, wherein the filter unit is one or a combination of a plurality of filters in an L filter, an LC filter, an LCL filter, and a higher-order filter.

The power supply system as described above, further comprising an energy storage unit, wherein the energy storage unit is coupled to at least two of three output phase wires of the energy combiner apparatus.

The power supply system as described above, wherein any two of the power supply, the energy combiner apparatus, the first-stage isolation DC/AC conversion unit, and the second-stage isolation DC/AC conversion unit communicate with each other by using a communication signal coupled on a connected direct current cable.

The power supply system as described above, further comprising a controller, wherein the controller comprises a communication module; and
the controller is coupled to the direct current/three-phase alternating current conversion combination and/or the energy combiner apparatus, and implements communication by coupling a communication signal on a coupled direct current cable, to control working modes or a working mode of the direct current/three-phase alternating current conversion combination and/or the energy combiner apparatus.

The power supply system as described above, wherein the power supply is a photovoltaic array, and the photovoltaic array is formed by connecting outputs of photovoltaic panels to optimizers or shutdown devices and then performing a combination of series and parallel connections;
a communication signal is coupled on an output direct current cable of the optimizer or the shutdown device; and
any one of the first-stage isolation DC/AC conversion unit, the second-stage isolation DC/AC conversion unit, the energy combiner apparatus, and the controller controls the optimizer or the shutdown device by using the communication signal, to implement fast shutdown.

The power supply system as described above, wherein communication signals are coupled on direct current cables between both the first-stage isolation DC/AC conversion unit and the second-stage isolation DC/AC conversion unit and the energy combiner apparatus; and any one of the first-stage isolation DC/AC conversion unit, the second-stage isolation DC/AC conversion unit, and the controller controls the energy combiner apparatus by using the communication signal, to control opening and closing of the energy combiner apparatus.

The present application also provides another power supply system, comprising at least one high-voltage cascade circuit, at least one first power supply, at least one energy combiner apparatus, and three phase circuits, wherein
the high-voltage cascade circuit comprises a plurality of direct current/direct current conversion combinations, output terminals of the plurality of direct current/direct current conversion combinations are cascaded, one terminal of cascading is used as a first output terminal of the high-voltage cascade circuit, and the other terminal of cascading is used as a second output terminal of the high-voltage cascade circuit;
the direct current/direct current conversion combination comprises a first-stage isolation DC/DC conversion unit and a second-stage isolation DC/DC conversion unit, output terminals of the first-stage isolation DC/DC conversion unit and the second-stage isolation DC/DC conversion unit are cascaded, one terminal of cascading is used as a first output terminal of the direct current/direct current conversion combination, and the other terminal of cascading is used as a second output terminal of the direct current/direct current conversion combination;
a first input terminal of the first-stage isolation DC/DC conversion unit is used as a first input terminal of the direct current/direct current conversion combination, a second input terminal of the first-stage isolation DC/DC conversion unit is coupled to a first input terminal of the second-stage isolation DC/DC conversion unit, a coupling node is used as a second input terminal of the direct current/direct current conversion combination, and a second input terminal of the second-stage isolation DC/DC conversion unit is used as a third input terminal of the direct current/direct current conversion combination;
an input terminal of the energy combiner apparatus is coupled to an output terminal of at least one first power supply, and the three input terminals of the direct current/direct current conversion combination are coupled to three output terminals of at least one energy combiner apparatus;
each of the three phase circuits comprises an upper bridge arm, a lower bridge arm, an upper inductor unit, and a lower inductor unit, the upper bridge arm and the lower bridge arm each are formed by cascading a plurality of cascaded modules, one terminal of the upper bridge arm is used as a first input terminal of the phase circuit, the other terminal of the upper bridge arm is coupled to an input terminal of the upper inductor unit, one terminal of the lower bridge arm is used as a second input terminal of the phase circuit, the other terminal of the lower bridge arm is coupled to an input terminal of the lower inductor unit, an output terminal of the upper inductor unit is coupled to an output terminal of the lower inductor unit, and a coupling node is used as an output terminal of the phase circuit;
input terminals of the three phase circuits are coupled to output terminals of a same high-voltage cascade circuit, or input terminals of the three phase circuits are respectively coupled to output terminals of three high-voltage cascade circuits; and
three output terminals of the three phase circuits are separately coupled to filter units and are then connected to a grid.

The power supply system as described above, wherein a main circuit of the cascaded module is a half-bridge topology, a full-bridge topology, or a multi-level topology.

The power supply system as described above, wherein the cascaded module comprises a capacitor unit, two switching transistors, and two diodes;
the two switching transistors are connected in series and are then coupled to the capacitor, and each of the two switching transistors is connected to one diode in parallel; and
a series connection node of the two switching transistors is coupled to a first port of the cascaded module, and a coupling node of the two switching transistors and the capacitor is coupled to a second port of the cascaded module.

The power supply system as described above, wherein the cascaded module comprises a first capacitor, a second capacitor, four switching transistors, and four diodes;
the four switching transistors are connected in series and are then coupled to the first capacitor, and each of the four switching transistors is connected to one diode in parallel;
two terminals that are of two middle switching transistors in the four switching transistors and that are connected in series are connected to the second capacitor in parallel; and
a series connection node of the two middle switching transistors in the four switching transistors is coupled to a first port of the cascaded module, and a coupling node of the four switching transistors and the first capacitor is coupled to a second port of the cascaded module.

The power supply system as described above, wherein same-type output terminals of energy combiner apparatuses are connected in parallel, same-type input terminals of the direct current/direct current conversion combinations are connected in parallel, and the parallel output terminals of the energy combiner apparatuses are coupled to the parallel input terminals of the direct current/direct current conversion combinations; or
an input terminal of each direct current/direct current conversion combination is coupled to at least one energy combiner apparatus.

The power supply system as described above, wherein
the first power supply is a photovoltaic array and/or an energy storage power supply and/or a wind power generation direct current source; and
the photovoltaic array is formed by connecting photovoltaic panels in series and parallel, or is formed by connecting outputs of photovoltaic panels to optimizers or shutdown devices and then performing a combination of series and parallel connections.

The power supply system as described above, wherein
the energy combiner apparatus comprises at least one DC/DC conversion unit, and the DC/DC conversion unit has a unidirectional step-up direct current conversion function, a unidirectional step-down direct current conversion function, a bidirectional step-up/step-down direct current conversion function, or a unidirectional step-up and reverse step-down direct current conversion function; and an input terminal of the DC/DC conversion unit is coupled to the input terminal of the energy combiner apparatus, three output terminals of the DC/DC conversion unit are coupled to the three output terminals of the energy combiner apparatus, and the output terminals of the DC/DC conversion unit comprise a positive output terminal of the DC/DC conversion unit, a negative output terminal of the DC/DC conversion unit, and an output-voltage intermediate-potential output terminal of the DC/DC conversion unit.

The power supply system as described above, wherein the DC/DC conversion unit comprises at least one first-stage DC/DC conversion unit and second-stage DC/DC conversion unit;

an input terminal of the first-stage DC/DC conversion unit is the input terminal of the DC/DC conversion unit, an output terminal of the second-stage DC/DC conversion unit is an output terminal of the DC/DC conversion unit, and an input terminal of the second-stage DC/DC conversion unit comprises a third node, a fourth node, and a fifth node; and the third node is coupled to a positive output terminal of the first-stage DC/DC conversion unit and a positive output terminal of the second-stage DC/DC conversion unit, the fourth node is coupled to a negative output terminal of the first-stage DC/DC conversion unit and an output-voltage intermediate-potential output terminal of the second-stage DC/DC conversion unit, the fifth node is coupled to a negative output terminal of the second-stage DC/DC conversion unit, and the second-stage DC/DC conversion unit is configured to transfer energy between the third node and the fourth node to a position between the fourth node and the fifth node, so that an average voltage from the third node to the fifth node is greater than an average voltage from the third node to the fourth node.

The power supply system as described above, wherein when an input voltage and/or an input current and/or input power of the first-stage DC/DC conversion unit exceed or exceeds a preset value, the first-stage DC/DC conversion unit works in a bypass mode; and/or when an output voltage and/or an output current and/or output power of the first-stage DC/DC conversion unit exceed or exceeds a preset value, the second-stage DC/DC conversion unit stops working; and/or at least one of the first-stage isolation DC/DC conversion unit and the second-stage isolation DC/DC conversion unit works.

The power supply system as described above, wherein the DC/DC conversion unit comprises at least one third-stage DC/DC conversion unit and fourth-stage DC/DC conversion unit;

an input terminal of the third-stage DC/DC conversion unit is the input terminal of the DC/DC conversion unit, an output terminal of the fourth-stage DC/DC conversion unit is an output terminal of the DC/DC conversion unit, and an input terminal of the fourth-stage DC/DC conversion unit comprises a sixth node, a seventh node, and an eighth node; and the sixth node is coupled to a positive output terminal of the fourth-stage DC/DC conversion unit, the seventh node is coupled to a positive output terminal of the third-stage DC/DC conversion unit and an output-voltage intermediate-potential output terminal of the fourth-stage DC/DC conversion unit, the eighth node is coupled to a negative output terminal of the third-stage DC/DC conversion unit and a negative output terminal of the fourth-stage DC/DC conversion unit, and the fourth-stage DC/DC conversion unit is configured to transfer energy between the seventh node and the eighth node to a position between the sixth node and the seventh node, so that an average voltage from the sixth node to the eighth node is greater than an average voltage from the seventh node to the eighth node.

The power supply system as described above, wherein when an input voltage and/or input power of the third-stage DC/DC conversion unit exceed or exceeds a preset value, the third-stage DC/DC conversion unit works in a bypass mode; and/or when an output voltage and/or output power of the third-stage DC/DC conversion unit exceed or exceeds a preset value, the fourth-stage DC/DC conversion unit stops working; and/or at least one of the first-stage isolation DC/DC conversion unit and the second-stage isolation DC/DC conversion unit works.

The power supply system as described above, wherein the DC/DC conversion unit comprises a first-stage DC/DC conversion unit and a second-stage DC/DC conversion unit, output terminals of the first-stage DC/DC conversion unit and the second-stage DC/DC conversion unit are cascaded, one terminal of cascading is used as the positive output terminal of the DC/DC conversion unit, another terminal of cascading is used as the negative output terminal of the DC/DC conversion unit, an intermediate terminal of cascading is used as the output-voltage intermediate-potential output terminal of the DC/DC conversion unit, an input terminal of the first-stage DC/DC conversion unit is used as one input terminal of the DC/DC conversion unit, and an input terminal of the second-stage DC/DC conversion unit is used as the other input terminal of the DC/DC conversion unit.

The power supply system as described above, wherein a negative input terminal and a negative output terminal of the first-stage DC/DC conversion unit are directly coupled or are connected only with a small voltage drop, and a negative input terminal and a positive output terminal of the second-stage DC/DC conversion unit are directly coupled or are connected only with a small voltage drop; or a positive input terminal and a negative output terminal of the first-stage DC/DC conversion unit are directly coupled or connected only with a small voltage drop, and a positive input terminal and a positive output terminal of the second-stage DC/DC conversion unit are directly coupled or are connected only with a small voltage drop.

The power supply system as described above, wherein the energy combiner apparatus comprises at least one DC/DC conversion unit; and input terminals of the DC/DC conversion unit are coupled to some input terminals of the energy combiner apparatus, a positive output terminal of the DC/DC conversion unit is coupled to a positive output terminal of the energy combiner apparatus, a negative output terminal of the DC/DC conversion unit is coupled to an output-voltage intermediate-potential output terminal of the energy combiner apparatus and a positive terminal in at least one other input terminal of the energy combiner apparatus, and a negative output terminal of the energy combiner apparatus is coupled to a negative terminal in the at least one other input terminal of the energy combiner apparatus; or input terminals of the DC/DC conversion unit are coupled to some input terminals of the energy combiner apparatus, a negative output terminal of the DC/DC conversion unit is coupled to a negative output terminal of the energy combiner apparatus, a positive output terminal of the DC/DC conversion unit is coupled to an output-voltage intermediate-potential output terminal of the energy combiner apparatus and a negative terminal in at least one other input terminal of the energy combiner apparatus, and a positive output terminal of the energy combiner apparatus is coupled to a positive terminal in the at least one other input terminal of the energy combiner apparatus.

The power supply system as described above, wherein a positive input terminal and the negative output terminal of the DC/DC conversion unit are directly coupled or are connected only with a small voltage drop, or a negative input terminal and the positive output terminal of the DC/DC conversion unit are directly coupled or are connected only with a small voltage drop.

The power supply system as described above, wherein the energy combiner apparatus comprises at least one combiner unit; and an input terminal of the combiner unit is coupled to the input terminal of the energy combiner apparatus, and three output terminals of the combiner unit are respectively coupled to the three output terminals of the energy combiner apparatus.

The power supply system as described above, wherein the filter unit coupled to the phase circuit is one or a combination of a plurality of filters in an L filter, an LC filter, an LCL filter, and a higher-order filter.

The power supply system as described above, further comprising an energy storage unit, wherein the energy storage unit is coupled to at least two of three output phase wires of the energy combiner apparatus.

The power supply system as described above, wherein any two of the power supply, the energy combiner apparatus, the first-stage isolation DC/DC conversion unit, and the second-stage isolation DC/DC conversion unit communicate with each other by using a communication signal coupled on a connected direct current cable.

The power supply system as described above, further comprising a controller, wherein the controller comprises a communication module; and the controller is coupled to the direct current/direct current conversion combination and/or the energy combiner apparatus, and implements communication by coupling a communication signal on a coupled direct current cable, to control working modes or a working mode of the direct current/direct current conversion combination and/or the energy combiner apparatus.

The power supply system as described above, wherein the power supply is a photovoltaic array, and the photovoltaic array is formed by connecting outputs of photovoltaic panels to optimizers or shutdown devices and then performing a combination of series and parallel connections;

a communication signal is coupled on an output direct current cable of the optimizer or the shutdown device; and any one of the first-stage isolation DC/DC conversion unit, the second-stage isolation DC/DC conversion unit, the energy combiner apparatus, and the controller controls the optimizer or the shutdown device by using the communication signal, to implement fast shutdown.

The power supply system as described above, wherein communication signals are coupled on direct current cables between both the first-stage isolation DC/DC conversion unit and the second-stage isolation DC/DC conversion unit and the energy combiner apparatus; and any one of the first-stage isolation DC/DC conversion unit, the second-stage isolation DC/DC conversion unit, and the controller controls the energy combiner apparatus by using the communication signal, to control opening and closing of the energy combiner apparatus.

The present application also provides another power supply system, comprising a high-voltage cascade circuit, at least one first power supply, at least one energy combiner apparatus, and a three-phase phase circuit, wherein the high-voltage cascade circuit comprises a plurality of direct current/direct current conversion combinations, output terminals of the plurality of direct current/direct current conversion combinations are cascaded, one terminal of cascading is used as a first output terminal of the high-voltage cascade circuit, and the other terminal of cascading is used as a second output terminal of the high-voltage cascade circuit;

the direct current/direct current conversion combination comprises a first-stage isolation DC/DC conversion unit and a second-stage isolation DC/DC conversion unit, output terminals of the first-stage isolation DC/DC conversion unit and the second-stage isolation DC/DC conversion unit are cascaded, one terminal of cascading is used as a first output terminal of the direct current/direct current conversion combination, and the other terminal of cascading is used as a second output terminal of the direct current/direct current conversion combination;

a first input terminal of the first-stage isolation DC/DC conversion unit is used as a first input terminal of the direct current/direct current conversion combination, a second input terminal of the first-stage isolation DC/DC conversion unit is coupled to a first input terminal of the second-stage isolation DC/DC conversion unit, a coupling node is used as a second input terminal of the direct current/direct current conversion combination, and a second input terminal of the second-stage isolation DC/DC conversion unit is used as a third input terminal of the direct current/direct current conversion combination;

an input terminal of the energy combiner apparatus is coupled to an output terminal of at least one first power supply, and the three input terminals of the direct current/direct current conversion combination are coupled to three output terminals of at least one energy combiner apparatus;

the three-phase phase circuit comprises a three-phase upper bridge arm, a three-phase lower bridge arm, three upper inductor units, and three lower inductor units, the three-phase upper bridge arm and the three-phase lower bridge arm each are formed by cascading a plurality of three-phase cascaded modules, one terminal of the three-phase upper bridge arm is used as a first input terminal of the three-phase phase circuit, the other three terminals of the three-phase upper bridge arm are coupled to input terminals of the three upper inductor units, one terminal of the three-phase lower bridge arm is used as a second input terminal of the three-phase phase circuit, the other terminal of the three-phase lower bridge arm is coupled to input terminals of the three lower inductor units, output terminals of the three upper inductor units are respectively coupled to output terminals of the three lower inductor units, and three coupling nodes are used as three output terminals of the three-phase phase circuit;

the output terminals of the high-voltage cascade circuit are coupled to the input terminals of the three-phase phase circuit; and the three output terminals of the three-phase phase circuit are separately coupled to filter units and are then connected to a grid.

The power supply system as described above, wherein the three-phase cascaded module is composed of a combination of three cascaded modules, and the cascaded module comprises a capacitor unit, two switching transistors, and two diodes;

the two switching transistors are connected in series and are then coupled to the capacitor, and each of the two switching transistors is connected to one diode in parallel; and a series connection node of the two switching transistors is coupled to a first port of the cascaded module, and a coupling node of the two switching transistors and the capacitor is coupled to a second port of the cascaded module.

The power supply system as described above, wherein the three-phase cascaded module is composed of a combination of three cascaded modules, and the cascaded module comprises a first capacitor, a second capacitor, four switching transistors, and four diodes; the four switching transistors are connected in series and are then coupled to the first capacitor, and each of the four switching transistors is connected to one diode in parallel;

two terminals that are of two middle switching transistors in the four switching transistors and that are connected in series are connected to the second capacitor in parallel; and a series connection node of the two middle switching transistors in the four switching transistors is coupled to a first port of the cascaded module, and a coupling node of the four switching transistors and the first capacitor is coupled to a second port of the cascaded module.

The power supply system as described above, wherein same-type output terminals of energy combiner apparatuses are connected in parallel, same-type input terminals of the direct current/direct current conversion combinations are connected in parallel, and the parallel output terminals of the energy combiner apparatuses are coupled to the parallel input terminals of the direct current/direct current conversion combinations; or an input terminal of each direct current/direct current conversion combination is coupled to at least one energy combiner apparatus.

The power supply system according as described above, wherein the first power supply is a photovoltaic array and/or an energy storage power supply and/or a wind power generation direct current source; and the photovoltaic array is formed by connecting photovoltaic panels in series and parallel, or is formed by connecting outputs of photovoltaic panels to optimizers or shutdown devices and then performing a combination of series and parallel connections.

The power supply system as described above, wherein the energy combiner apparatus comprises at least one DC/DC conversion unit, and the DC/DC conversion unit has a unidirectional step-up direct current conversion function, a unidirectional step-down direct current conversion function, a bidirectional step-up/step-down direct current conversion function, or a unidirectional step-up and reverse step-down direct current conversion function; and an input terminal of the DC/DC conversion unit is coupled to the input terminal of the energy combiner apparatus, three output terminals of the DC/DC conversion unit are coupled to the three output terminals of the energy combiner apparatus, and the output terminals of the DC/DC conversion unit comprise a positive output terminal of the DC/DC conversion unit, a negative output terminal of the DC/DC conversion unit, and an output-voltage intermediate-potential output terminal of the DC/DC conversion unit.

The power supply system as described above, wherein the DC/DC conversion unit comprises at least one first-stage DC/DC conversion unit and second-stage DC/DC conversion unit;

an input terminal of the first-stage DC/DC conversion unit is the input terminal of the DC/DC conversion unit, an output terminal of the second-stage DC/DC conversion unit is an output terminal of the DC/DC conversion unit, and an input terminal of the second-stage DC/DC conversion unit comprises a third node, a fourth node, and a fifth node; and the third node is coupled to a positive output terminal of the first-stage DC/DC conversion unit and a positive output terminal of the second-stage DC/DC conversion unit, the fourth node is coupled to a negative output terminal of the first-stage DC/DC conversion unit and an output-voltage intermediate-potential output terminal of the second-stage DC/DC conversion unit, the fifth node is coupled to a negative output terminal of the second-stage DC/DC conversion unit, and the second-stage DC/DC conversion unit is configured to transfer energy between the third node and the fourth node to a position between the fourth node and the fifth node, so that an average voltage from the third node to the fifth node is greater than an average voltage from the third node to the fourth node.

The power supply system as described above, wherein when an input voltage and/or an input current and/or input power of the first-stage DC/DC conversion unit exceed or exceeds a preset value, the first-stage DC/DC conversion unit works in a bypass mode; and/or when an output voltage and/or an output current and/or output power of the first-stage DC/DC conversion unit exceed or exceeds a preset value, the second-stage DC/DC conversion unit stops working; and/or at least one of the first-stage isolation DC/DC conversion unit and the second-stage isolation DC/DC conversion unit works.

The power supply system as described above, wherein the DC/DC conversion unit comprises at least one third-stage DC/DC conversion unit and fourth-stage DC/DC conversion unit;

an input terminal of the third-stage DC/DC conversion unit is the input terminal of the DC/DC conversion unit, an output terminal of the fourth-stage DC/DC conversion unit is an output terminal of the DC/DC conversion unit, and an input terminal of the fourth-stage DC/DC conversion unit comprises a sixth node, a seventh node, and an eighth node; and the sixth node is coupled to a positive output terminal of the fourth-stage DC/DC conversion unit, the seventh node is coupled to a positive output terminal of the third-stage DC/DC conversion unit and an output-voltage intermediate-potential output terminal of the fourth-stage DC/DC conversion unit, the eighth node is coupled to a negative output terminal of the third-stage DC/DC conversion unit and a negative output terminal of the fourth-stage DC/DC conversion unit, and the fourth-stage DC/DC conversion unit is configured to transfer energy between the seventh node and the eighth node to a position between the sixth node and the seventh node, so that an average voltage from the sixth node to the eighth node is greater than an average voltage from the seventh node to the eighth node.

The power supply system as described above, wherein
when an input voltage and/or input power of the third-stage DC/DC conversion unit exceed or exceeds a preset value, the third-stage DC/DC conversion unit works in a bypass mode; and/or
when an output voltage and/or output power of the third-stage DC/DC conversion unit exceed or exceeds a preset value, the fourth-stage DC/DC conversion unit stops working; and/or at least one of the first-stage isolation DC/DC conversion unit and the second-stage isolation DC/DC conversion unit works.

The power supply system as described above, wherein
the DC/DC conversion unit comprises a first-stage DC/DC conversion unit and a second-stage DC/DC conversion unit, output terminals of the first-stage DC/DC conversion unit and the second-stage DC/DC conversion unit are cascaded, one terminal of cascading is used as the positive output terminal of the DC/DC conversion unit, another terminal of cascading is used as the negative output terminal of the DC/DC conversion unit, an intermediate terminal of cascading is used as the output-voltage intermediate-potential output terminal of the DC/DC conversion unit, an input terminal of the first-stage DC/DC conversion unit is used as one input terminal of the DC/DC conversion unit, and an input terminal of the second-stage DC/DC conversion unit is used as the other input terminal of the DC/DC conversion unit.

The power supply system as described above, wherein a negative input terminal and a negative output terminal of the first-stage DC/DC conversion unit are directly coupled or are connected only with a small voltage drop, and a negative input terminal and a positive output terminal of the second-stage DC/DC conversion unit are directly coupled or are connected only with a small voltage drop; or
a positive input terminal and a negative output terminal of the first-stage DC/DC conversion unit are directly coupled or connected only with a small voltage drop, and a positive input terminal and a positive output terminal of the second-stage DC/DC conversion unit are directly coupled or are connected only with a small voltage drop.

The power supply system as described above, wherein
the energy combiner apparatus comprises at least one DC/DC conversion unit; and
input terminals of the DC/DC conversion unit are coupled to some input terminals of the energy combiner apparatus, a positive output terminal of the DC/DC conversion unit is coupled to a positive output terminal of the energy combiner apparatus, a negative output terminal of the DC/DC conversion unit is coupled to an output-voltage intermediate-potential output terminal of the energy combiner apparatus and a positive terminal in at least one other input terminal of the energy combiner apparatus, and a negative output terminal of the energy combiner apparatus is coupled to a negative terminal in the at least one other input terminal of the energy combiner apparatus; or
input terminals of the DC/DC conversion unit are coupled to some input terminals of the energy combiner apparatus, a negative output terminal of the DC/DC conversion unit is coupled to a negative output terminal of the energy combiner apparatus, a positive output terminal of the DC/DC conversion unit is coupled to an output-voltage intermediate-potential output terminal of the energy combiner apparatus and a negative terminal in at least one other input terminal of the energy combiner apparatus, and a positive output terminal of the energy combiner apparatus is coupled to a positive terminal in the at least one other input terminal of the energy combiner apparatus.

The power supply system as described above, wherein a positive input terminal and the negative output terminal of the DC/DC conversion unit are directly coupled or are connected only with a small voltage drop, or a negative input terminal and the positive output terminal of the DC/DC conversion unit are directly coupled or are connected only with a small voltage drop.

The power supply system as described above, wherein
the energy combiner apparatus comprises at least one combiner unit; and
an input terminal of the combiner unit is coupled to the input terminal of the energy combiner apparatus, and three output terminals of the combiner unit are respectively coupled to the three output terminals of the energy combiner apparatus.

The power supply system as described above, wherein the filter unit coupled to the three-phase phase circuit is one or a combination of a plurality of filters in an L filter, an LC filter, an LCL filter, and a higher-order filter.

The power supply system as described above, further comprising an energy storage unit, wherein the energy storage unit is coupled to at least two of three output phase wires of the energy combiner apparatus.

The power supply system as described above, wherein any two of the power supply, the energy combiner apparatus, the first-stage isolation DC/DC conversion unit, and the second-stage isolation DC/DC conversion unit communicate with each other by using a communication signal coupled on a connected direct current cable.

The power supply system a as described above, further comprising a controller, wherein the controller comprises a communication module; and
the controller is coupled to the direct current/direct current conversion combination and/or the energy combiner apparatus, and implements communication by coupling a communication signal on a coupled direct current cable, to control working modes or a working mode of the direct current/direct current conversion combination and/or the energy combiner apparatus.

The power supply system as described above, wherein the power supply is a photovoltaic array, and the photovoltaic array is formed by connecting outputs of photovoltaic panels to optimizers or shutdown devices and then performing a combination of series and parallel connections;
a communication signal is coupled on an output direct current cable of the optimizer or the shutdown device; and
any one of the first-stage isolation DC/DC conversion unit, the second-stage isolation DC/DC conversion unit, the energy combiner apparatus, and the controller controls the optimizer or the shutdown device by using the communication signal, to implement fast shutdown.

The power supply system as described above, wherein communication signals are coupled on direct current cables between both the first-stage isolation DC/DC conversion unit and the second-stage isolation DC/DC conversion unit and the energy combiner apparatus; and any one of the first-stage isolation DC/DC conversion unit, the second-stage isolation DC/DC conversion unit, and the controller controls the energy combiner apparatus by using the communication signal, to control opening and closing of the energy combiner apparatus.

What is claimed is:

1. A power supply system, comprising:
   three phase circuits connected to a grid through either a star or delta connection;
   at least one first power supply; and
   at least one energy combiner apparatus, wherein each phase circuit comprises
   a plurality of direct current/alternating current (DC/AC) conversion combinations and
   a filter unit, output terminals of the plurality of DC/AC conversion combinations are cascaded, a first cascaded terminal is coupled to an input terminal of the filter unit, a first output terminal of the filter unit is used as a first output terminal of the phase circuit, and a second cascaded terminal is used as a second output terminal of the phase circuit;
   each DC/AC conversion combination comprises:
   a first-stage isolation DC/AC conversion unit and
   a second-stage isolation DC/AC conversion unit, output terminals of the first-stage isolation DC/AC conversion unit and the second-stage isolation DC/AC conversion unit are cascaded, the first cascaded terminal is used as a first output terminal of the DC/AC conversion combination, and the second cascaded terminal is used as a second output terminal of each DC/AC conversion combination;
   a first input terminal of the first-stage isolation DC/AC conversion unit is used as a first input terminal of the DC/AC conversion combination,
   a second input terminal of the first-stage isolation DC/AC conversion unit is coupled to a first input terminal of the second-stage isolation DC/AC conversion unit,
   a coupling node is used as a second input terminal of the DC/AC conversion combination, and
   a second input terminal of the second-stage isolation DC/AC conversion unit is used as a third input terminal of the DC/AC conversion combination; and
   an input terminal of the energy combiner apparatus is coupled to an output terminal of the at least one first power supply, and
   the three input terminals of the DC/AC conversion combination are coupled to three output terminals of the at least one energy combiner apparatus.

2. The power supply system according to claim 1, wherein same-type output terminals of energy combiner apparatuses are connected in parallel, same-type input terminals of the DC/AC conversion combinations are connected in parallel, and the parallel output terminals of the energy combiner apparatuses are coupled to the parallel input terminals of the DC/AC conversion combinations; or
   same-type input terminals of DC/AC conversion combinations in a same phase circuit are connected in parallel, and the same-type input terminals connected in parallel are coupled to output terminals of the at least one energy combiner apparatus; or
   an input terminal of each DC/AC conversion combination is coupled to the at least one energy combiner apparatus.

3. The power supply system according to claim 1, wherein the first power supply is a photovoltaic array and/or an energy storage power supply and/or a wind power generation DC source; and the photovoltaic array is formed by
   connecting photovoltaic panels in series and parallel, or is formed by
   connecting outputs of photovoltaic panels to optimizers or shutdown devices and then performing a combination of series and parallel connections.

4. The power supply system according to claim 1, wherein the energy combiner apparatus comprises
   a DC/DC conversion unit that has a unidirectional step-up DC conversion function, a unidirectional step-down DC conversion function, a bidirectional step-up/step-down DC conversion function, or a unidirectional step-up and reverse step-down DC conversion function, wherein an input terminal of the DC/DC conversion unit is coupled to the input terminal of the energy combiner apparatus, three output terminals of the DC/DC conversion unit are coupled to the three output terminals of the energy combiner apparatus, and the output terminals of the DC/DC conversion unit comprise:
   a positive output terminal of the DC/DC conversion unit;
   a negative output terminal of the DC/DC conversion unit; and
   an output-voltage intermediate-potential output terminal of the DC/DC conversion unit.

5. The power supply system according to claim 4, wherein the DC/DC conversion unit comprises:
   a first-stage DC/DC conversion unit and
   a second-stage DC/DC conversion unit, an input terminal of the first-stage DC/DC conversion unit is the input terminal of the DC/DC conversion unit, an output terminal of the second-stage DC/DC conversion unit is an output terminal of the DC/DC conversion unit, an input terminal of the second-stage DC/DC conversion unit comprises:
   a third node coupled to a positive output terminal of the first-stage DC/DC conversion unit and a positive output terminal of the second-stage DC/DC conversion unit;
   a fourth node coupled to a negative output terminal of the first-stage DC/DC conversion unit and an output-voltage intermediate-potential output terminal of the second-stage DC/DC conversion unit; and
   a fifth node coupled to a negative output terminal of the second-stage DC/DC conversion unit, and the second-stage DC/DC conversion unit is configured to transfer energy between the third node and the fourth node to a position between the fourth node and the fifth node, so that an average voltage from the third node to the fifth node is greater than an average voltage from the third node to the fourth node.

6. The power supply system according to claim 5, wherein, when an input voltage and/or an input current and/or input power of the first-stage DC/DC conversion unit exceed or exceeds a preset value, the first-stage DC/DC conversion unit works in a bypass mode; and/or
   when an output voltage and/or an output current and/or output power of the first-stage DC/DC conversion unit exceed or exceeds the preset value, the second-stage DC/DC conversion unit stops working; and/or at least one of the first-stage isolation DC/AC conversion unit and the second-stage isolation DC/AC conversion unit works.

7. The power supply system according to claim 4, wherein the DC/DC conversion unit comprises:
a third-stage DC/DC conversion unit and
a fourth-stage DC/DC conversion unit, an input terminal of the third-stage DC/DC conversion unit is the input terminal of the DC/DC conversion unit, an output terminal of the fourth-stage DC/DC conversion unit is an output terminal of the DC/DC conversion unit, and an input terminal of the fourth-stage DC/DC conversion unit comprises:
a sixth node coupled to a positive output terminal of the fourth-stage DC/DC conversion unit;
a seventh node coupled to a positive output terminal of the third-stage DC/DC conversion unit and an output-voltage intermediate-potential output terminal of the fourth-stage DC/DC conversion unit; and
an eighth node coupled to a negative output terminal of the third-stage DC/DC conversion unit and a negative output terminal of the fourth-stage DC/DC conversion unit, and the fourth-stage DC/DC conversion unit is configured to transfer energy between the seventh node and the eighth node to a position between the sixth node and the seventh node, so that an average voltage from the sixth node to the eighth node is greater than an average voltage from the seventh node to the eighth node.

8. The power supply system according to claim 7, wherein, when an input voltage and/or input power of the third-stage DC/DC conversion unit exceed or exceeds a preset value, the third-stage DC/DC conversion unit works in a bypass mode; and/or
when an output voltage and/or output power of the third-stage DC/DC conversion unit exceed or exceeds the preset value, the fourth-stage DC/DC conversion unit stops working; and/or
at least one of the first-stage isolation DC/AC conversion unit and the second-stage isolation DC/AC conversion unit works.

9. The power supply system according to claim 4, wherein the DC/DC conversion unit comprises a first-stage DC/DC conversion unit and a second-stage DC/DC conversion unit, output terminals of the first-stage DC/DC conversion unit and the second-stage DC/DC conversion unit are cascaded, the first cascaded terminal is used as the positive output terminal of the DC/DC conversion unit, the second cascaded terminal is used as the negative output terminal of the DC/DC conversion unit, a third cascaded terminal is used as the output-voltage intermediate-potential output terminal of the DC/DC conversion unit, an input terminal of the first-stage DC/DC conversion unit is used as one input terminal of the DC/DC conversion unit, and an input terminal of the second-stage DC/DC conversion unit is used as the other input terminal of the DC/DC conversion unit.

10. The power supply system according to claim 1, wherein
a negative input terminal and a negative output terminal of the first-stage DC/DC conversion unit are directly coupled or are connected only with a small voltage drop, and a negative input terminal and a positive output terminal of the second-stage DC/DC conversion unit are directly coupled or are connected only with the small voltage drop; or
a positive input terminal and the negative output terminal of the first-stage DC/DC conversion unit are directly coupled or connected only with the small voltage drop, and a positive input terminal and the positive output terminal of the second-stage DC/DC conversion unit are directly coupled or are connected only with the small voltage drop.

11. The power supply system according to claim 1, wherein the energy combiner apparatus further comprises:
a DC/DC conversion unit, wherein input terminals of the DC/DC conversion unit are coupled to some input terminals of the energy combiner apparatus, a positive output terminal of the DC/DC conversion unit is coupled to a positive output terminal of the energy combiner apparatus, a negative output terminal of the DC/DC conversion unit is coupled to an output-voltage intermediate-potential output terminal of the energy combiner apparatus and a positive terminal in at least one other input terminal of the energy combiner apparatus, and a negative output terminal of the energy combiner apparatus is coupled to a negative terminal in the at least one other input terminal of the energy combiner apparatus; or
input terminals of the DC/DC conversion unit are coupled to some input terminals of the energy combiner apparatus, the negative output terminal of the DC/DC conversion unit is coupled to a negative output terminal of the energy combiner apparatus, the positive output terminal of the DC/DC conversion unit is coupled to the output-voltage intermediate-potential output terminal of the energy combiner apparatus and a negative terminal in at least one other input terminal of the energy combiner apparatus, and a positive output terminal of the energy combiner apparatus is coupled to a positive terminal in the at least one other input terminal of the energy combiner apparatus.

12. The power supply system according to claim 11, wherein
a positive input terminal and the negative output terminal of the DC/DC conversion unit are directly coupled or are connected only with a small voltage drop, or
a negative input terminal and the positive output terminal of the DC/DC conversion unit are directly coupled or are connected only with the small voltage drop.

13. The power supply system according to claim 1, wherein the energy combiner apparatus comprises a combiner unit, an input terminal of the combiner unit is coupled to the input terminal of the energy combiner apparatus, and three output terminals of the combiner unit are respectively coupled to the three output terminals of the energy combiner apparatus.

14. The power supply system according to claim 1, wherein structures of the first-stage isolation DC/AC conversion unit and the second-stage isolation DC/AC conversion unit are the same; the first-stage isolation DC/AC conversion unit comprises:
a DC/AC conversion module;
a multi-channel output high-frequency transformer; and
an AC/AC conversion unit, wherein a ratio of primary windings to secondary windings of the multi-channel output high-frequency transformer is m:n, m and n are integers greater than or equal to 1, the n secondary windings are coupled to the AC/AC conversion unit, output of the AC/AC conversion unit is a sinusoidal AC voltage of either 50 Hz or 60 Hz, output terminals of AC/AC conversion units are cascaded, an output terminal formed after the cascading is an output terminal of the first-stage isolation DC/AC conversion unit, the m primary windings of the multi-channel output high-frequency transformer are coupled to an output terminal of the DC/AC conversion module, and input terminals of the DC/AC conversion module are the input terminals of the first-stage isolation DC/AC conversion unit.

15. The power supply system according to claim 1, wherein structures of the first-stage isolation DC/AC conversion unit and the second-stage isolation DC/AC conversion unit are the same; the first-stage isolation DC/AC conversion unit comprises:
 a DC/AC conversion module;
 a multi-channel output high-frequency transformer; and
 an AC/AC conversion unit, wherein a ratio of primary windings to secondary windings of the multi-channel output high-frequency transformer is m:n, m and n are integers greater than or equal to 1, the n secondary windings are coupled to the AC/AC conversion unit, same-type output terminals of AC/AC conversion units are connected in parallel, an output terminal formed after the parallel connection is an output terminal of the first-stage isolation DC/AC conversion unit, the m primary windings of the multi-channel output high-frequency transformer are coupled to an output terminal of the DC/AC conversion module, and input terminals of the DC/AC conversion module are the input terminals of the first-stage isolation DC/AC conversion unit.

16. The power supply system according to claim 1, wherein structures of the first-stage isolation DC/AC conversion unit and the second-stage isolation DC/AC conversion unit are the same, and the first-stage isolation DC/AC conversion unit comprises:
 a DC/AC conversion module;
 a multi-channel output high-frequency transformer;
 an AC/DC conversion unit; and
 a DC/AC conversion unit, wherein: a ratio of primary windings to secondary windings of the multi-channel output high-frequency transformer is m:n, m and n are integers greater than or equal to 1, the n secondary windings are coupled to the AC/DC conversion unit, outputs of AC/DC conversion units coupled to a same secondary winding are connected in parallel, the parallel terminals are coupled to the DC/AC conversion unit, outputs of DC/AC conversion units with same-type input are connected in parallel and are then cascaded with an output terminal of another DC/AC conversion unit, an output terminal formed after the cascading is an output terminal of the first-stage isolation DC/AC conversion unit, and the primary windings of the multi-channel output high-frequency transformer are coupled to an output terminal of the DC/AC conversion module, and input terminals of the DC/AC conversion module are the input terminals of the first-stage isolation DC/AC conversion unit.

17. The power supply system according to claim 1, wherein structures of the first-stage isolation DC/AC conversion unit and the second-stage isolation DC/AC conversion unit are the same, and the first-stage isolation DC/AC conversion unit comprises:
 a DC/AC conversion module;
 a multi-channel output high-frequency transformer;
 an AC/DC conversion unit; and
 a DC/AC conversion unit, wherein a ratio of primary windings to secondary windings of the multi-channel output high-frequency transformer is m:n, m and n are integers greater than or equal to 1, the n secondary windings are coupled to the AC/DC conversion unit, outputs of AC/DC conversion units coupled to a same secondary winding are connected in parallel, the parallel terminals are coupled to the DC/AC conversion unit, same-type output terminals of DC/AC conversion units are connected in parallel, an output terminal formed after the parallel connection is an output terminal of the first-stage isolation DC/AC conversion unit, the primary windings of the multi-channel output high-frequency transformer are coupled to an output terminal of the DC/AC conversion module, and input terminals of the DC/AC conversion module are the input terminals of the first-stage isolation DC/AC conversion unit.

18. The power supply system according to claim 1, wherein structures of the first-stage isolation DC/AC conversion unit and the second-stage isolation DC/AC conversion unit are the same, the first-stage isolation DC/AC conversion unit comprises:
 a DC/AC conversion module;
 a multi-channel output high-frequency transformer;
 an AC/DC conversion unit; and
 one DC/AC conversion unit, wherein a ratio of primary windings to secondary windings of the multi-channel output high-frequency transformer is m:n, m and n are integers greater than or equal to 1, the n secondary windings are coupled to the AC/DC conversion unit, same-type output terminals of AC/DC conversion units are coupled in parallel and are then connected to an input terminal of the DC/AC conversion unit, an output terminal of the DC/AC conversion unit is an output terminal of the first-stage isolation DC/AC conversion unit, the primary windings of the multi-channel output high-frequency transformer are coupled to an output terminal of the DC/AC conversion module, and input terminals of the DC/AC conversion module are the input terminals of the first-stage isolation DC/AC conversion unit.

19. The power supply system according to claim 1, wherein a bypass unit is coupled in parallel between two output terminals of the first-stage isolation DC/AC conversion unit, to control, when the first-stage isolation DC/AC conversion unit does not need to work, the bypass unit to be opened to implement a bypass function; and/or
 the bypass unit is coupled in parallel between two output terminals of the second-stage isolation DC/AC conversion unit, to control, when the second isolation DC/AC conversion unit does not need to work, the bypass unit to be opened to implement the bypass function, wherein the bypass unit is composed of one or more of a switch, a contactor, a relay, a circuit breaker, and a semiconductor switching component.

20. The power supply system according to claim 1, wherein a first output terminal of the first phase circuit is connected to a phase wire A of the grid, a first output terminal of the second phase circuit is connected to a phase wire B of the grid, a first output terminal of the third phase circuit is connected to a phase wire C of the grid, and second output terminals of the three phase circuits are all coupled to a phase wire N of the grid.

21. The power supply system according to claim 1, wherein a first output terminal of the phase circuit is coupled to a second output terminal of another phase circuit, a first output terminal of the first phase circuit is connected to a phase wire A of the grid, a first output terminal of the second phase circuit is connected to a phase wire B of the grid, and a first output terminal of the third phase circuit is connected to a phase wire C of the grid.

22. The power supply system according to claim 1, wherein the filter unit in the phase circuit is one or a combination of a plurality of filters in an L filter, an LC filter, an LCL filter, and a higher-order filter.

23. The power supply system according to claim 1, further comprising:
an energy storage unit configured to be coupled to at least two of three output phase wires of the energy combiner apparatus.

24. The power supply system according to claim 1, wherein any two of the power supply, the energy combiner apparatus, the first-stage isolation DC/AC conversion unit, and the second-stage isolation DC/AC conversion unit are configured to communicate with each other by using a communication signal coupled on a connected DC cable.

25. The power supply system according to claim 1, further comprising:
a controller comprising a communication module, wherein the controller is coupled to the DC/AC conversion combination and/or the energy combiner apparatus, and is configured to couple a communication signal on a DC cable to control working modes or a working mode of the DC/AC conversion combination and/or the energy combiner apparatus.

26. The power supply system according to claim 1, wherein the power supply is a photovoltaic array, the photovoltaic array is formed by connecting outputs of photovoltaic panels to optimizers or shutdown devices and then performing a combination of series and parallel connections, a communication signal is coupled on an output DC cable of the optimizer or the shutdown device; and any one of the first-stage isolation DC/AC conversion unit, the second-stage isolation DC/AC conversion unit, the energy combiner apparatus, and the controller is configured to control the optimizer or the shutdown device by using the communication signal, to implement fast shutdown.

27. The power supply system according to claim 1, wherein communication signals are coupled on DC cables between both the first-stage isolation DC/AC conversion unit and the second-stage isolation DC/AC conversion unit and the energy combiner apparatus, and any one of the first-stage isolation DC/AC conversion unit, the second-stage isolation DC/AC conversion unit, and the controller is configured to control the energy combiner apparatus by using the communication signal to control opening and closing of the energy combiner apparatus.

* * * * *